(12) United States Patent
Brace et al.

(10) Patent No.: US 7,145,747 B2
(45) Date of Patent: Dec. 5, 2006

(54) DATA CARTRIDGE LIBRARY INCLUDING A MAGAZINE, A PICKER, AN ELEVATOR, AND A GRASPER

(75) Inventors: Clark D. Brace, Westminster, CO (US); Jennifer L. Woodruff, Erie, CO (US)

(73) Assignee: Spectra Logic Corporation, Boulder, CO (US)

(*) Notice: Subject to any disclaimer, the term of this patent is extended or adjusted under 35 U.S.C. 154(b) by 95 days.

(21) Appl. No.: 10/708,480

(22) Filed: Mar. 5, 2004

(65) Prior Publication Data
US 2005/0195517 A1    Sep. 8, 2005

(51) Int. Cl.
*G11B 15/68* (2006.01)
(52) U.S. Cl. ........................ 360/92; 360/98.06
(58) Field of Classification Search .................. None
See application file for complete search history.

(56) References Cited

U.S. PATENT DOCUMENTS

| | | | | |
|---|---|---|---|---|
| 5,820,055 A * | 10/1998 | Leger et al. | .............. | 242/337 |
| 5,872,751 A * | 2/1999 | Utsumi et al. | .............. | 369/30.29 |
| 6,064,544 A | 5/2000 | Wada | .............. | 360/92 |
| 6,104,564 A * | 8/2000 | Shibuya et al. | .............. | 360/69 |
| 6,185,165 B1 * | 2/2001 | Jesionowski et al. | .... | 369/30.34 |
| 6,233,111 B1 * | 5/2001 | Schneider et al. | .............. | 360/92 |
| 6,385,003 B1 * | 5/2002 | Ellis | .............. | 360/92 |
| 6,445,651 B1 * | 9/2002 | Felde et al. | .............. | 369/30.41 |
| 6,473,261 B1 * | 10/2002 | Miller et al. | .............. | 360/92 |
| 6,493,178 B1 | 12/2002 | Brace et al. | .............. | 360/92 |
| 6,775,093 B1 * | 8/2004 | Smith et al. | .............. | 360/92 |
| 6,819,525 B1 * | 11/2004 | Brace et al. | .............. | 360/92 |
| 2002/0182039 A1 * | 12/2002 | Ostwald | .............. | 414/281 |
| 2003/0002201 A1 * | 1/2003 | Gupta et al. | .............. | 360/92 |
| 2003/0147174 A1 * | 8/2003 | Brace et al. | .............. | 360/92 |
| 2004/0105187 A1 | 6/2004 | Woodruff et al. | | |
| 2004/0223253 A1 | 11/2004 | Woodruff et al. | | |
| 2004/0264037 A1 | 12/2004 | Downey et al. | | |
| 2004/0264038 A1 | 12/2004 | Heineman et al. | | |
| 2004/0264039 A1 | 12/2004 | Armagost et al. | | |

(Continued)

FOREIGN PATENT DOCUMENTS

JP          7-161115          6/1995

(Continued)

OTHER PUBLICATIONS

U.S. Appl. No. 10/950,613, filed Sep. 27, 2004, Starr et al.

(Continued)

*Primary Examiner*—Jefferson Evans
(74) *Attorney, Agent, or Firm*—Wall Marjama & Bilinski LLP

(57) ABSTRACT

Disclosed is a data cartridge picking apparatus for use with a data cartridge library generally comprising at least one drive, a plurality of data cartridges capable of being disposed in a magazine and a transport system comprising an elevator capable of moving the picking apparatus within the library. The picking apparatus is capable of grasping and withdrawing, via a pair of grasping members, a data cartridge in a linear motion from, for example, a data cartridge magazine. The grasping members are actuated to open and close via the rotation of a crank and cam system whereby a camming structure associated with the crank engages a cam follower over some portion of rotation of the crank causing the grasping members to open and disengages the cam follower over a different portion of rotation causing the grasping members to close. The crank is rotated by the linear motion of the picker.

44 Claims, 60 Drawing Sheets

U.S. PATENT DOCUMENTS

| | | |
|---|---|---|
| 2004/0264040 A1 | 12/2004 | Armagost et al. |
| 2004/0264041 A1 | 12/2004 | Kumpon et al. |
| 2004/0264042 A1 | 12/2004 | Pollard et al. |
| 2005/0007692 A1 | 1/2005 | Thompson et al. |
| 2005/0047258 A1 | 3/2005 | Starr et al. |
| 2005/0057847 A1 | 3/2005 | Armagost et al. |
| 2005/0063089 A1 | 3/2005 | Starr et al. |
| 2005/0065637 A1 | 3/2005 | Lantry et al. |
| 2005/0185323 A1 | 8/2005 | Brace et al. |
| 2005/0195518 A1 | 9/2005 | Starr et al. |
| 2005/0195519 A1 | 9/2005 | Kumpon et al. |
| 2005/0195520 A1 | 9/2005 | Starr et al. |
| 2005/0219964 A1 | 10/2005 | Pollard et al. |
| 2005/0246484 A1 | 11/2005 | Lantry et al. |
| 2005/0267627 A1 | 12/2005 | Lantry et al. |

FOREIGN PATENT DOCUMENTS

| | | |
|---|---|---|
| JP | 07161115 | 6/1995 |
| WO | WO 2005/010661 A2 | 2/2005 |
| WO | 05-45168 | 12/2005 |
| WO | 05/46447 | 12/2005 |

OTHER PUBLICATIONS

U.S. Appl. No. 10/951,321, filed Sep. 27, 2004, Wong.
U.S. Appl. No. 10/980,594, filed Nov. 3, 2004, Fenske et al.
U.S. Appl. No. 11/011,812, filed Dec. 14 2004, Starr et al.
U.S. Appl. No. 11/019,911, filed Dec. 22, 2004, Curtis et al.
U.S. Appl. No. 11/037,985, filed Jan. 18, 2005, Permut et al.
U.S. Appl. No. 11/040,937, filed Jan. 21, 2005, Starr et al.
U.S. Appl. No. 11/089,749, filed Mar. 24, 2005, Starr et al.
U.S. Appl. No. 11/123,725, filed May 6, 2005, Rector et al.
U.S. Appl. No. 11/126,025, filed May 10, 2005, Rector et al.
U.S. Appl. No. 11/145,768, filed Jun. 6, 2005, Downey et al.
U.S. Appl. No. 11/230,146, filed Sep. 19, 2005, Starr et al.
U.S. Appl. No. 11/240,893, filed Sep. 30, 2005, Starr et al.
U.S. Appl. No. 11/264,920, filed Nov. 2, 2005, Lantry et al.

* cited by examiner

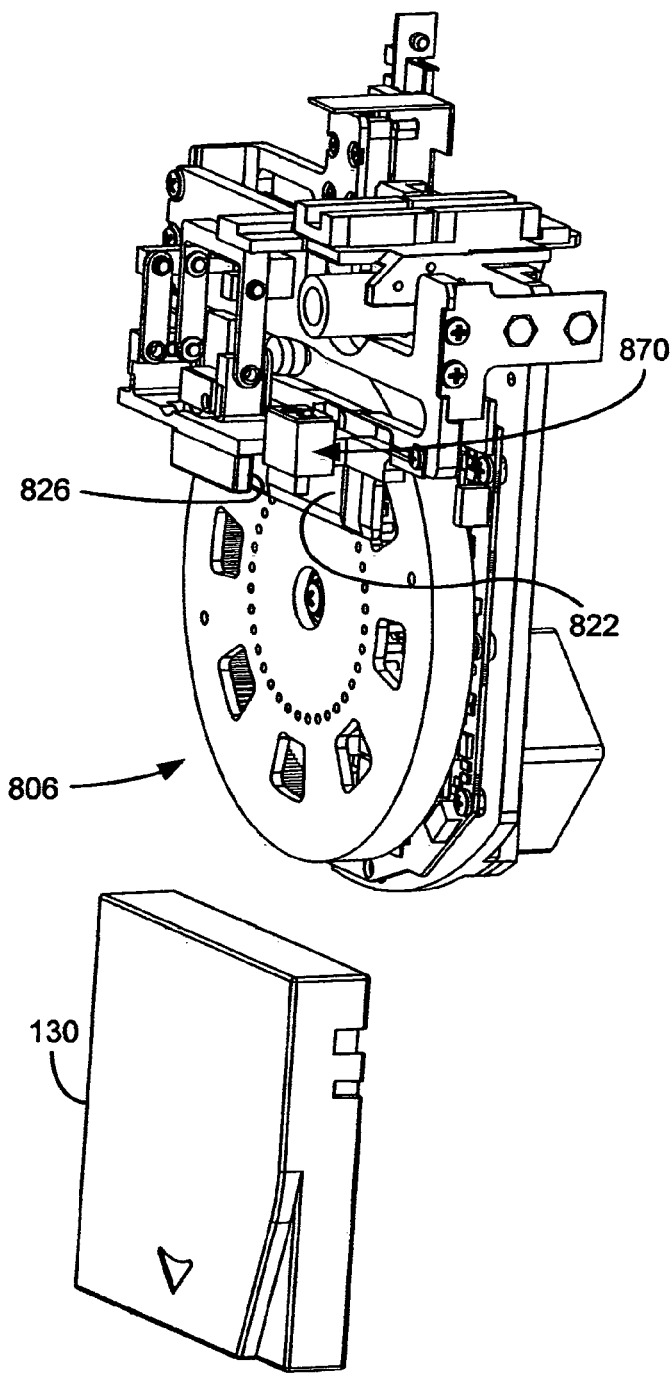
FIG. 15A1

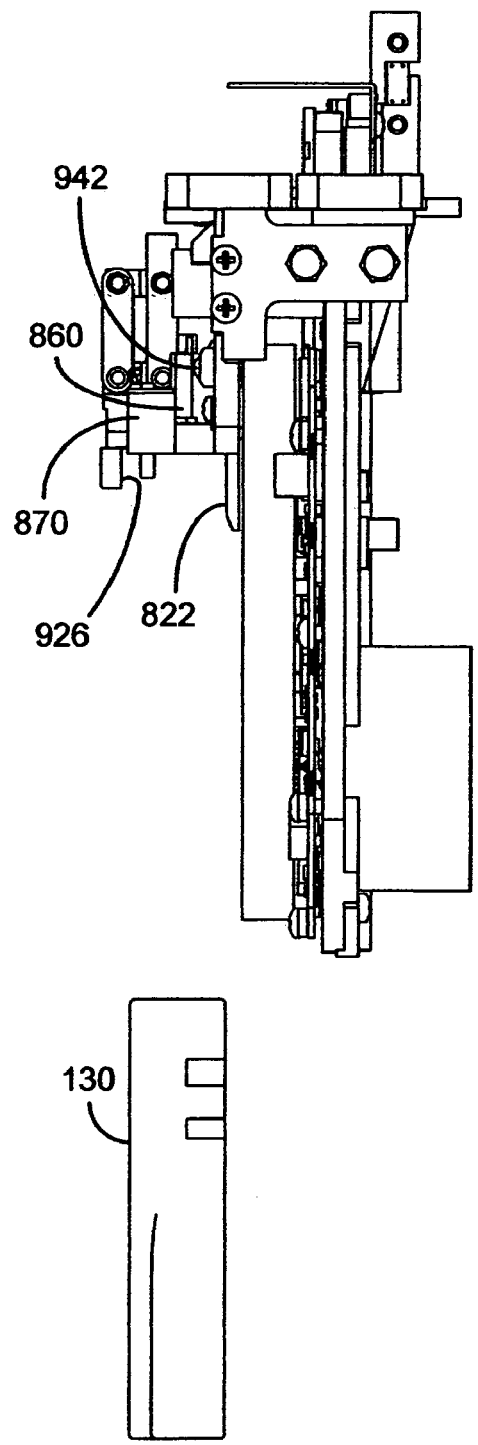
FIG. 15A2

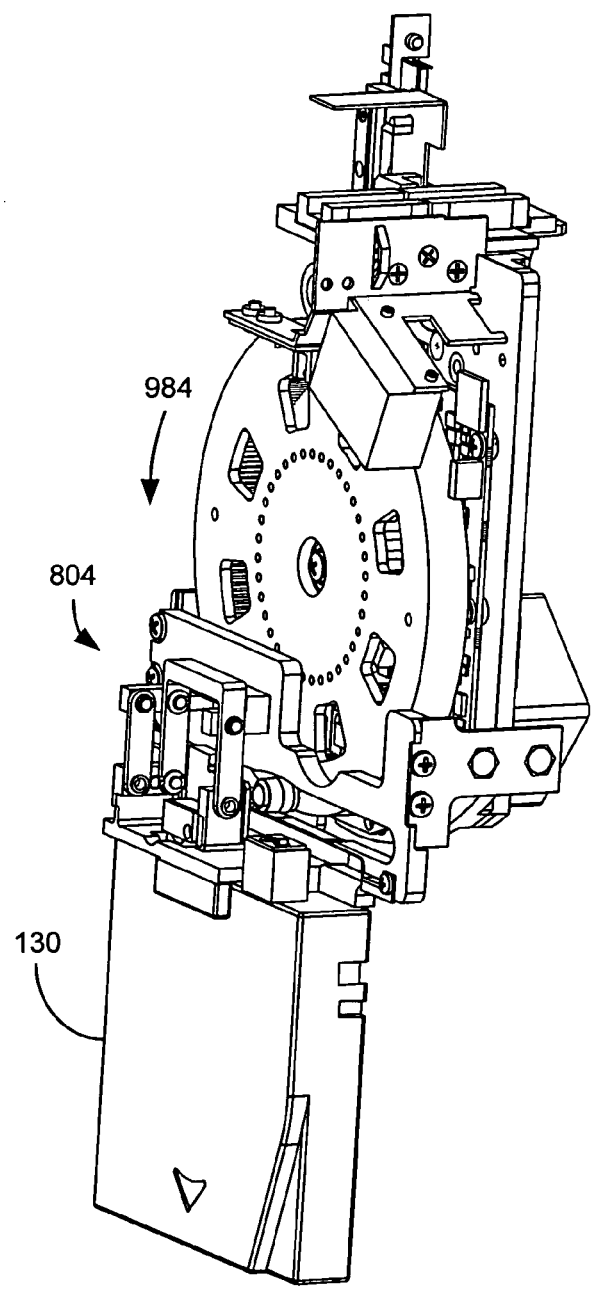
FIG. 15B1

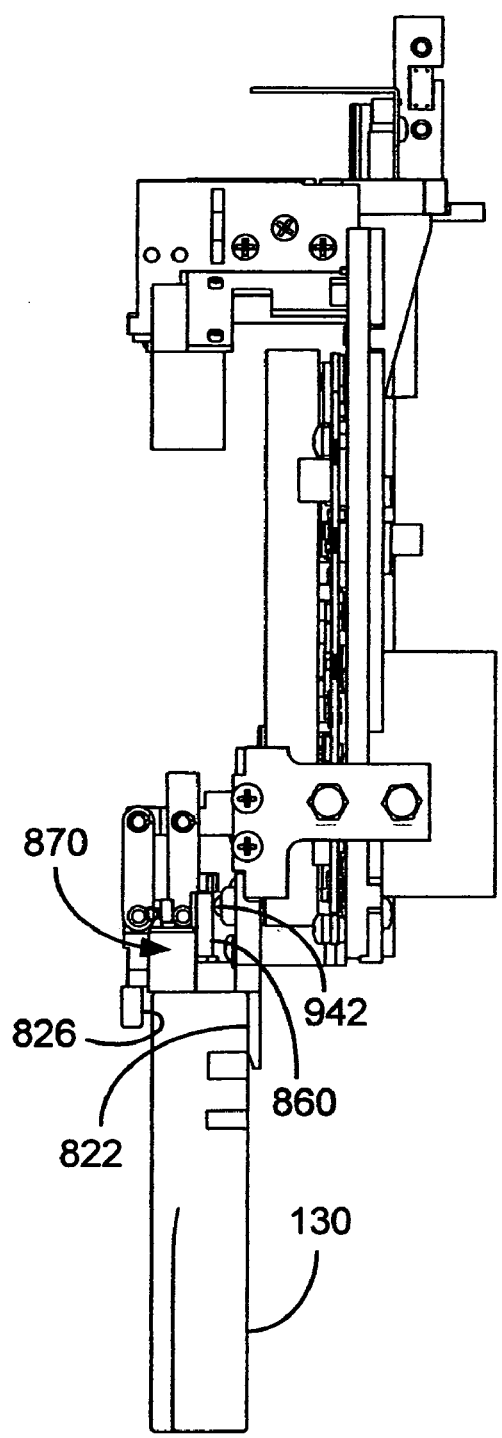
FIG. 15B2

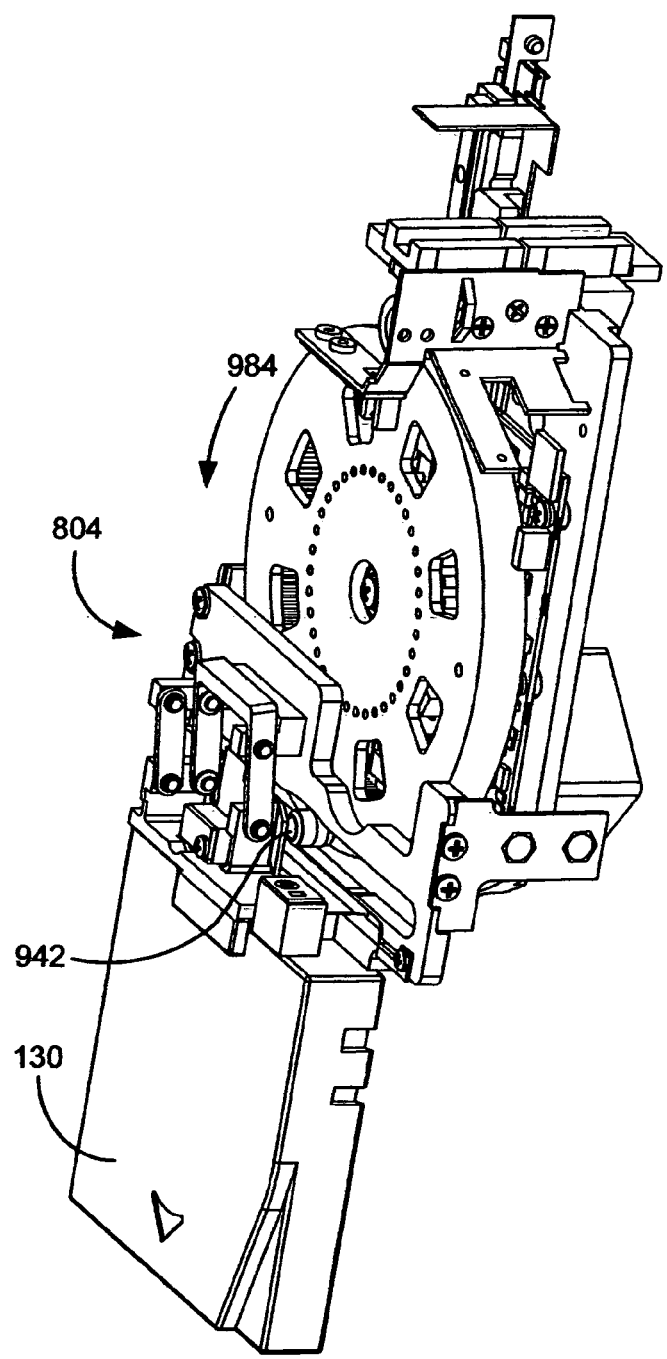
FIG. 15C1

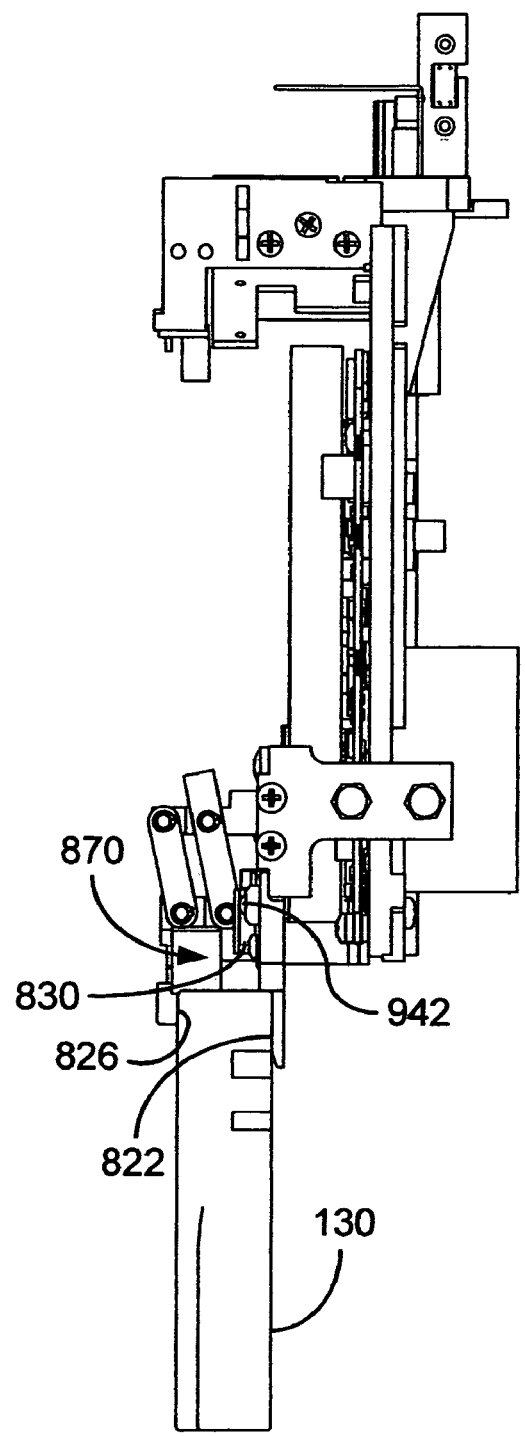
FIG. 15C2

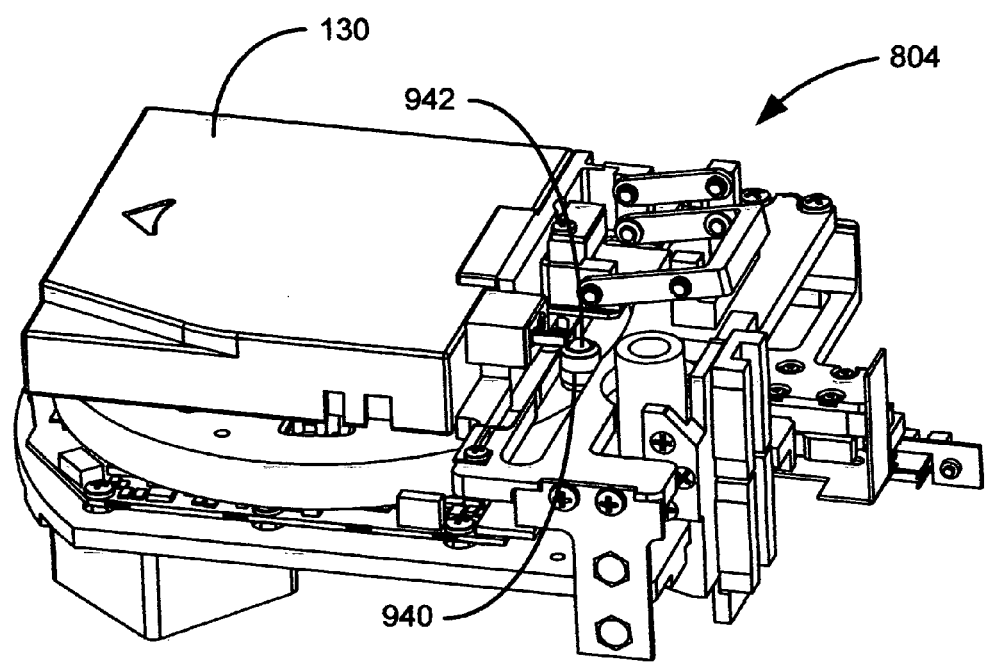
FIG. 15D1

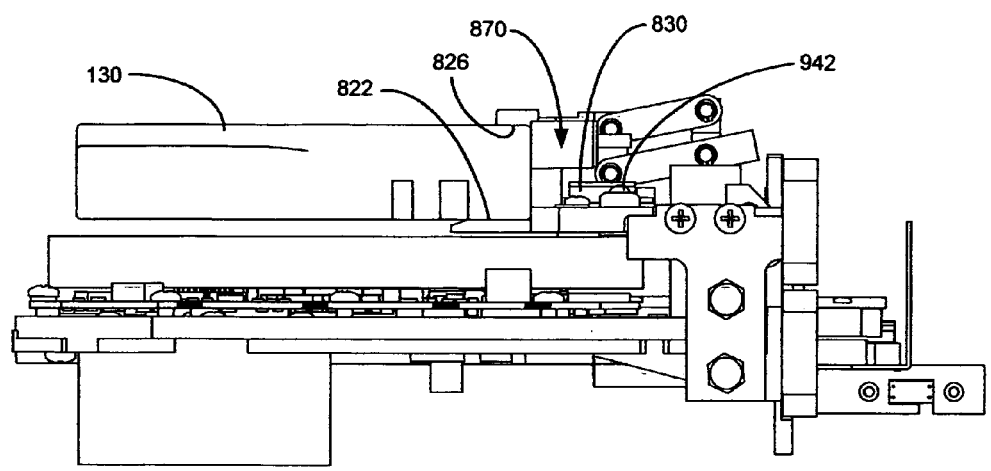
FIG. 15D2

DATA CARTRIDGE LIBRARY INCLUDING A MAGAZINE, A PICKER, AN ELEVATOR, AND A GRASPER

FIELD OF THE INVENTION

The present invention is directed to a data cartridge library that is useful in storing data on a recording medium located in a cartridge and/or retrieving data from a recording medium located in a cartridge.

BACKGROUND OF THE INVENTION

Presently, data cartridge libraries are primarily used to archive data, i.e., store data that is not immediately needed by a host computer, and provide archived data to the host computer when the data is needed. To elaborate, the typical data cartridge library receives data from a host computer and causes the data to be stored or recorded on the recording medium located in one or more cartridges. When the host computer requires some of the data that was previously stored in a data cartridge, a request for the data is sent from the host computer to the library. In response, the library identifies the data cartridge(s) in which the desired data is located, retrieves the data from the recording medium with the cartridge(s), and transmits the retrieved data to the host computer system.

Presently, most data cartridge libraries are comprised of: (a) a frame/chassis/cabinet that defines an interior space; (b) a magazine structure that is located within the interior space and that provides a plurality of data cartridge storage spaces, which are each capable of accommodating at least one data cartridge; (c) one or more drives that are each located within the interior space and capable of writing data onto a recording medium located in a data cartridge and/or reading data from the recording medium located in a data cartridge; (d) a data cartridge transport device that is located within the interior space and capable of moving an individual data cartridge between any one of the plurality of data cartridge storage spaces and any one of the drives within the library; and (e) an interface for receiving data from and transmitting data to a host computer.

Typically, such a data cartridge library is capable of both storing data provided by a host computer and retrieving data previously stored in the library for the host computer. The storage of data involves using the transport device to move a data cartridge from one of the data cartridge storage spaces to a drive, using the drive to write the data provided by the host computer on the recording medium located within the cartridge, and after the data has been written on the recording medium, using the transport device to move the data cartridge from the drive to a data cartridge storage space. The retrieval of data involves using the transport device to move a data cartridge from one of the data cartridge storage spaces to a drive, using the drive to read the data on the recording medium located within the cartridge and provide the read data to the host computer, and after the data has been read from the recording medium, using the transport device to move the data cartridge from the drive to a data cartridge storage space.

As previously noted, a data cartridge library is comprised of a data cartridge transport that is capable of being used to move a data cartridge between any one of the magazine data cartridge storage locations and any one of the drives in the library. Typically, the data cartridge transport device is comprised of a picker and an elevator that moves the picker within the interior space. The picker is capable of inserting/extracting a data cartridge into/from any one of the magazine storage spaces and any one of the drives. Typically, the picker is comprised of: (a) a grasping device that is used to engage a data cartridge and (b) a pusher plate that carries the grasping device and that is capable of movement towards and away from a location that is capable of accommodating a data cartridge. The elevator serves to position the picker adjacent to a location that is capable of accommodating a data cartridge so that the picker can perform an insertion or extraction operation.

In an extraction operation, the elevator is used to position the picker adjacent to a space at which a data cartridge is located (typically, either a storage space associated with the magazine or a drive). After the picker has been positioned, the pusher plate is used to move the grasping device towards the data cartridge. After the grasping device has been positioned, the grasping device is then actuated to grasp the cartridge. At this point, the pusher plate is then moved away from the location at which the data cartridge was located to extract the data cartridge from the space.

In an insertion operation, the elevator is used to position the picker (which is assumed to be grasping a data cartridge) adjacent to the space at which a data cartridge is to be located. After the picker has been positioned, the pusher plate is then used to move the grasping device and the grasped data cartridge towards the space in which the data cartridge is to be located. After the pusher plate and grasping device have positioned the data cartridge in the space, the grasping device releases the data cartridge, and the pusher plate is moved away from the space to retract the grasping device.

Many data cartridge libraries are also comprised of an entry/exit port that allows a user to insert and/or extract a data cartridge from the library without powering down the transport device. To elaborate, absent an entry/exit port, if a user wants to insert/extract a data cartridge into/from a library, the user typically powers down the transport device to avoid being injured by the transport device during the insertion or extraction of the data cartridge. The entry/exit port allows a user to insert/extract a data cartridge into/from the library without being exposed to the transport device. As a consequence, the entry/exit port allows a data cartridge to be inserted/extracted into/from the library without having to power down the transport device. Typically, an entry exit port is comprised of a slot structure that defines at least one slot that is capable of accommodating at least one data cartridge and a device that places the structure in one of two states. In the first state, the device positions the slot structure such that a slot is exposed to the exterior environment. When the structure is in this state, a user can either insert a data cartridge into the slot or remove a data cartridge from the slot, without being exposed to the transport device in either case. In the second state, the device positions the slot structure such that a slot is exposed to the interior of the library and accessible by the transport device, which can either insert a cartridge into the slot or remove a cartridge from the slot. When the structure is in the second state, the user is not exposed to the transport device.

One type of entry/exit port that has evolved is comprised of: (a) a frame or support to/from which a magazine that can accommodate multiple data cartridges can be attached/detached; and (b) a device for placing the frame in one of the states. In the first state, the device positions the frame such that the frame is exposed to the exterior environment. When the structure is in this state, a user can either attach a magazine to the frame or detach a magazine from the frame. Further, the user can either insert/remove one or more data cartridges into/from the magazine. In the second state, the device positions the frame such that any magazine that is attached to the frame is exposed to the transport device. In this state, the transport device can load data cartridges into the magazine or remove data cartridges from the magazine, as needed. When the frame is in either state, a user is substantially shielded from the transport device.

Many data cartridge libraries also have a hinged door that allows a user access to the interior of the library. Typically, such a door is provided so that the transport device can be accessed for maintenance and repair.

SUMMARY OF THE INVENTION

The present invention is directed to a data cartridge library that is comprised of: (a) a frame/chassis/cabinet; (b) a data cartridge magazine that provides a plurality of data cartridge storage spaces that are each capable of accommodating at least one data cartridge; (c) a drive that is capable of writing data onto a recording medium located within a cartridge and/or reading data from a recording medium located in a cartridge; (d) a picker that is capable of being used to insert and extract a data cartridge from a space that is capable of accommodating a data cartridge; and (e) an elevator for moving the picker within the library so that a data cartridge can be transported between any one of the plurality of magazine data cartridge storage spaces and any one of the drives within the library.

In one embodiment, the data cartridge library comprises a picker that is comprised of: (a) a base plate that is operatively connected to an elevator; (b) a grasper that is operatively connected to the base plate and comprised of a pair of members that are capable of being placed in a closed position that is suitable for grasping a data cartridge and an open position that is suitable for releasing a grasped data cartridge; and (c) a crank that is operatively connected to the base plate and capable of rotating about an axis. The picker further comprises a grasper cam structure comprised of a cam driver that is associated with the crank and a cam follower that is associated with the grasper. The cam driver and the cam follower are situated such that rotation of the crank brings the cam driver into contact with the cam follower and, in so doing, places the grasper in one of the closed position and the open position. Unlike known pickers that employ a crank and a cam structure to actuate a grasper, the grasper is placed in a closed position over a first range of rotation of the crank and an open position over a second range of rotation of the crank that substantially does not overlap with the first range of rotation. In one embodiment, the first and second ranges are each about 180 degrees.

In one embodiment, the data cartridge library comprises a picker that is comprised of: (a) a base plate that is operatively connected to an elevator; (b) a grasper that is operatively connected to the base plate and comprised of a pair of members that are capable of being placed in a closed position that is suitable for grasping a data cartridge and an open position that is suitable for releasing a grasped data cartridge; and (c) a crank that is operatively connected to the base plate and capable of rotating about an axis. The picker further comprises a grasper cam structure comprised of a cam driver that is associated with the crank and a cam follower that is associated with the grasper. The cam driver and the cam follower are situated such that rotation of the crank brings the cam driver into contact with the cam follower and, in so doing, places the grasper in one of the closed position and the open position. Unlike known pickers that employ a crank and a cam structure to actuate a grasper, the crank is capable of rotating through more than 180 degrees.

In one embodiment, the crank is capable of rotating through 360 degrees. In a particular embodiment in which the crank is capable of such a rotation, the picker is further comprised of a pusher plate that supports the grasper and a pusher plate cam structure that is used to move the pusher plate towards and away from a space that is capable of accommodating a data cartridge. The pusher plate cam structure is comprised of a pusher plate cam driver that is associated with the crank and a pusher plate cam follower that is associated with the pusher plate. The grasper cam structure and pusher cam structure are situated such that: (a) for 180 degrees of a 360 degree rotation of the crank, the grasper is placed in a closed position and the pusher plate can be moved between a fully retracted and a fully extended position; and (b) for the other 180 degrees of a 360 degree rotation of the crank, the grasper is placed in an open position and the pusher plate can be moved between a fully retracted position and a fully extended position.

In another embodiment, the data cartridge library is comprised of a picker that is, in turn, comprised of a base plate, grasper, crank that is capable of rotation about an axis, and a grasper cam structure. The grasper cam structure is comprised of a cam driver that is associated with the crank and a cam follower that is associated with the grasper. The grasper cam driver has a surface vector that is not substantially perpendicular to the axis or rotation of the crank. In one embodiment, the grasper cam driver comprises a bubble-like or spherical section that has such a surface vector. In a further embodiment, the picker is comprised of a pusher plate and a pusher plate cam structure with a pusher plate cam driver that is associated with the crank. The pusher plate cam driver has a surface vector, in contrast to the grasper cam driver, that is substantially perpendicular to the axis of rotation of the crank. In one particular embodiment, the pusher plate cam structure operates to move the pusher plate in a direction that is substantially perpendicular to the axis of rotation of the crank and the grasper cam structure operates such that the grasper cam follower is displaced in a direction that at least has a component vector that is parallel to the axis of rotation of the crank.

In another embodiment, a data cartridge library is provided that allows a user to readily remove/insert a transport module from/into the library, where the transport module is comprised of a picker and a substantial portion of an elevator. In one embodiment, the library is comprised of: (a) a frame/chassis/cabinet; (b) a data cartridge magazine; (c) a drive; (d) a picker that is capable of being used to insert and extract a data cartridge from a space that is capable of accommodating a data cartridge; and (e) an elevator for moving the picker within the library so that a data cartridge can be transported between any one of the plurality of magazine data cartridge storage spaces and any one of the drives within the library. The library is further comprised of a transport module that is comprised of a support structure, a portion of the elevator that is connected to the support structure, and the picker. A user-actuatable connector is also provided that allows a user to attach the transport module to the frame of the library and to detach the transport module from the frame so that the module can be removed from the library.

In one embodiment of a data cartridge library with a removable/insertable transport module, the elevator is comprised of an elevator carriage that supports the picker, a first drive system for driving one end of the carriage, a second drive system for driving the other end of the carriage, an electric motor that is operatively connected to the first drive system and provides the first drive system with energy for moving the first end of the carriage. The elevator is further comprised of a shaft that connects the first drive system to the second drive system, thereby allowing energy from the motor to be transferred through the first drive system to the second drive system. So that the transport module can be removed from the library, the shaft is capable of be separated into two pieces by actuation of a user-actuatable connector. In one embodiment, the connector is comprised of a spline associated with a free end of one piece of the shaft and a spline collar that is associated with the free end of the other piece of the shaft. By sliding the spline collar away from the spline, the two pieces of the shaft are disconnected to facilitate removal of the transport module from the library. To connect the two pieces of the shaft, the free ends of the shaft are aligned and the spline collar is slide over the spline.

In yet another embodiment, a data cartridge library is provided in which a shaft, rather than a pulley system, is used to connect two drive structures that are used to drive the ends of an elevator carriage that supports a picker. In one embodiment, the library is comprised of: (a) a frame/chassis/cabinet; (b) a data cartridge magazine; (c) a drive; (d) a picker that is capable of being used to insert and extract a data cartridge from a space that is capable of accommodating a data cartridge; and (e) an elevator for moving the picker within the library so that a data cartridge can be transported between any one of the plurality of magazine data cartridge storage spaces and any one of the drives within the library. The elevator is comprised of an elevator carriage that supports the picker, a first drive system for driving one end of the carriage, a second drive system for driving the other end of the carriage, an electric motor that is operatively connected to the first drive system and provides the first drive system with energy for moving the first end of the carriage. The elevator is further comprised of a shaft that connects the first drive system to the second drive system, thereby allowing energy from the motor to be transferred through the first drive system to the second drive system.

In yet another embodiment, a data cartridge library is provided with a door that allows a user access to the interior of the library and that is not constrained to rotate about an axis when moving between open and closed positions. In one embodiment, the library is comprised of: (a) a frame/chassis/cabinet with a top surface, bottom surface, and side surface extending between the top and bottom surfaces; (b) a data cartridge magazine; (c) a drive; (d) a picker that is capable of being used to insert and extract a data cartridge from a space that is capable of accommodating a data cartridge; and (e) an elevator for moving the picker within the library so that a data cartridge can be transported between any one of the plurality of magazine data cartridge storage spaces and any one of the drives within the library. The library is further comprised of a user interface that is associated with the side surface of the frame and is exposed to the exterior environment. In various embodiments, the user-interface comprises an output terminal for providing a user with information relating to the library, an input terminal for allowing a user to interact with the library, an entry/exit port, and combinations of the these elements. The side surface is comprised of a displaceable portion that accommodates the user interface. The displaceable portion is capable of being placed in an "open" condition that allows a user access to the magazine, drive(s), picker and elevator and a "closed" condition that prevents user access to the noted elements. The library further comprises a user-actuatable connector that permits a user to place the displaceable portion in either the open or closed conditions. However, unlike hinged doors, the displaceable portion and the user-actuatable connector do not constrain the displaceable portion to rotate about an axis in moving between open and closed positions. In one embodiment, the user-actuatable connector comprises one or more captured screws that allow the displaceable portion to be detached from the frame to expose the interior of the library or attached to the frame to cover the interior of the library.

In another embodiment, a data cartridge library is provided that has a multi-piece magazine. In one embodiment, the library is comprised of: (a) a frame/chassis/cabinet; (b) a data cartridge magazine; (c) a drive; (d) a picker that is capable of being used to insert and extract a data cartridge from a space that is capable of accommodating a data cartridge; and (e) an elevator for moving the picker within the library so that a data cartridge can be transported between any one of the plurality of magazine data cartridge storage spaces and any one of the drives within the library. In one embodiment, the magazine is a multi-piece structure that forms a channel with a first side, a second side, and a back side that extends between the first and second sides. The first, second and back sides cooperatively define an interior space that is capable of accommodating a plurality of data cartridges. The multi-piece magazine structure is comprised of: (a) a first structure that is in the form of a U-shaped channel that forms portions of the first and second sides of the magazine and the back side of the magazine; (b) a second structure that forms portions of the first and second sides; and (c) a coupler for connecting the first and structures to one another. The first structure also serves as a portion of the frame of the library and, in one embodiment, is made of metal. The second structure is made of the same type of material as the cartridges (typically, plastic) in one embodiment.

The present invention further provides a multi-piece magazine that is suitable for use in a data cartridge library. In one embodiment, the magazine resulting for the joining together of the various pieces forms a channel with a first side, a second side, and a back side that extends between the first and second sides. The first side, second side and back side cooperatively define an interior space that is capable of accommodating a plurality of data cartridges. The multi-piece magazine structure is comprised of: (a) a first structure that forms at least a portion of the back side of the magazine; (b) a second that structure that forms at least portions of the first and second sides; and (c) a coupler for connecting the first and second structures to one another. In one embodiment, the first structure is in the form of a U-shaped channel that forms portions of the first and second sides of the magazine and a substantial portion of the back side of the magazine. The second structure, in addition to providing at least portions of the first and second sides of the magazine, further comprises a pair of end sides that are separated from each other and that each connect the portions of the first and second sides provided by the second structure to one another, thereby forming a closed-loop structure. The coupler connects the first and second structures to one another so as to form a box-like, magazine structure with an open side through which cartridges can be inserted/removed into/ from the magazine structure.

The present invention also provides a magazine that is capable of being attached/detached to/from an entry/exit port structure. The magazine is comprised of: (a) a box structure with a bottom wall and a side wall that extends from the bottom wall to a terminal edge that defines an opening for the insertion/extraction of data cartridges into/from the magazine; (b) a plurality of partitioning structures that partition the interior space of the magazine into a plurality of slots that are each capable of accommodating at least one data cartridge; and (c) a coupling structure that allows the box structure to be attached/detached to/from an entry/exit port structure. In one embodiment, the coupling structure is comprised of a first substantially rigid flange that extends away from a first side wall portion and a second substantially rigid flange that extends away from a second side wall portion that is separated from and substantially parallel to the first side wall portion. In one embodiment, the first and second flanges are located in an asymmetric manner so that the box structure can only be mounted to the entry/exit port structure in a particular orientation.

The present invention further provides a data cartridge library with an entry/exit port that has a frame that can be readily attached and detached to facilitate maintenance of the entry/exit port. In one embodiment, the library is comprised of: (a) a frame/chassis/cabinet; (b) a data cartridge magazine; (c) a drive; and (d) a transport assembly that is capable of moving a data cartridge between any one of the plurality of magazine data cartridge storage spaces and the drive. The library is further comprised of an entry/exit port for moving entry/exit port magazines between an exterior environment and an interior environment of the library where the magazine is accessible to the transport device. In one embodiment, the entry/exit port comprises a mount to which a magazine can be attached and from which a magazine can be detached, a guide structure for constraining the movement of the mount between a first position at which a user can attach/detach a magazine to/from the mount and a second position at which the transport assembly is capable of inserting/removing a data cartridge into/from a magazine attached to the mount, and a motive device for providing the motive force for moving the mount between the first and second positions. The entry/exit port further comprises a "stop" structure that is attached to the mount and operates to prevent the mount from being moved beyond the first position. A quick release structure allows the stop structure to be quickly detached from the mount so that the mount can be readily removed from the library.

The present invention also provides a data cartridge library with a drive bay that is capable of accommodating a full-height drive and being altered to accommodate two, half-height drives. In one embodiment, the library is comprised of: (a) a frame/chassis/cabinet; (b) a data cartridge magazine; and (c) a transport assembly that is capable of moving a data cartridge between any one of the plurality of magazine data cartridge storage spaces and any one of the drives within the library. The library is further comprised of a drive bay that provides a full-height drive space that is capable of accommodating a full-height drive and a partition mount for supporting a partition that allows the full-height drive space to be divided into two, half-height drive spaces that are each capable of accommodating a half-height drive. In one embodiment, the full-height drive space is capable of: (a) accommodating a full-height drive that is located within a full-height drive sled; or (b) when a partition engages the partition mount, accommodating two, half-height drives that are each located within a half-height drive sled. In other embodiments, the library is further comprised of combinations of full-height and half-height drives located in the drive bay.

The present invention also provides a data cartridge library with a universal bay that is capable of accommodating one of more electronic devices that are not necessary to the operation of the library but can be used to enhance or supplement the operation of the library. In one embodiment, the library is comprised of a frame/chassis/cabinet that defines an interior space. The interior space is partitioned into: (a) a data cartridge space that provides storage locations for all of the cartridges that the library is capable of storing; (b) a drive space that provides locations for all of the drives that the library is capable of supporting; (c) a transport assembly space for accommodating the movement of a picker and elevator in moving a data cartridge between any one of the data cartridge storage locations and any one of the drives within the library; (d) a power supply space for housing all of the power supplies that the library is capable of supporting; and (e) circuitry space for housing circuitry that is used to distribute power within the library and control the operation of the transport assembly. The library is further comprised of a universal bay that defines a universal space which can be used to house circuitry other than the circuitry located in the circuitry space and does not comprise any of the other noted spaces. In one embodiment, the universal bay comprises a partition mount that is capable of supporting a partition that is used to divide the universal space into subsidiary spaces, each capable of accommodating circuitry that enhances or supplements the operation of the library.

BRIEF DESCRIPTION OF THE DRAWINGS

FIGS. 15A1–15D2 illustrate the operation of the picker in grasping an LTO tape cartridge.

DETAILED DESCRIPTION

Figure 1A:
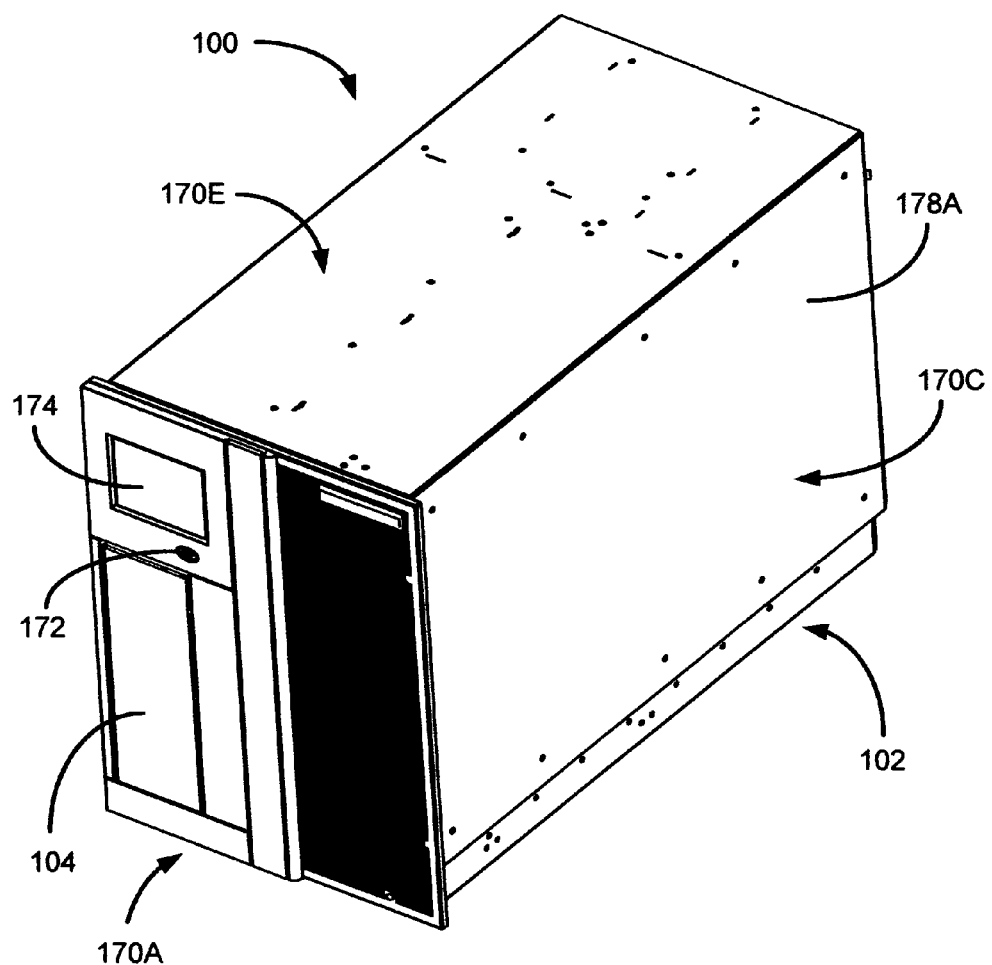
FIGS. 1A–1B illustrate the exterior of an embodiment of a data cartridge library that is capable of processing LTO tape cartridges.

With reference to FIGS. 1A, 1B and 2 and 7E, an embodiment of a data cartridge library 100 (hereinafter referred to as "library 100") is described. Generally, the library 100 is comprised of: (a) a frame/chassis/cabinet 102 that defines an interior space for containing components comprised by the library 100; (b) entry/exit port 104 for moving data cartridges 130 into and out of the library 100; (c) a magazine structure 106 for providing a plurality of data cartridge storage spaces 422 that are each capable of accommodating at least one data cartridge, such as the LTO cartridge 130 of FIGS. 3A and 3B which will generally be used herein for illustrative purposes; (d) a drive bay 108 for housing a plurality of drives 110; (e) a plurality of drives 110 located in a drive bay 108, with each drive 100 capable of writing/reading data onto/from a recording medium located in a cartridge 130; (f) a transport system 112 for moving a data cartridge 130 between any one of the data cartridge storage spaces 422 provided by the magazine structure 106 and any one of the drives 108; (g) a power supply/control module bay 114 for housing at least one power supply, such as power supply 116A, and associated control circuitry that is deemed necessary to the operation of the library 100; (h) a pair of power supplies 116A, 116B that are each located in the power supply/control module bay 114; (g) a library control module 118 located in the power supply/control module bay 114; and (h) a universal bay 120 for housing electronic circuitry that enhances or supplements the operation of the library 100 but is not deemed necessary to the operation of the library 100.

Before describing the library 100 in greater detail, the data cartridges 130 that the library 100 is adapted to manipulate are described. The library 100 is adapted for storing and retrieving data to and from magnetic tape cartridges 130. Specifically, the library 100 is adapted for storing and retrieving data to and from cartridges that conform to the following cartridge formats: (a) LTO (Linear Tape Open) 130 and (b) DLT (Digital Linear Tape) 150. It should, however, be appreciated that the library 100 can be adapted to store data to and from a magnetic tape cartridge that conforms to other cartridge formats, such as AIT (Advanced Intelligent Tape), SAIT (Super Advanced Intelligent Tape), Travan, and the like. Further, as can be appreciated by a skilled artisan the library 100 can be adapted to store data to and from cartridges that contain other types of recording mediums, such as magnetic disk, optical disk and optical tape media.

Figure 3A:
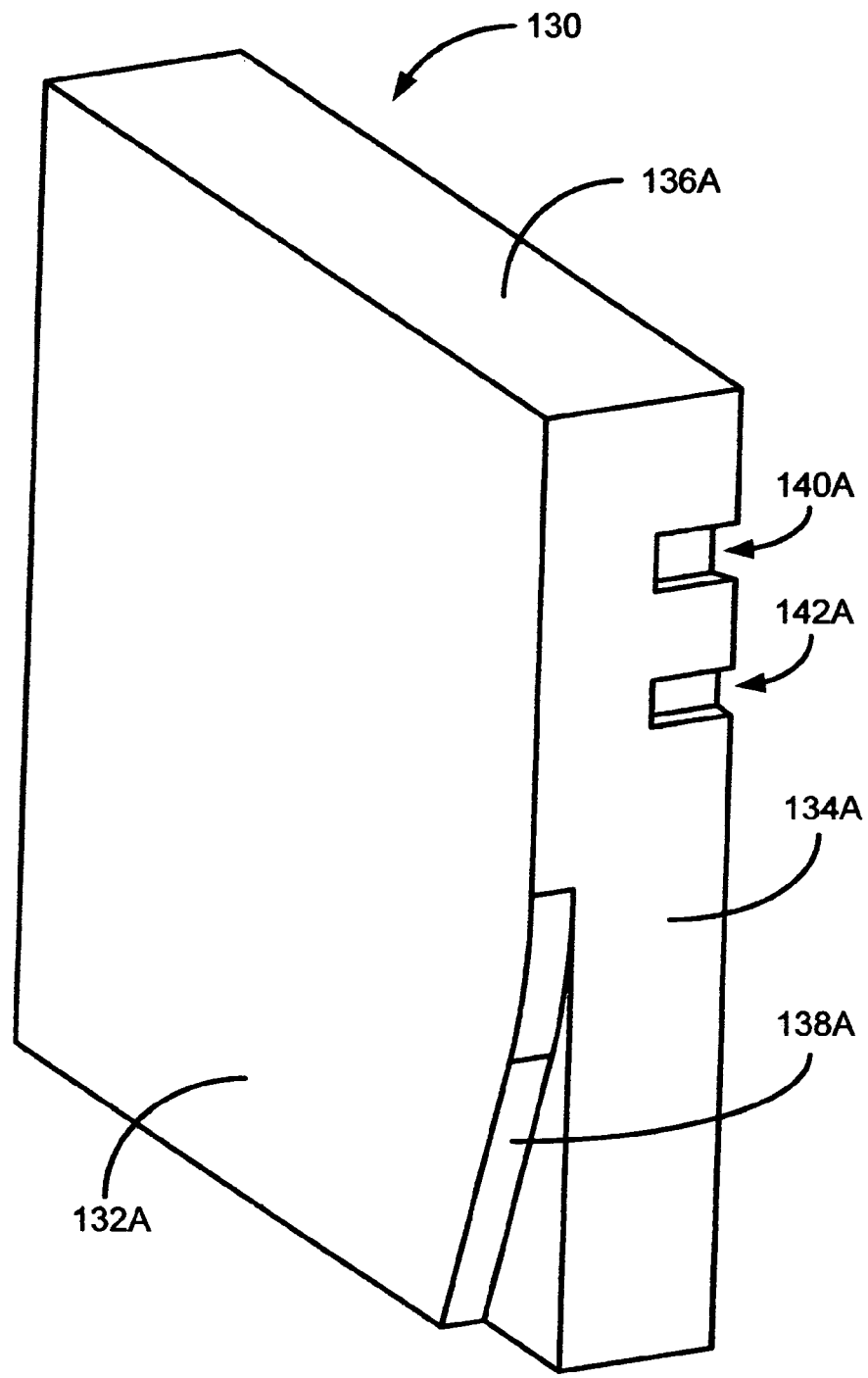
FIGS. 3A–3B illustrates an LTO tape data cartridge.
Figure 3B:
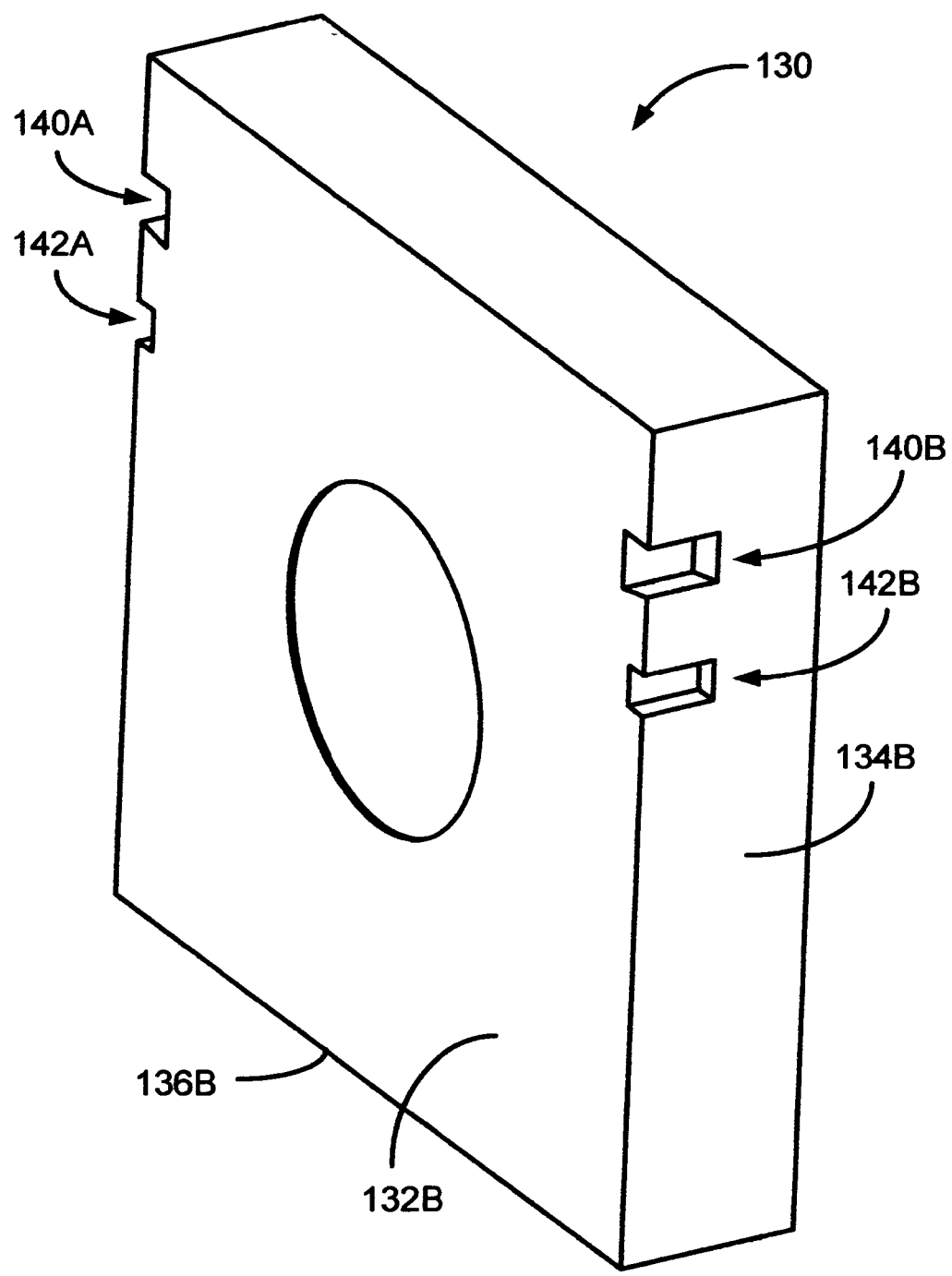
Figure 7A:
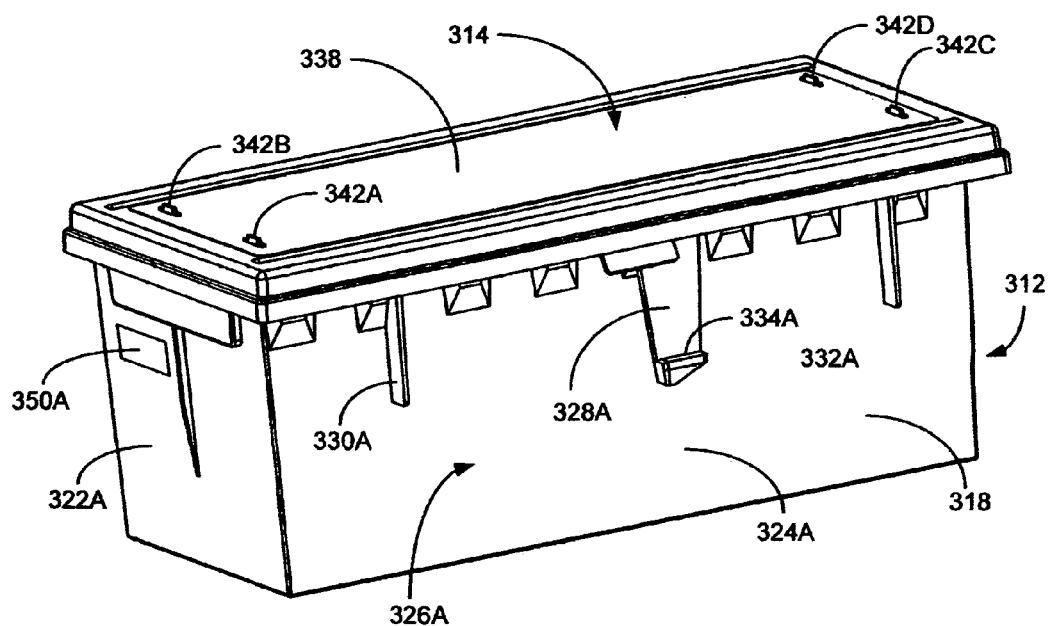
FIGS. 7A–7F illustrate a cartridge magazine that can be attached/detached to/from the entry/exit port illustrated in FIGS. 6A–6C and portions of the magazine.

With reference to FIGS. 3A–3B, an LTO tape cartridge 130 comprises a first cartridge face 132A, a second cartridge face 132B, a first cartridge side 134A, a second cartridge side 134B, a first cartridge end 136A, and a second cartridge end 136B. The distance between the first and second cartridge faces 132A, 132B defines the height of the cartridge 130, which is 0.85 in. The distance between the first and second side surfaces 134A, 134B defines the width of the cartridge 130, which is 4.15 in. The distance between the first and second ends 136A, 136B defines the depth of the cartridge 130, which is 4.02 in. The cartridge 130 further comprises an orientation feature 138 that provides a basis for properly orientating the cartridge 130 for insertion in to an accomodating LTO tape drive (not shown) so that data can be read from and/or written to the recording medium (not shown) within the cartridge 130. The orientation feature 138 also provides a basis for orienting all of the LTO tape cartridges 130 stored within the library 100 in the same manner. The cartridge 130 also comprises a first pair of gripper notches 140A, 140B and a second pair of gripper notches 142A, 142B, with one or both pair of notches typically used by a device that grips the cartridge 130 during transport between a magazine, as shown in FIG. 7A for example, and a drive 110.

Figure 4A:
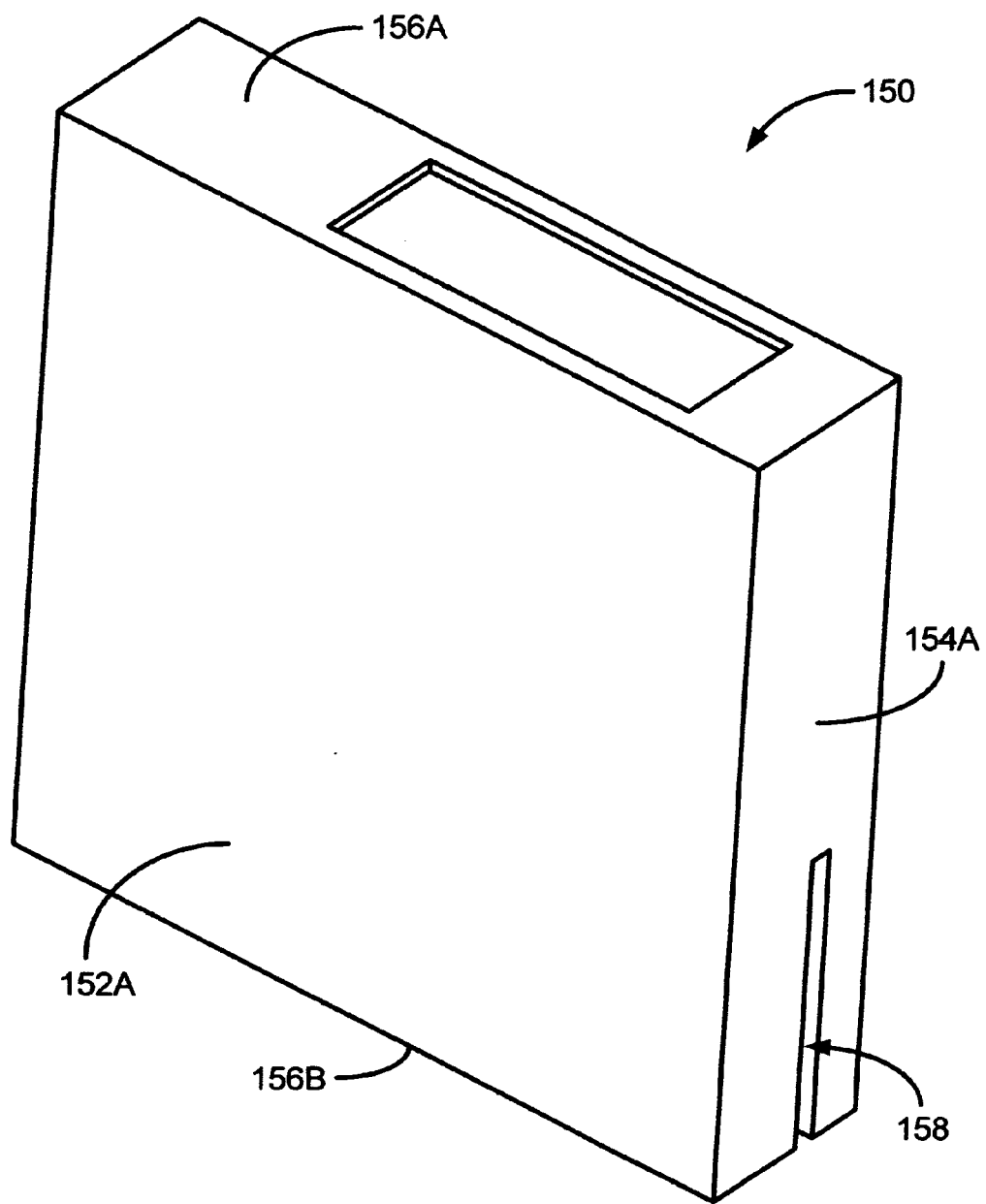
FIGS. 4A–4B illustrate a DLT tape data cartridge.
Figure 4B:
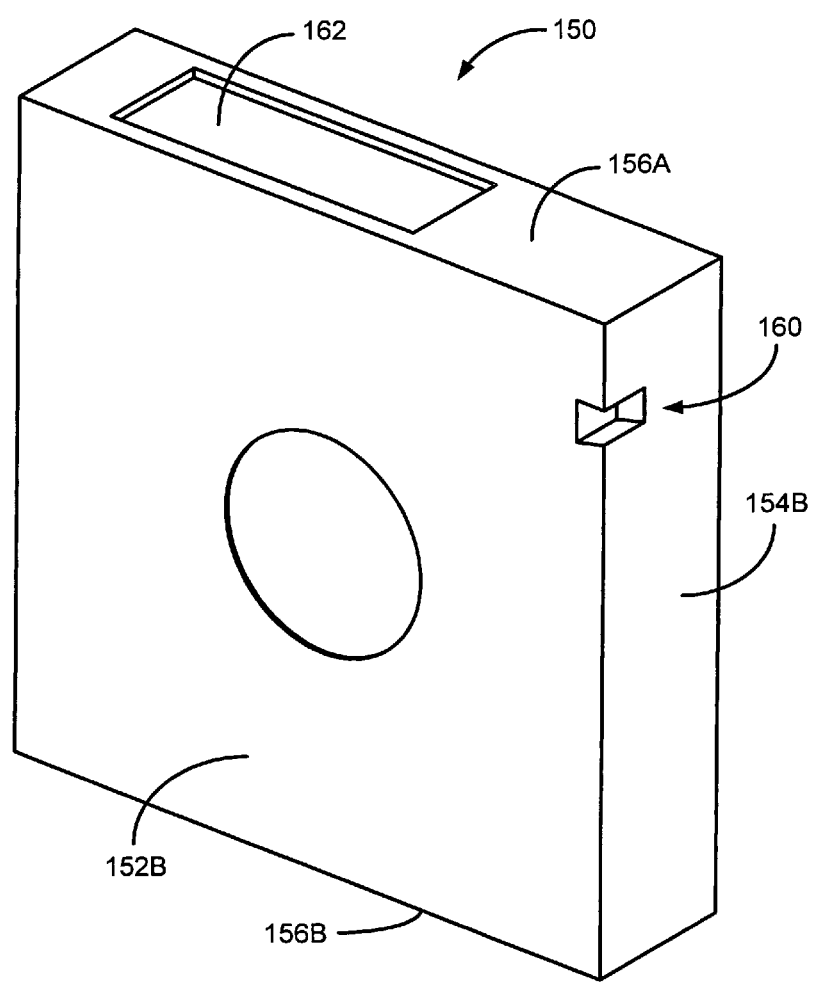

With reference to FIGS. 4A–4B, a DLT tape cartridge 150 comprises a first cartridge face 152A, a second cartridge face 152B, a first cartridge side 154A, a second cartridge side 154B, a first cartridge end 156A, and a second cartridge end 156B. The distance between the first and second cartridge faces 152A, 152B defines the height of the cartridge 150, which is 1.00 in. The distance between the first and second side surfaces 154A, 154B defines the width of the cartridge 150, which is 4.15 in. The distance between the first and second ends 156A, 156B defines the depth of the cartridge 150, which is 4.16 in. The cartridge 150 further comprises an orientation feature 158 that provides a basis for properly orientating the cartridge 150 for insertion into a DLT tape drive (not shown) so that data can be read from and/or written to the recording medium (not shown) within the cartridge 150. The orientation feature 158 in an actual DLT cartridge 150 is somewhat more complex than the feature shown in FIG. 4A. The orientation feature 158 also provides a basis for orienting all of DLT tape cartridges 150 stored in the library 100 in the same manner. The cartridge 150 also comprises a single gripper notch 160, which is typically used by a device that grips the cartridge 150 during transport between a magazine, as shown in FIG. 7A for example, and a drive 110. The DLT tape cartridge 150 further comprises a recess 162 in the first end 156A where a label can be disposed, such as a bar-code label capable of being used to identify the cartridge 150.

Figure 1B:
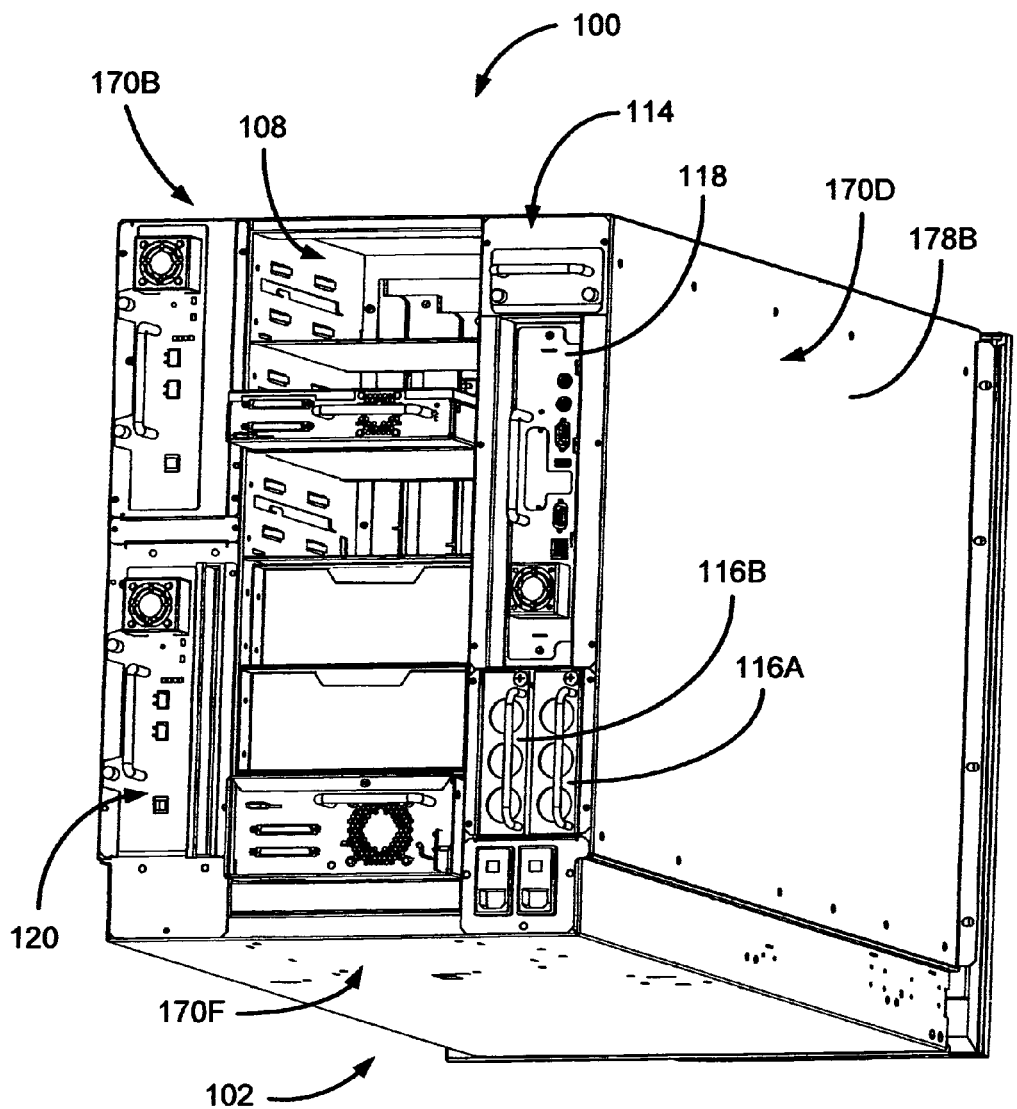

With reference to FIGS. 1A–1B, the library 100 comprises a front side 170A, a rear side 170B, a first lateral side 170C, a second lateral side 170D, a top side 170E, and a bottom side 170F.

Associated with the front side 170A of the library 100 is the entry/exit port 104 and a power button 172 that allows a user to control the application of electrical power from the power supplies 116A, 116B to components comprised by the library 100. Also associated with the front side 170A is a touch screen 174 that is used to output information relating to the library 100 to a user and to allow a user to input information (e.g., commands) to the library 100. Other types of input and output peripherals can be used in place of the touch screen 106. In one example, the screen 174 can be provided to output information to a user and a keyboard (not shown) can be provided to allow a user to input information. As shown in conjunction with FIG. 5A, a front panel 176 providing openings 206A–206C that respectively accommodate the entry/exit port 104, the power button 172 and the touch screen 172 is also associated with the front side 170A. The front panel 176 is capable of being removed by a user to allow the user to access the interior of the library 100.

Associated with the rear side 170B of the library 100 is access to the space within the drive bay 108, which allows a user to insert/remove a drive 110 into/from the drive bay 108. User access to the power supply/control module bay 114 is also associated with the rear side 170B. As shown in conjunction with FIG. 10B, a user can insert/remove a power supply, such as 116A, and/or insert/remove a library control module 536 via the access provided to the power supply/control module bay 114 at the rear side 170B. Also associated with the rear side 170B is access to the space within the universal bay 120. In the embodiment of the library 100 illustrated in FIG. 1B, a pair of quad-interface processors (not shown) are resident in the space defined by the universal bay 170B.

The first lateral side 170C comprises a cosmetic exterior skin 178A. Underlying the skin 178A is: (a) a side portion 180A of a top tray 182, (b) a side portion 184A of a bottom tray 186, and (c) portions of the magazine structure 106 that connect the side portion 180A and the side portion 184A. The side portion 184A also accommodates a rail that facilitates rack mounting of the library 100. Similarly, the second lateral side 170D comprises a cosmetic exterior skin 178B. Underlying the skin 178B is: (a) a side portion 180B of a top tray 182, (b) a side portion 184B of a bottom tray 186, and (c) portions of the magazine structure 106 that connect the side portion 180B and the side portion 184B. The side portion 184B also accommodates a rail that facilitates rack mounting of the library 100.

The top side 170E comprises a mid-portion 188 of the top tray 182 that extends between the side portions 180A, 180B. Similarly, the bottom side 170F comprises a mid-portion 190 of the bottom tray 186.

The top tray 182, bottom tray 186, and the portions of the magazine structure 106 that connect the top tray 182 and the bottom tray 186 form the frame 102, i.e., the structure that supports the other elements of the library 100 and defines an interior space in which the other elements of the library 100 reside. It should be appreciated that other frame structures are also feasible.

Figure 5A:
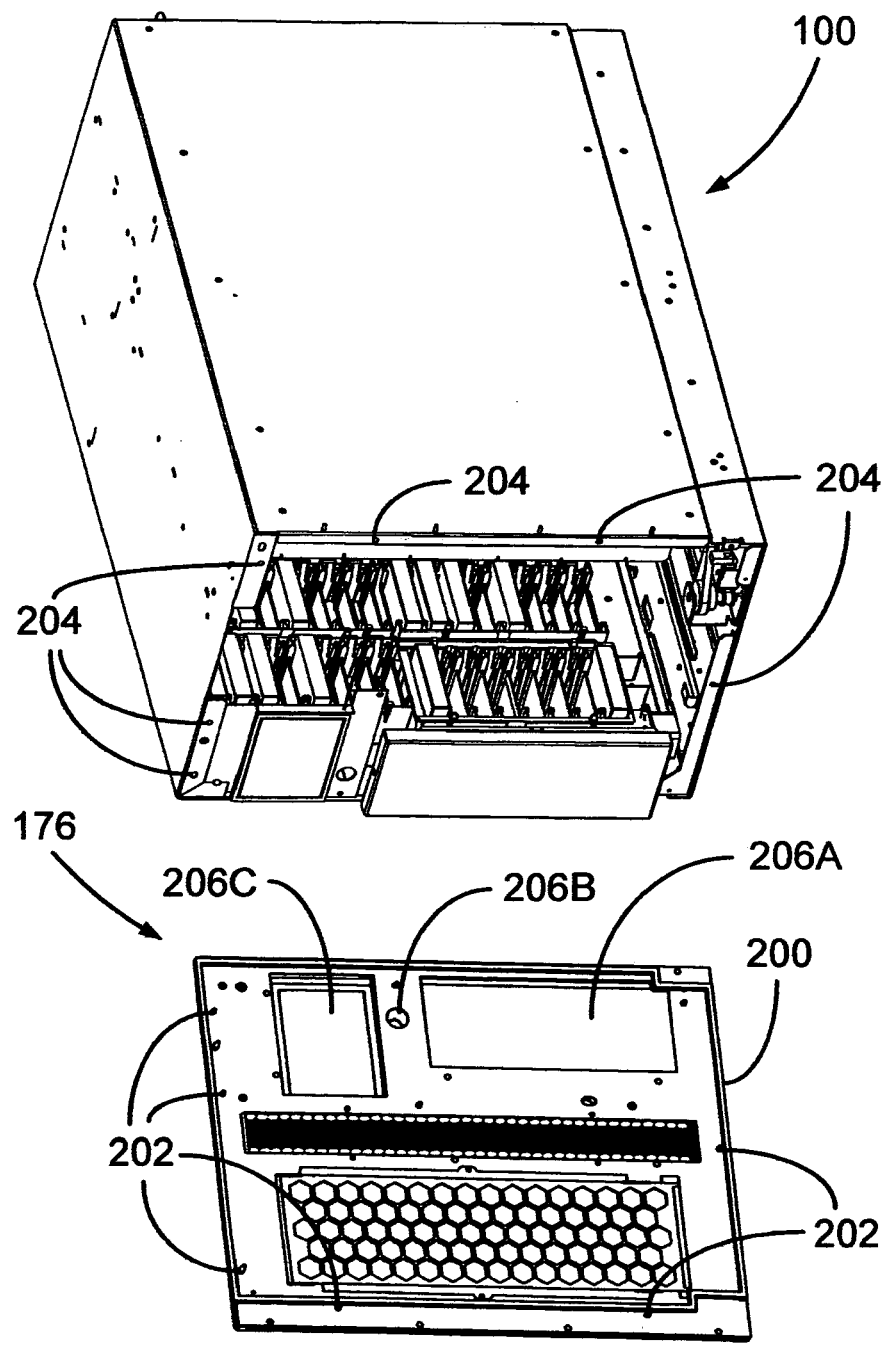
FIGS. 5A–5B illustrate a displaceable portion of the side of the housing of library shown in FIGS. 1A–1B that allows a user to access the interior of the library.
Figure 5B:
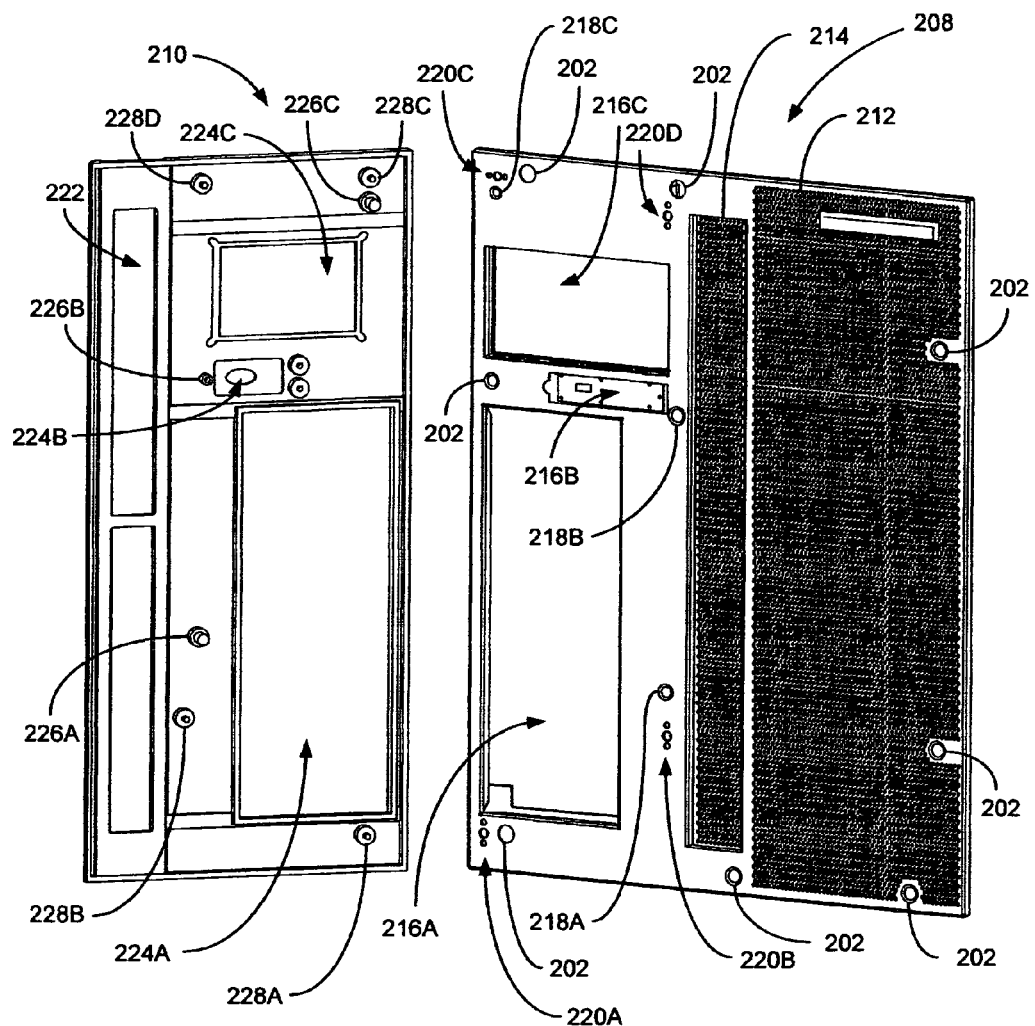

With reference to FIGS. 5A–5B, the removable front panel 176 is described in greater detail. Generally, the removable front panel 176 comprises a panel structure 200 and a plurality of captured screws 202, i.e. screws that can be actuated to attach/detach the front panel 176 from the remainder of the library 100 but that remain attached to the panel structure 200 to prevent loss. A plurality of threaded holes 204, each for engaging one of the captured screws 202, are associated with portions of the library other than the front panel 176. When the front panel 176 is in place, as shown in FIG. 1A, each of the captured screws 202 is accessible to a user and engages one of the threaded holes 204, thereby placing the front panel 176 in a "closed" state that prevents a user from accessing the interior of the library 100 via the opening covered by the front panel 176. If a user wants to access the interior of the library 100, the captured screws 202 are actuated to disengage the screws 202 from the threaded holes 204. After all of the captured screws 202 have been disengaged from the threaded holes 204, the front panel 176 can be removed to expose the interior of the library 100. As shown in conjunction with FIG. 13A, the opening provided by removal of the front panel 176 is sufficient to allow a transport module 740 comprised of a picker 580 and a substantial portion of an elevator 582 and an associated tray 670 to be inserted/removed into/from the interior of the library 100. The front panel 176 also defines openings 206A–206C that respectively accommodate the exit/entry port 104, the power button 172, and the touch screen 174.

With reference to FIG. 5B, the front panel 176 is comprised of a sheet metal portion 208 and a plastic portion 210 that is readily attached/detached to/from the sheet metal portion 208 to expose at least some of the captured screws 202. The sheet metal portion 208 supports all of the captured screws 202. Additionally, the sheet metal portion 208 is comprised of: (a) a first screen portion 212 that allows air to flow from the exterior environment into the interior of the library 100 to cool components located therein but prevents electro-magnetic radiation from escaping from the interior of the library 100; (b) a second screen portion 214 that permits a user to view the interior of the library 100 when the front panel 176 is in the closed state but prevents electro-magnetic radiation from escaping from the interior of the library 100; (c) openings 216A, 216B and 216C that respectively form portions of the openings 206A, 206B and 206C; (d) locator pin holes 218A, 218B and 218C that cooperate with locator pins 226A, 226B and 226C, respectively, that are associated with the plastic portion 210 to facilitate the mating of the plastic portion 210 to the sheet metal portion 208; and (e) socket portions 220A, 220B, 220C and 220D of ball-and-socket clips (aka Tinneman clips) 228A, 228B, 228C and 228D that are used to attach/detach the plastic portion 210 to the sheet metal portion 208.

The plastic portion 210 comprises: (a) a window 222 that, when the plastic portion 210 is properly mated with the sheet metal portion 208, is located adjacent to the second screen portion 214 of the sheet metal portion 208; (b) openings 224A, 224B and 224C that cooperate with the openings 216A, 216B and 216C to form the openings 206A, 206B and 206C when the plastic portion 210 is properly mated with the sheet metal portion 208; (c) locator pins 226A, 226B and 226C that cooperate with the locator pin holes 218A, 218B and 218C to facilitate alignment of the plastic portion 210 with the sheet metal portion 208 when mating the plastic portion 210 to the sheet metal portion 208; (d) balls 228A, 228B, 228C and 228D for engaging the sockets 220A, 220B, 220C and 220D associated with the sheet metal portion 208 to facilitate attachment/detachment of the plastic portion 210 to/from the sheet metal portion 208.

Figure 2:
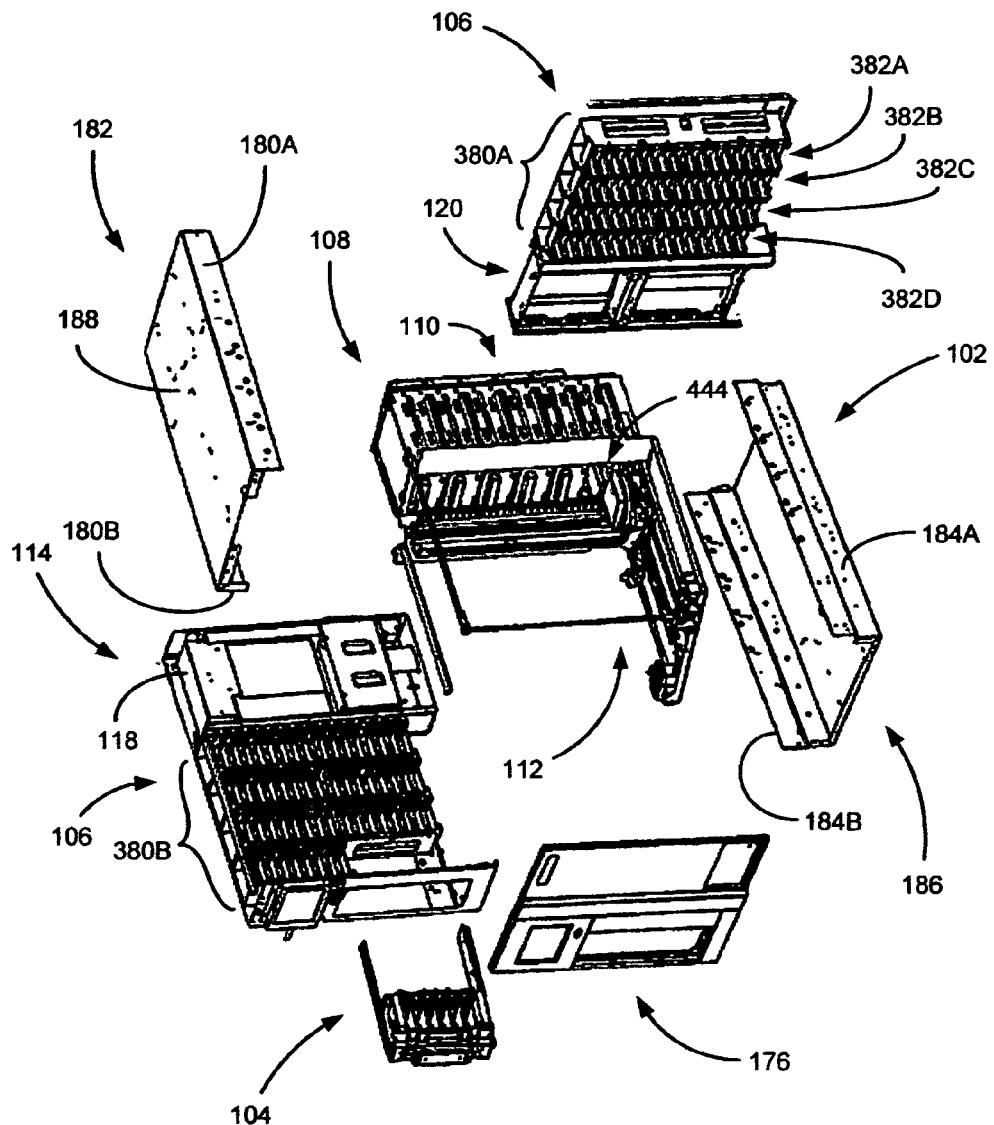
FIG. 2 is an exploded view of the embodiment of the data cartridge library illustrated in FIGS. 1A–1B.
Figure 6A:
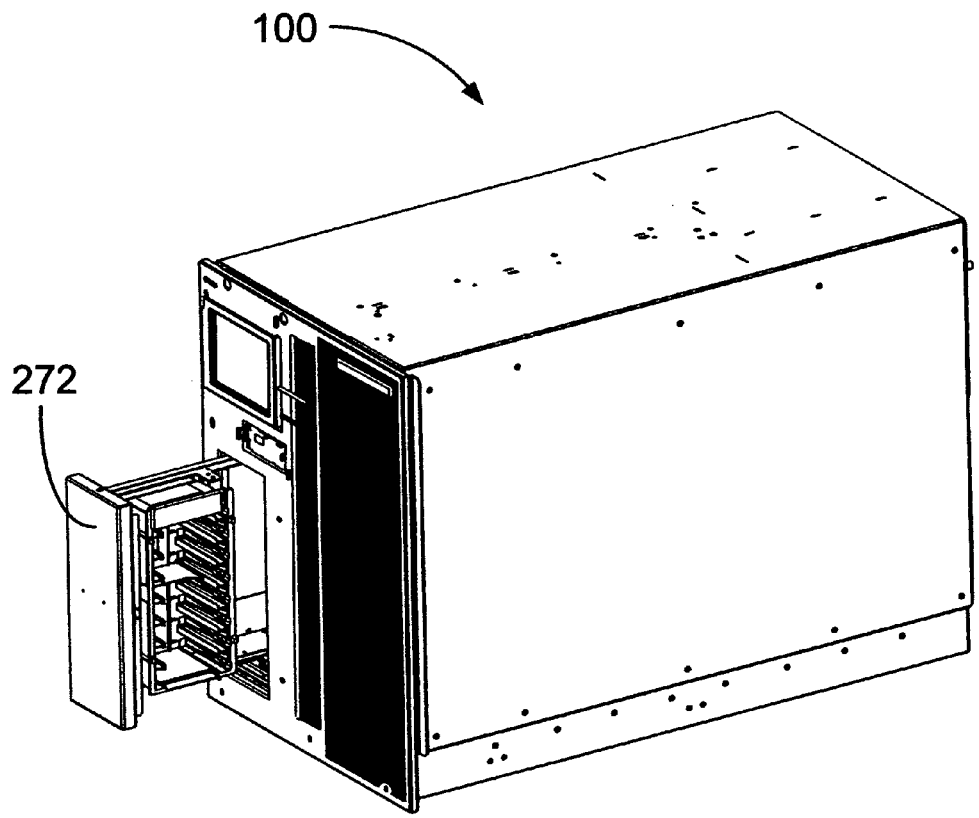
FIGS. 6A–6C illustrate an entry/exit port associated with the data cartridge library illustrated in FIGS. 1A–1B.
Figure 6B:
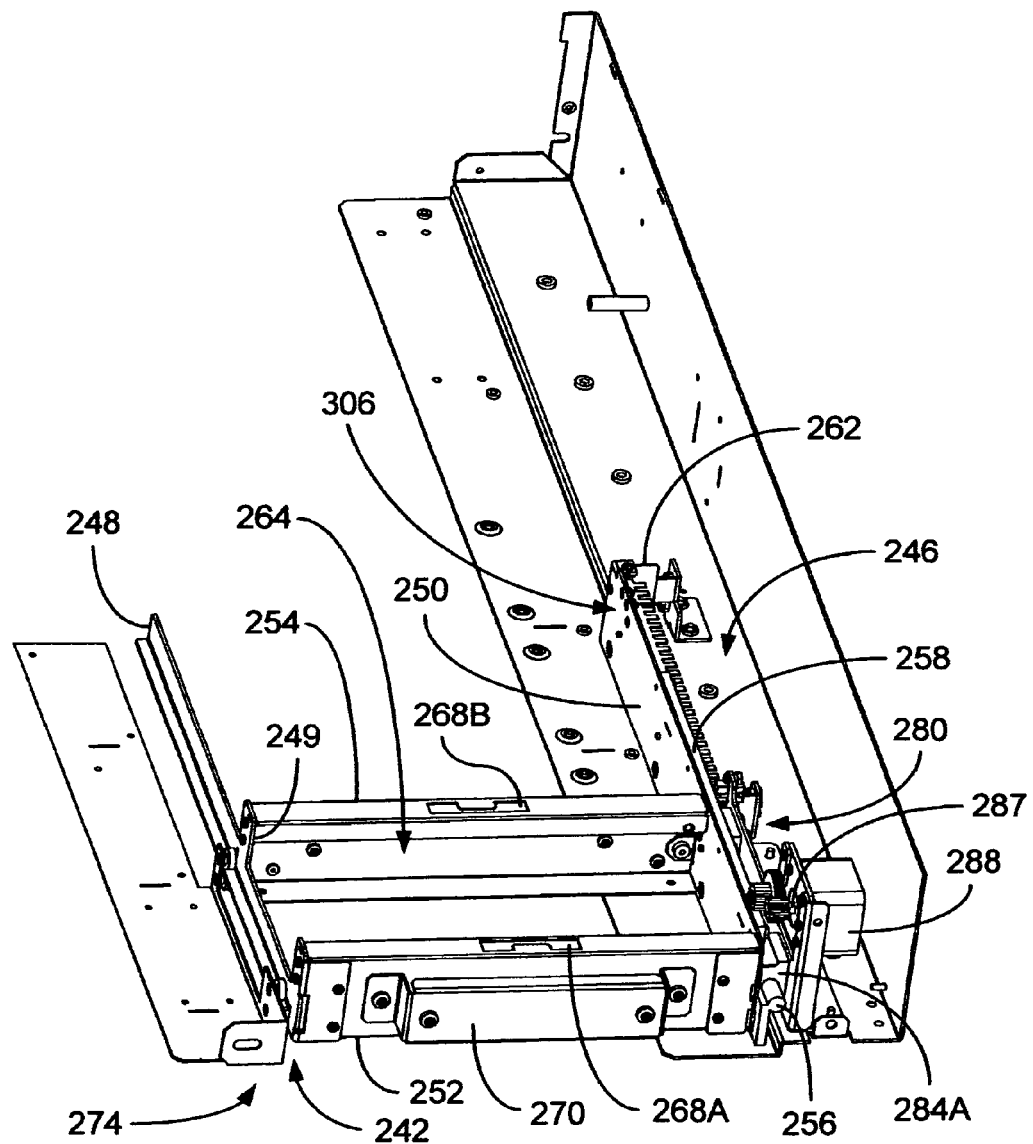
Figure 6C:
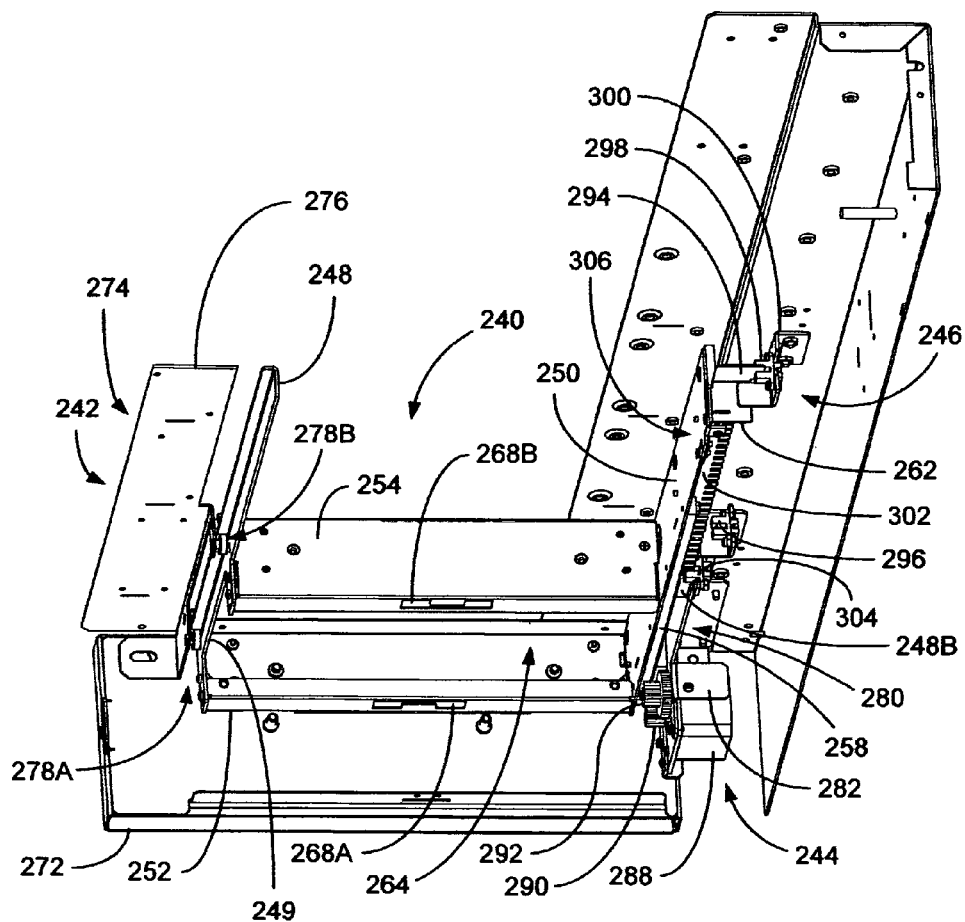

With reference to FIGS. 6A–6C in conjunction with FIG. 1A, 2 and the magazine 310 of FIG. 7A, the entry/exit port 104 is of a type that moves a magazine frame 240 or mount between an "open" position, as shown in FIG. 6A, and a "closed" position as shown in FIG. 1A. When the magazine frame 240 is in the "open" position, a user can attach a magazine, in this embodiment an entry/exit port magazine 310 to the magazine frame 240. Further, if a magazine 310 is attached to the magazine frame 240 and the magazine frame 240 is in the open position, a user can insert a data cartridge 130 into the library 100 by placing a data cartridge 130 in one of the slots 354 of the magazine 310 (either before or after the magazine 310 is attached to the magazine frame 240) and then causing the magazine frame 240 to move to the "closed" position. After the magazine frame 240 is in the "closed" position, the data cartridge 130 is accessible to the transport assembly 112. Consequently, if desired, the transport assembly 112 can be used to move the data cartridge 130 to any space within the library 100 that is accessible to the transport assembly 112 and capable of storing the data cartridge 130. One advantage of employing a magazine 310 is that the magazine 310 can be populated with multiple data cartridges 130, thereby allowing multiple data cartridges 130 to be loaded into the library 100 at one time.

If on the other hand, a magazine 310 is attached to the magazine frame 240 and a user wants to remove a data cartridge 130 from the library 100, the magazine frame 240 is placed in the "closed" position. If the desired data cartridge 130 is not already in the magazine 310, the transport assembly 112 is used to move the desired data cartridge 130 to the magazine 310. After the desired data cartridge 130 is loaded into the magazine 310, the magazine frame 240 is caused to move from the "closed" position to the "open" position so that the user can remove the desired data cartridge 130 from the magazine 310. One advantage of employing a magazine 310 is that multiple data cartridges 130 can be removed from library 100 at one time, either by removing the cartridges 130 from the magazine 310 or disengaging the magazine 310 from the magazine frame 240.

With continued reference to FIGS. 6A–6C, the entry/exit port 104 is comprised of: (a) a magazine frame 240; (b) a guide structure 242 for supporting the magazine frame 240 and guiding the magazine frame 240 between "open" and "closed" positions; (c) a drive mechanism 244 for applying a motive force to the magazine frame 240 to drive the magazine frame 240 between the "open" and "closed" positions; and (d) a sensor system 246 for use in determining when the magazine frame 240 is in the "open" position and when the magazine frame 240 is in the "closed" position.

With continuing reference to FIGS. 6B–6C, the magazine frame 240 is comprised of: (a) a top guide channel 248; (b) a bottom bracket 250; (c) a front side bracket 252 that is attached to the top guide channel 248 and the bottom bracket 250; (d) a back side bracket 254 that is attached to the top guide channel 248 and the bottom bracket 250; (e) a bottom rail 256 that is operatively attached to the bottom bracket 250; (f) a rack 258 that is operatively attached to the bottom bracket 250; and (g) a stop 262, operatively attached to the bottom bracket 250, for preventing the drive mechanism 244 from driving the magazine frame 240 beyond the "open" and "closed" positions.

The front side bracket 252, back side bracket 254, a portion of the top guide channel 248 and a portion of the bottom bracket 250 form a magazine receptacle 264 for receiving a magazine 310.

Figure 7B:
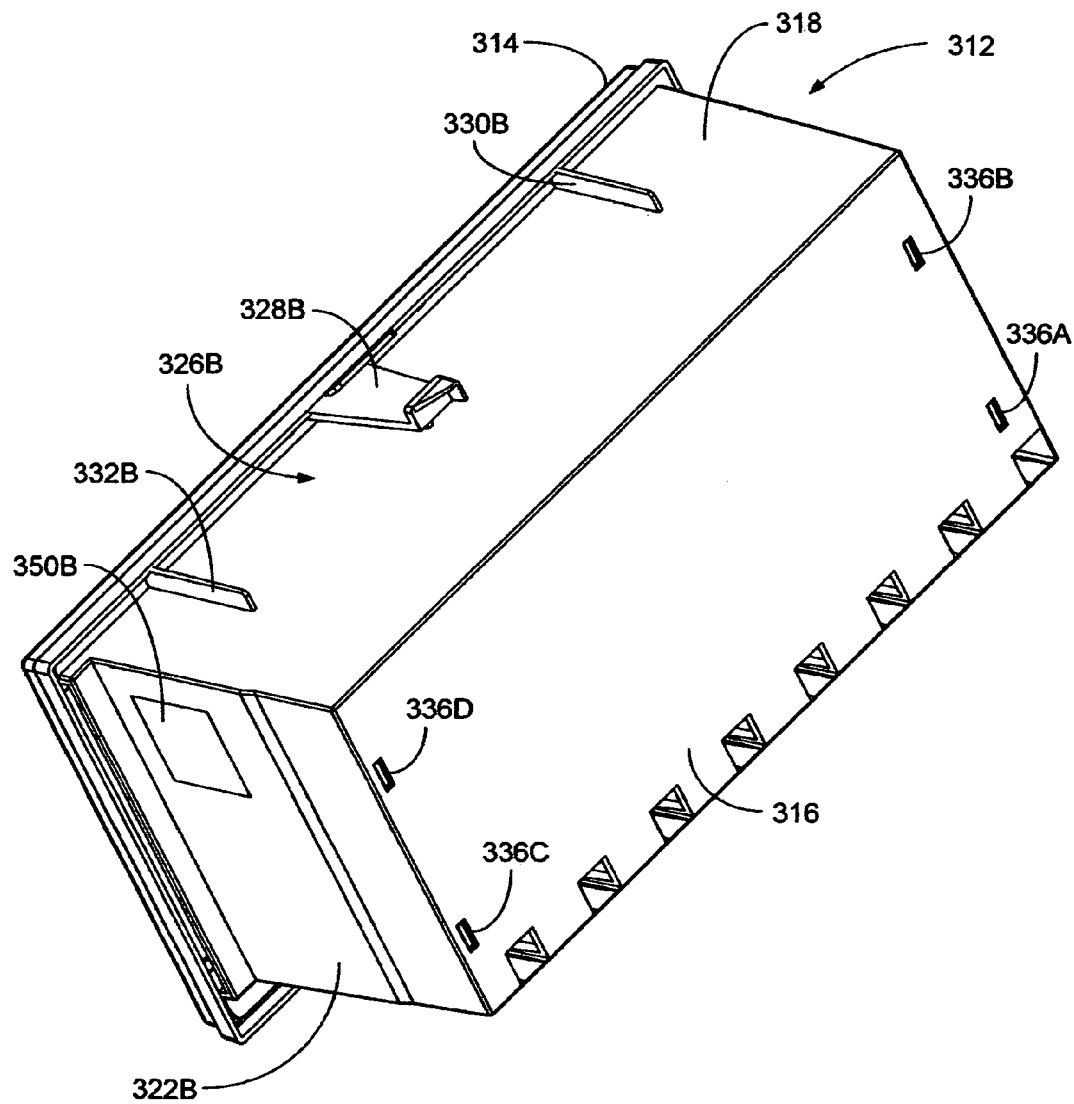
Figure 7C:
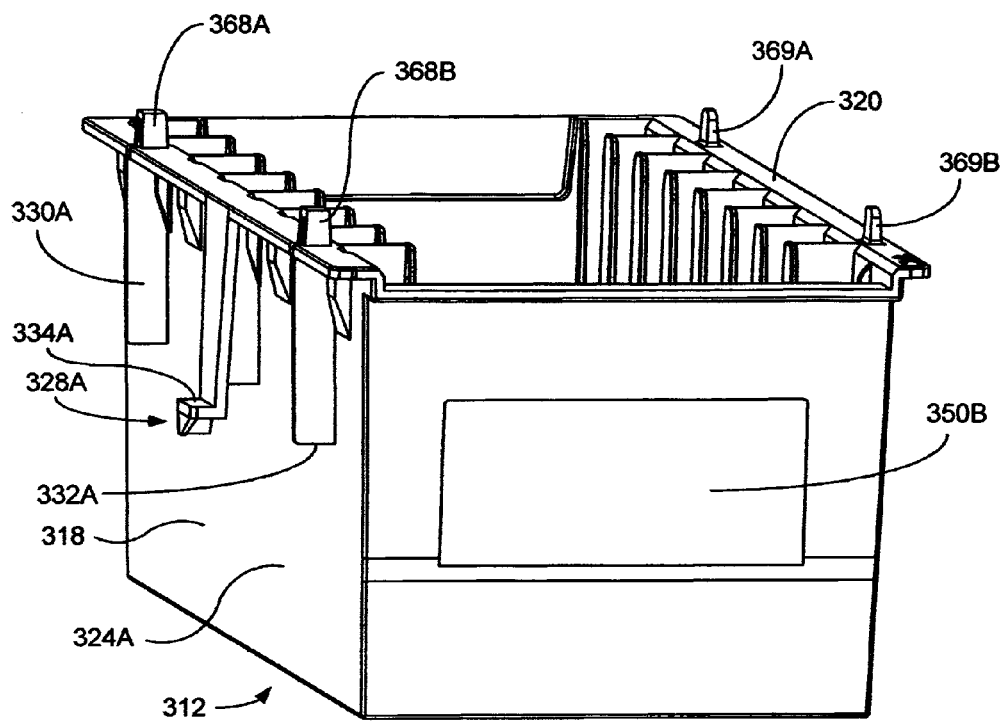

Further, the front side bracket 252 and back side bracket 254 each respectively comprise a first flange engagement structure 268A and second flange engagement structure 268B that are each capable of receiving and engaging one of a pair of flanges 328A and 328B, shown in FIGS. 7A and 7B, associated with a magazine 310 to secure the magazine 310 within the receptacle 264. The first and second flange engagement structures 268A, 268B, if engaging the pair of flanges 328A and 328B associated with a magazine 310, can also be disengaged from the flanges 328A and 328B so that the magazine 310 can be removed from the receptacle 264. The first and second flange engagement structures 268A, 268B are located such that the magazine 310 can only be received in the magazine receptacle 264 when the magazine 310 is in a particular orientation.

Also associated with the front side bracket 252 is a cover mounting bracket 270 that support an entry/exit port cover 272.

With continuing reference to FIGS. 6A–6C, the guide structure 242 is comprised of a top guide structure 274 that engages the top guide channel 248. The top guide structure 274 is comprised of a bracket 276 that is attached to the exterior skin 178B and two pairs of rollers 278A, 278B that each engages a flange 328A and 328B repsectively of the top guide channel 248 to guide the magazine frame 240.

The guide structure 242 is further comprised of a bottom guide structure 280 that engages the bottom rail 256. The bottom guide structure 280 is comprised of a bracket 282 that supports rail brackets 284A, 284B. The rail brackets 284A, 284B capture the rail 256 and allow the rail 256 to be linearly displaced so that the magazine frame 240 can be moved between the "open" and "closed" positions.

The drive mechanism 244 is comprised of the rack 258, a stepper motor 288 that is attached to the mounting bracket 282, a pinion 290 that is attached to the spindle of the motor 286, and a cluster gear 292 that connects the rack 258 and the pinion 290. In operation, the stepper motor 288 produces a motive force that is used to translate the magazine frame 240 between the "closed" and "open" positions. More specifically, the stepper motor 288 produces a rotational motive force that is transferred to the rack 258 via the pinion 290 and the cluster gear 292. The interaction of the cluster gear 292 and the rack 258 translates the rotation motive force into a translational motive force that is used to move the magazine frame 240 between the "closed" and "open" positions. The stepper motor 288 is capable of being controlled so as to rotate the spindle 287 in either a clockwise direction or a counter-clockwise direction. Rotation of the motor spindle 287 in the clockwise direction causes the magazine frame 240 to move towards the "open" position. Conversely, rotation of the motor spindle in the counter-clockwise direction causes the magazine frame 240 to move towards the "closed" position.

The sensor system 246 is comprised of a flag 294 that is attached to the bottom bracket 250 of the magazine frame 240, a first detector 296 for detecting when the magazine frame 240 is in the "open" position and that is attached to the mounting bracket 284B, a second detector 298 for detecting when the magazine frame 240 is in the "closed" position. The second detector 298 is supported by a bracket 300 that is attached to the side portion 184B of the bottom tray 186. In operation, the sensor system 246 detects that the magazine frame 240 is in the "open" position when the first detector 296 detects the flag 294. Similarly, the sensor system 246 detects that the magazine frame 240 is in the "closed" position when the second detector 298 detects the flag 294.

The sensor system 246 is further comprised of a comb flag 302 and a third sensor 304 that are used to determine the position of the frame 240 when the frame 240 is located between the "open" and "closed" positions.

With continuing reference to FIGS. 6A–6C, the stop 262 engages a portion of the bracket 300 to prevent the drive mechanism 244 from driving the magazine frame 240 beyond the "closed" position. The stop 262 engages the bracket 282 to prevent the drive mechanism 244 from driving the magazine frame 240 beyond the "open" position. The stop 262 is attached to the bottom bracket 250 by four screws 306. Notably, the magazine frame 240 can be disengaged from the guide structure 242 by unscrewing the four screws 306 so that the stop 262 is no longer attached to the bottom bracket 250, thereby allowing the magazine frame 240 to be displaced beyond the "open" position.

With reference to FIGS. 7A–7F, an embodiment of a entry/exit port magazine 310 that is capable of holding a plurality of LTO tape cartridges 130 and being engaged/disengaged to/from the magazine frame 240 of the entry/exit port 104 is described. The magazine 310 is comprised of a cartridge holding portion 312 and a dust cover 314.

The cartridge holding portion 312 is comprised of a bottom wall 316 and a side wall 318 that extends from the bottom wall 316 to a side wall edge 320, which defines the opening through which an LTO cartridge 130 is inserted/extracted into/from the magazine 310. The side wall 318 is comprised of first and second end walls 322A, 322B and first and second side walls 324A, 324B.

Respectively associated with the first and second side walls 324A, 324B are first and second frame engagement structures 326A, 326B. The first frame engagement structure 326A is comprised of a first substantially rigid flange 328A that extends outward from the first side wall 324A and a first pair of ribs 330A, 332A. Similarly, the second frame engagement structure 326B is comprised of a substantially rigid flange 328B that extends outward from the second side wall 324B and a second pair of ribs 330B, 332B. The first substantially rigid flange 328A comprises a first engagement surface 334A that is located at a first distance from the edge 320. Similarly, the second substantially rigid flange 328B comprises a second engagement surface 334B that is also located at the first distance from the edge 320. The bottom edges of the first pair of ribs 330A, 332A and second pair of 330B, 332B are each located at a second distance from the edge 320 that is less than the first distance. The difference between the first and second distances is slightly greater than the thickness of the first and second flange engagement structures 268A, 268B.

To engage the magazine 310 to the magazine frame 240 of the entry/exit port 104 (assuming the port 104 is in the "open" position), the magazine 310 is inserted into the receptacle 264 such that the substantially rigid flanges 328A, 328B are respectively pass through the wider openings located towards the top ends of the first and second flange engagement structures 268A, 268B. The first pair of ribs 330A, 332A and the second pair of ribs 330B, 332B respectively engage the back side bracket 254 and the front side bracket 252 to limit the extent to which the flanges 328A, 328B can pass through the larger portions of the first and second flange engagement structures 268A, 268B. At this point, the magazine 310 is displaced towards the bottom bracket 250 so that the first engagement surface 334A of the first flange 328A engages the posterior side of the back side bracket 254 and the second engagement surface 334B of the second flange 328B engages the posterior side of the front side bracket 252. At this point, the first engagement surface 334A is engaging the posterior side of the back side bracket 254 and the bottom edges of the first pair of ribs 330A, 332A are engaging the anterior surface of the back side bracket 254. Likewise, the second engagement surface 334B is engaging the posterior side of the front side bracket 252 and the second pair of ribs 330B, 332B are engage the anterior surface of the front side bracket 252. With the first and second engagement surfaces 334A, 334B and the bottom edges of the first and second pairs of ribs 330A, 332A, 330B, 332B engaged to the magazine frame 240 in this manner, the position of the magazine 310 is substantially fixed in two orthogonal dimensions. An end rib 334 associated with the first end wall 322A engages the bottom bracket 250 to limit the extent to which the magazine 310 can be displaced towards the bottom bracket 250. To disengage the magazine 310 from the frame 240 (still assuming the port 104 is in the "open" condition), the attachment operation is reversed, i.e., the magazine 310 is displaced away from the bottom bracket 250 until the first and second flanges 328A, 328B can be pulled through the wider openings located towards the top ends of the first and second flange engagement structures 268A, 268B to disengage the magazine 310 from the magazine frame 240.

The first and second substantially rigid flanges 328A, 328B are also located so as to establish an asymmetry that constrains the magazine 310 to be mounted to the magazine frame 240 in a single, preferred orientation. To elaborate, the asymmetry is established by locating the first flange 328A such that the first flange 328A is a first distance from the first end wall 322A and locating the second flange 328B such that the second flange 328B is a second distance from the second end wall 322B that is not equal to the first distance. In the illustrated embodiment, the first flange 328A is located at a first distance from the first end wall 322A and a second distance from the second end wall 322B that is different than the first distance, and the second flange 328B is located the same second distance from the second end wall 322B. In addition, a cut-out 249 associated with the top guide channel 248 and the lack of a comparable cut-out associated with the bottom bracket 252 prevent the magazine 310 from being mounted to the magazine frame 240 in an undesired orientation.

Associated with the bottom wall 316 are a plurality of holes 336A–336D that are each engaged by a protrusion on the dust cover 314 of another magazine 310 to facilitate stacking of the magazines. There are numerous alternatives to the holes 336A–336D. Among the possible alternatives are: (a) one or more recesses that are each adapted to engage a protrusion on the dust cover of another magazine; and (b) one or more protrusions that are each adapted to engage a hole on the dust cover of another magazine. Different numbers of structures can be utilized. Moreover, a structure with a different shape than the holes 336A–336D is also feasible.

Figure 7D:
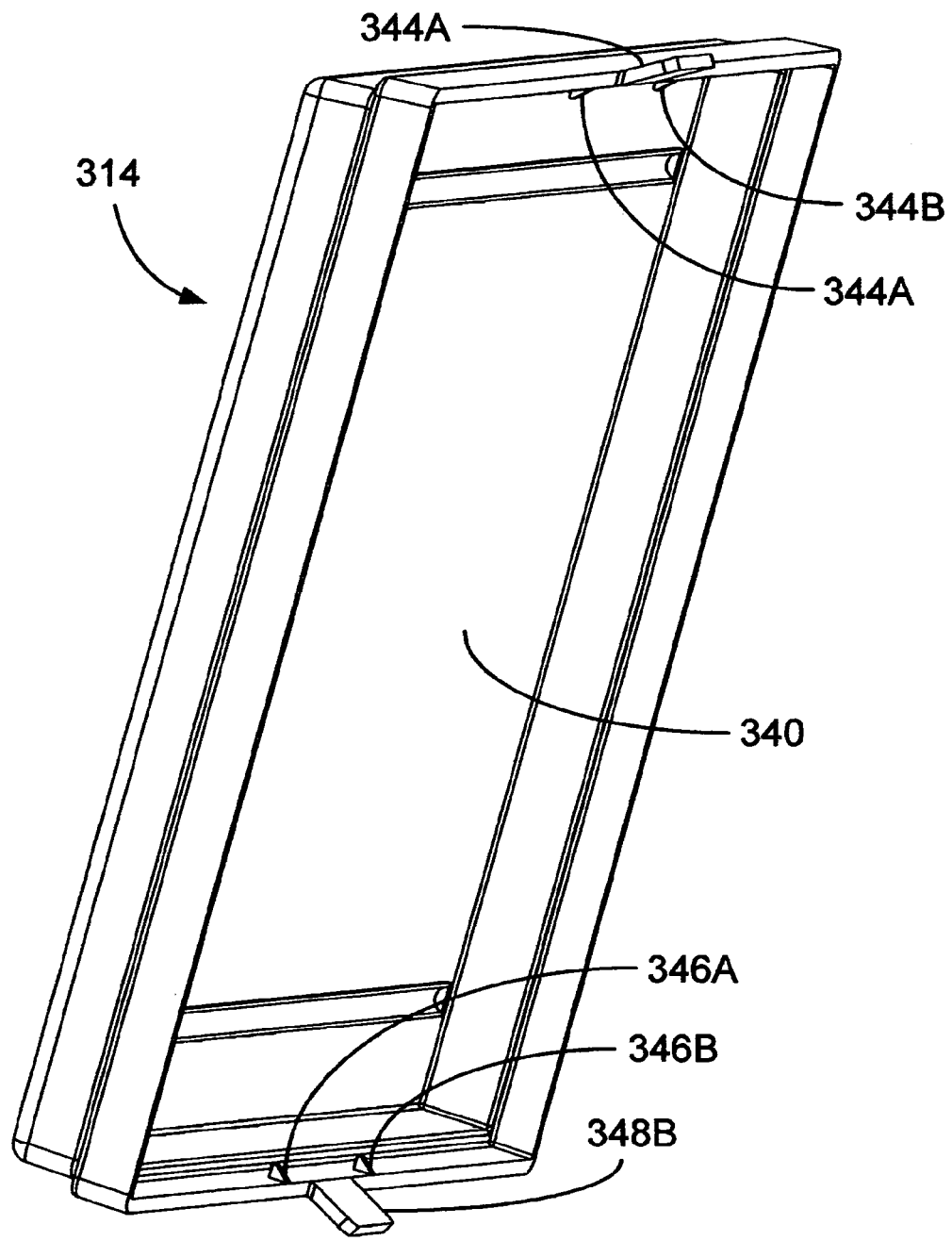

With reference to FIGS. 7A, 7B, and 7D, the dust cover 314 comprises an exterior surface 338 and an interior surface 340. Associated with the exterior surface 338 are protrusions 342A, 342B, 342C and 342D that are each capable of mating with one of the plurality of holes 336A, 336B, 336C and 336D, respectively, associated with another magazine to facilitate stacking of the magazines. There are numerous alternative structures to the protrusions 342A–342D that can be used to facilitate stacking of magazines. For instances, holes or recesses that mate with protrusions located on the bottom wall of a magazine 310 can be used in place of the protrusions 342A–342D. Different numbers of structures and/or structures with different shapes from those illustrated can also be utilized.

Associated with the interior surface 340 of the cover 314 are a first pair of detents 344A, 344B and a second pair of detents 346A, 346B that are used to fasten the cover 314 to the cartridge holding portion 312. To elaborate, the first pair of detents 344A, 344B are adapted to engage a portion of a lip that is associated with the edge 320 and that is located adjacent to first flange 328A, and the second pair of detents 346A, 346B are adapted to engage a portion of the lip that is located adjacent to the second flange 328B. A pair of tabs 348A, 348B allow a user to disengage the cover 314 from the cartridge holding portion 312. To elaborate, the first tab 348A allows a user to flex the cover 314 (which is preferably made of plastic) adjacent to the first pair of detents 344A, 344B in a manner that disengages the first pair of detents 344A, 344B from the lip. The second tab 348B similarly allows a user to disengage the second pair of detents 346A, 346B from the lip.

Respectively associated with the first and second end walls 322A, 322B are first and second bar code areas 350A, 350B that are each capable of accommodating a bar code. In many cases, the bar code is imprinted on a label that is placed in the bar code area, such as bar code area 350A. In some embodiments, a single bar code area, such as bar code area 350A, that is associated with one of the first and second end walls 322A, 322B or one of the first and second side walls 324A, 324B is adequate. In other embodiments, two or more bar codes areas, each associated with one of the first and second end walls 322A, 322B and the first and second side walls 324A, 324B is needed or desirable.

Extending from the second end wall 322B is a third bar code area 350C, which is shown with a bar code label attached. The third bar code area 350C is located so that when the magazine 310 is within the library 100, the magazine 310 can be identified. To elaborate, when the magazine 310 is attached to the magazine frame 240, any bar codes associated with the first and second bar code areas 350A, 350B or associated with any other locations on the side wall 318 are likely to be difficult for a bar code reader associated with the transport system 112 to read. In contrast, a bar code associated with the third bar code area 350C is readily visible to such a bar code reader. Generally, any bar code associated with the third bar code area 350C is identical to the bar code associated with the first and second bar code areas 350A, 350B. However, it is not required that a bar code associated with an individual magazine 310 be identical to any other bar codes associated with the magazine 310.

Figure 7E:
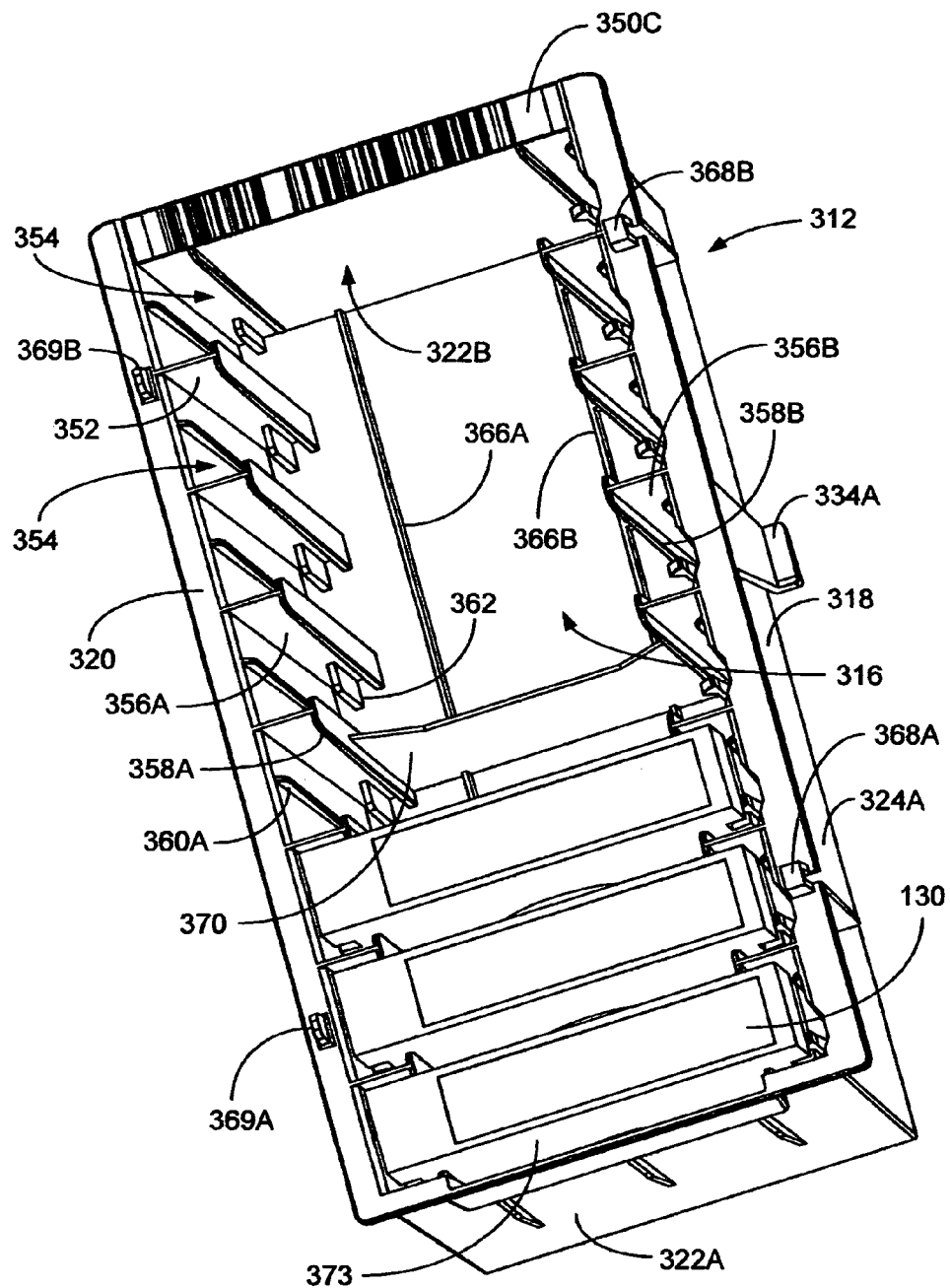
Figure 7F:
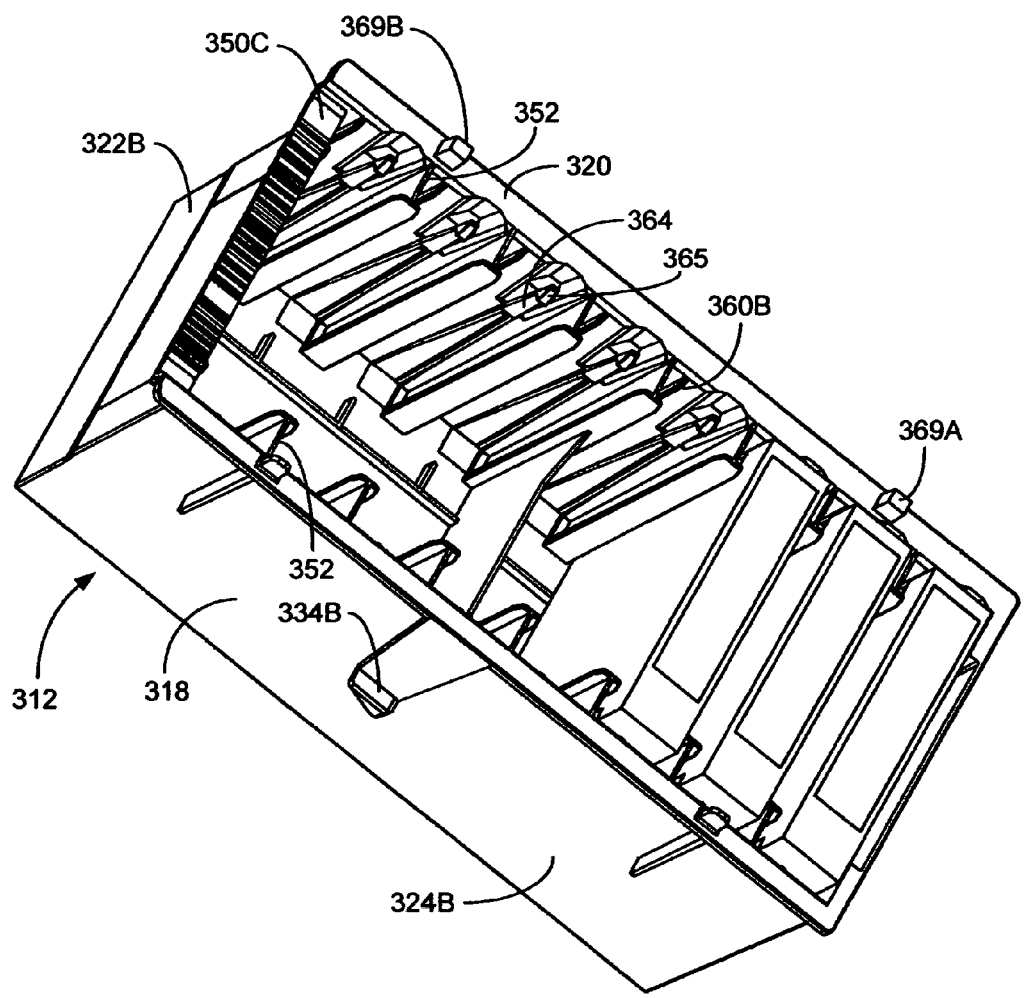
Figure 12A:
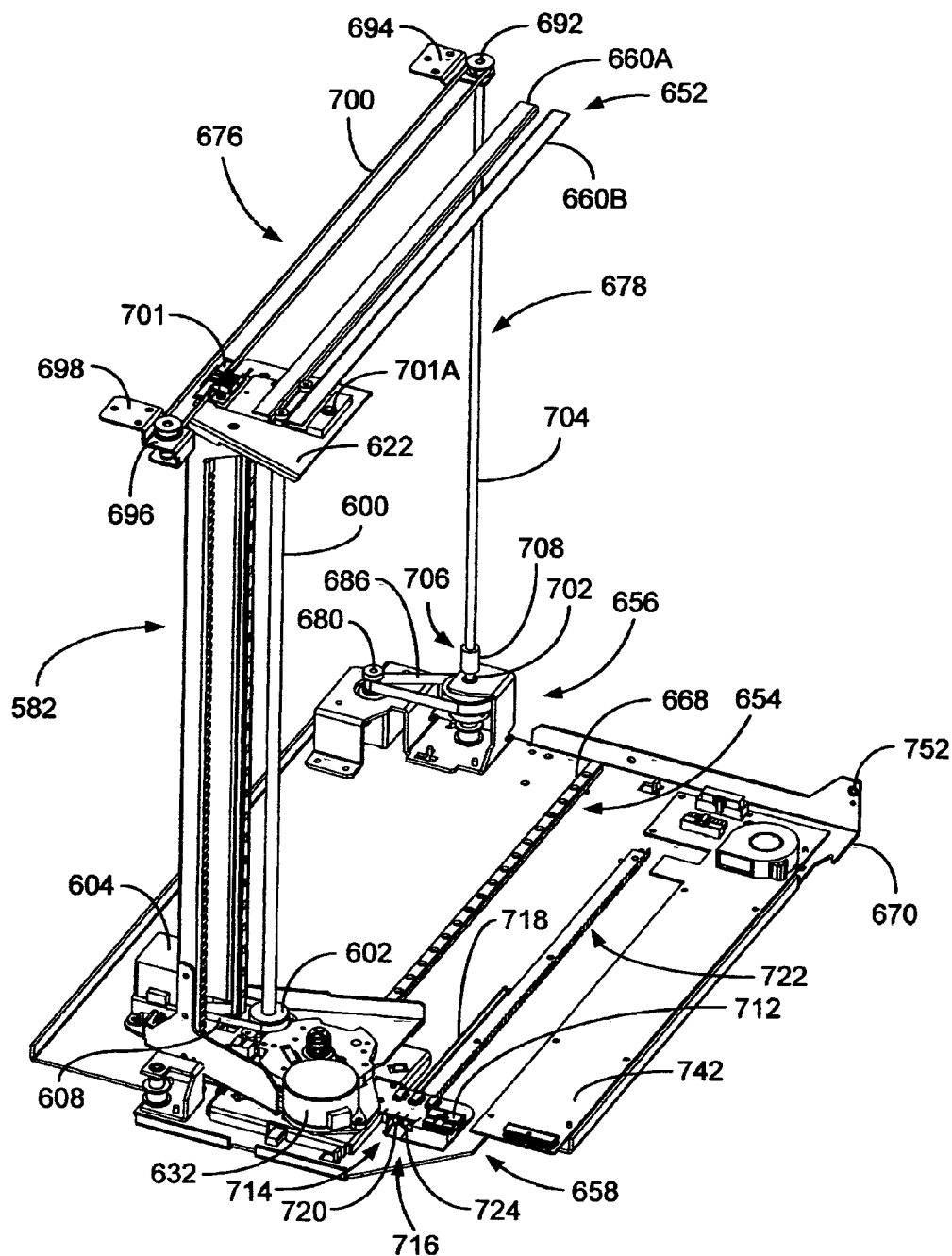
FIGS. 12A–12F illustrate the transport system that is associated with the library shown in FIGS. 1A–1B.

With reference to FIGS. 7E and 7F, the bottom wall 316, the first and second end walls 322A, 322B, the first and second side walls 324A, 324B define an interior space that is capable of accommodating a plurality of the LTO tape cartridges 130. In the illustrated embodiment, three LTO cartridges 130 are shown located within the interior space of the magazine 310. A plurality of partition structures 352 divide the interior space into a plurality of data cartridge storage spaces 354, each being capable of accommodating a single LTO tape cartridge 130. Each partition 352 is comprised of a pair of panels 356A, 356B and a pair of spacer ribs 358A, 358B. The spacer ribs 358A, 358B serve to space cartridges 130 that are stored in adjacent storage spaces 354 a sufficient distance from one another so that the picker 580, shown in FIG. 12A, associated with the transport assembly 112 can grasp one of the cartridges 130 without interference from any adjacent cartridges 130. Associated with each of the storage space 354 is a pair of centering fins 360A, 360B that serve to center a data cartridge 130 within the storage space 354.

Also associated with each storage space 354 is an orientation structure 362 that prevents insertion of an LTO tape cartridge 130 into a storage space 354 if the cartridge 130 does not have the proper orientation. To elaborate, the orientation structure 362 is designed to accommodate or complement the orientation feature 138 of an LTO tape cartridge 130 that is being inserted into the storage space 354 and has the desired orientation. If, however, an LTO tape cartridge 130 is being inserted into the storage space 354 and does not have the desired orientation, the orientation structure 362 is not positioned to accommodate the orientation feature 138 of the LTO tape cartridge 130 and, as such, interferes with the insertion of the LTO tape cartridge 130 into the storage space 354. Further, all of the orientation structures 362 in the magazine 310 are substantially identical to one another and in substantially the same location in each storage space 354. Consequently, the orientation structures 362 cumulatively operate to ensure that all of the cartridges 130 that can be held by the magazine 310 have the same orientation within the magazine 310. This characteristic of the magazine 310 in combination with the features of the magazine 310 that require the magazine 310 to be in a specific orientation for attachment to the magazine frame 240 of the entry/exit port 104, ensure that all of the data cartridge 130 that are placed in the library 100 via the entry/exit port 104 have the same orientation relative to the picker 580, which facilitates the design of the picker 580.

Additionally, a retaining structure 364 is associated with each of the storage spaces 354 to prevent unintentional dislodgement of an LTO cartridge 130 located in the storage space 354. Generally, the retaining structure 364 comprises a cantilever member with one end fixed to the cartridge holding portion 312 and a free or movable end that supports a detent 365 for engaging the notch 142B of an LTO cartridge 130. In operation, the spring force provided by the cantilever member urges the detent 365 into engagement with the notch 142B during insertion of the LTO cartridge 130 into the cartridge holding portion 312 and allows the detent 365 to disengage from the notch 142B during extraction of the cartridge 130 by a picker 580 or user.

Each of the storage spaces 354 also comprises portions of stand-offs 366A, 366B that ensure that the cartridge end 136A of the LTO cartridge 130 is substantially the same distance from the bottom wall of the 316 of the magazine 310 as the cartridge end 156A of a DLT tape cartridge 130 is from the bottom wall of a magazine 310 designed to accommodate DLT tape cartridges 130. In libraries that are capable of operating on cartridges with different dimensions, such as library 100, the use of stand-offs, such as 366A and 366B, to ensure this consistency of cartridge location simplifies the picker 580 design.

Associated with the side wall 324A are two orientation surfaces 368A, 368B that can each be used by a picker 580 to locate the data cartridge storage spaces 354. The cover 314 is designed to accommodate the orientation surfaces 368A, 368B.

Associated with the side wall 324B are blockers 369A, 369B that serve to prevent the magazine frame 240 of the entry/exit port 104 from reaching the closed position, as shown in FIG. 1A, if the magazine 310 is not fully engaged to the frame 240.

Associated with one of the partitions 352 is a strut 370 that connects the pair of panels 356A, 356B. The strut 370 prevents the first and second side walls 324A, 324B from bowing towards or away from one another. A picker space 372 associated with the storage space 254 immediately adjacent to the first end wall 322 provides space that is utilized by a picker 580 in inserting a data cartridge 130 into the space 254 and retracting a data cartridge 130 from the space 254.

Figure 8A:
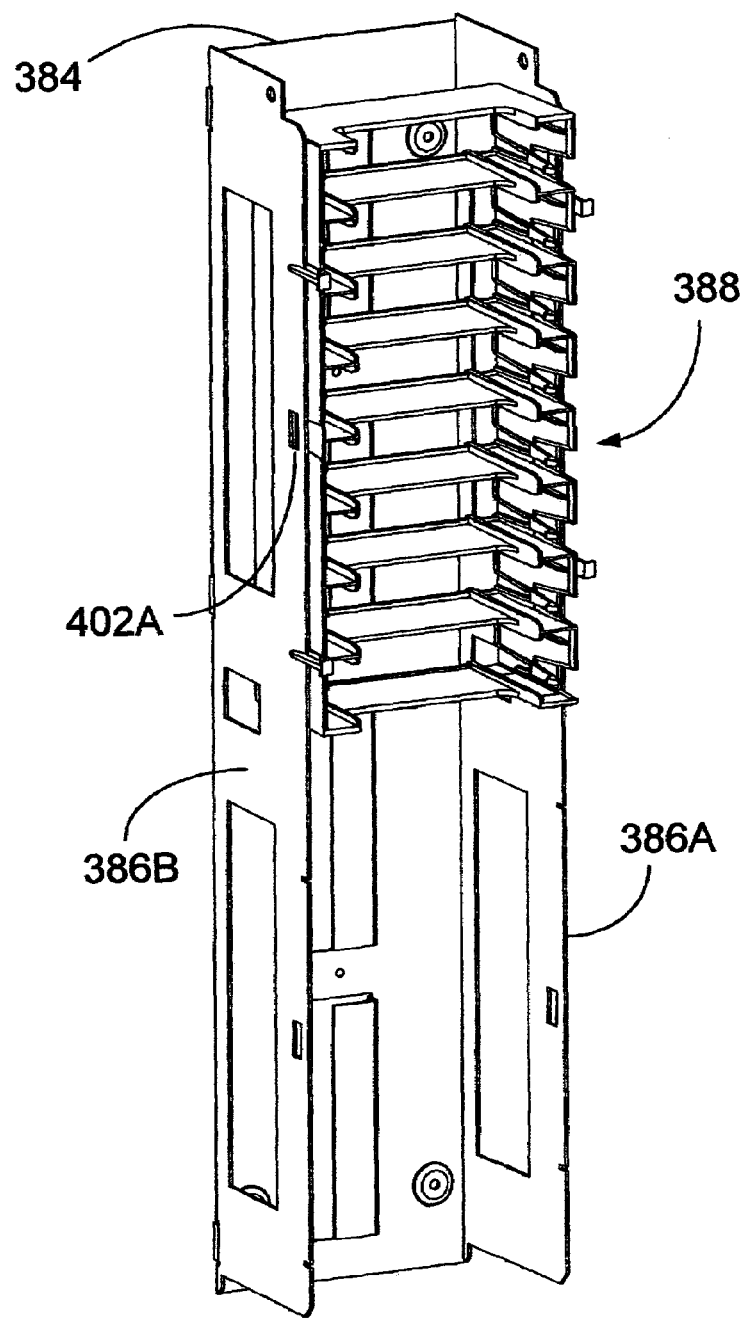
FIGS. 8A–8E illustrate a multi-piece magazine for storing a plurality of LTO tape cartridges and that is associated with the library shown in FIGS. 1A–1B.
Figure 8B:
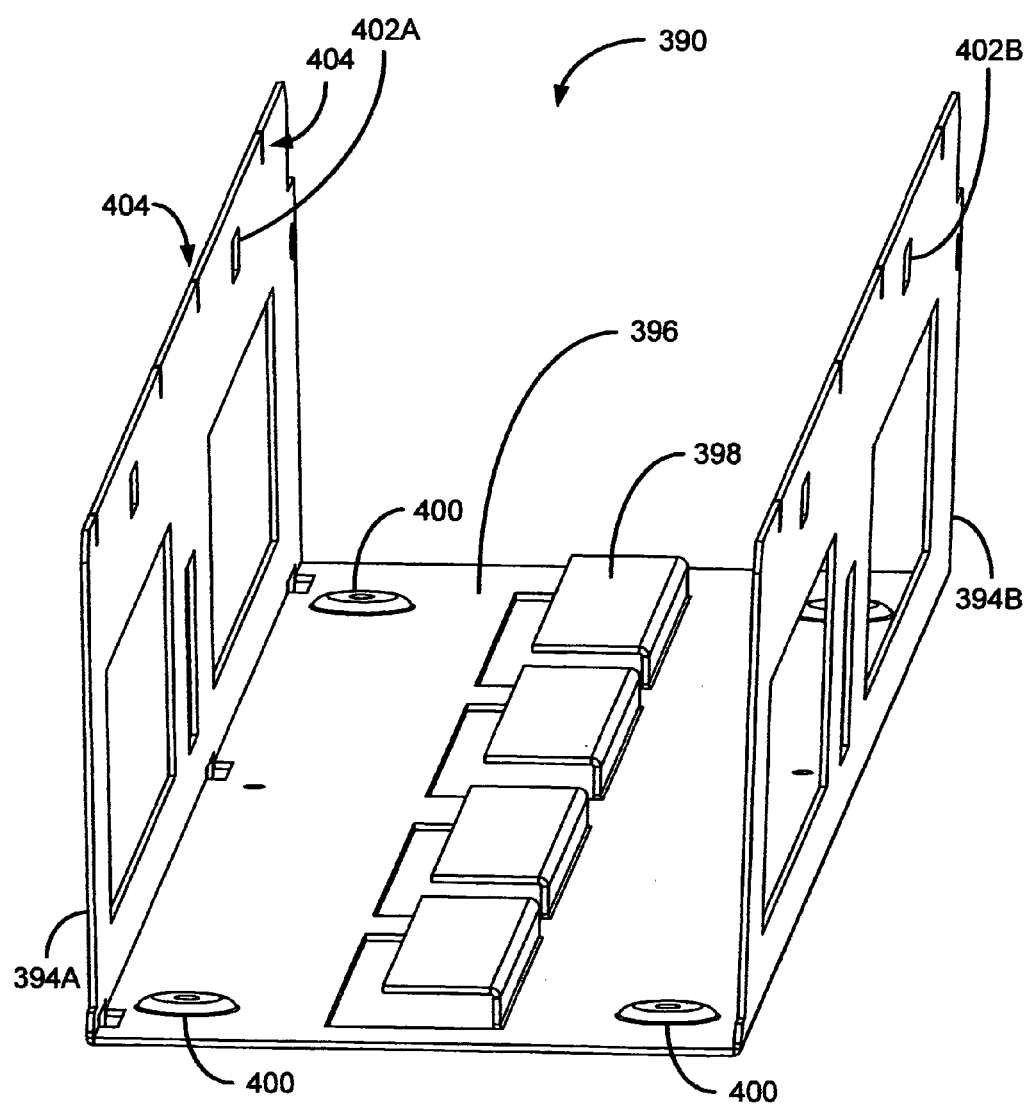
Figure 8C:
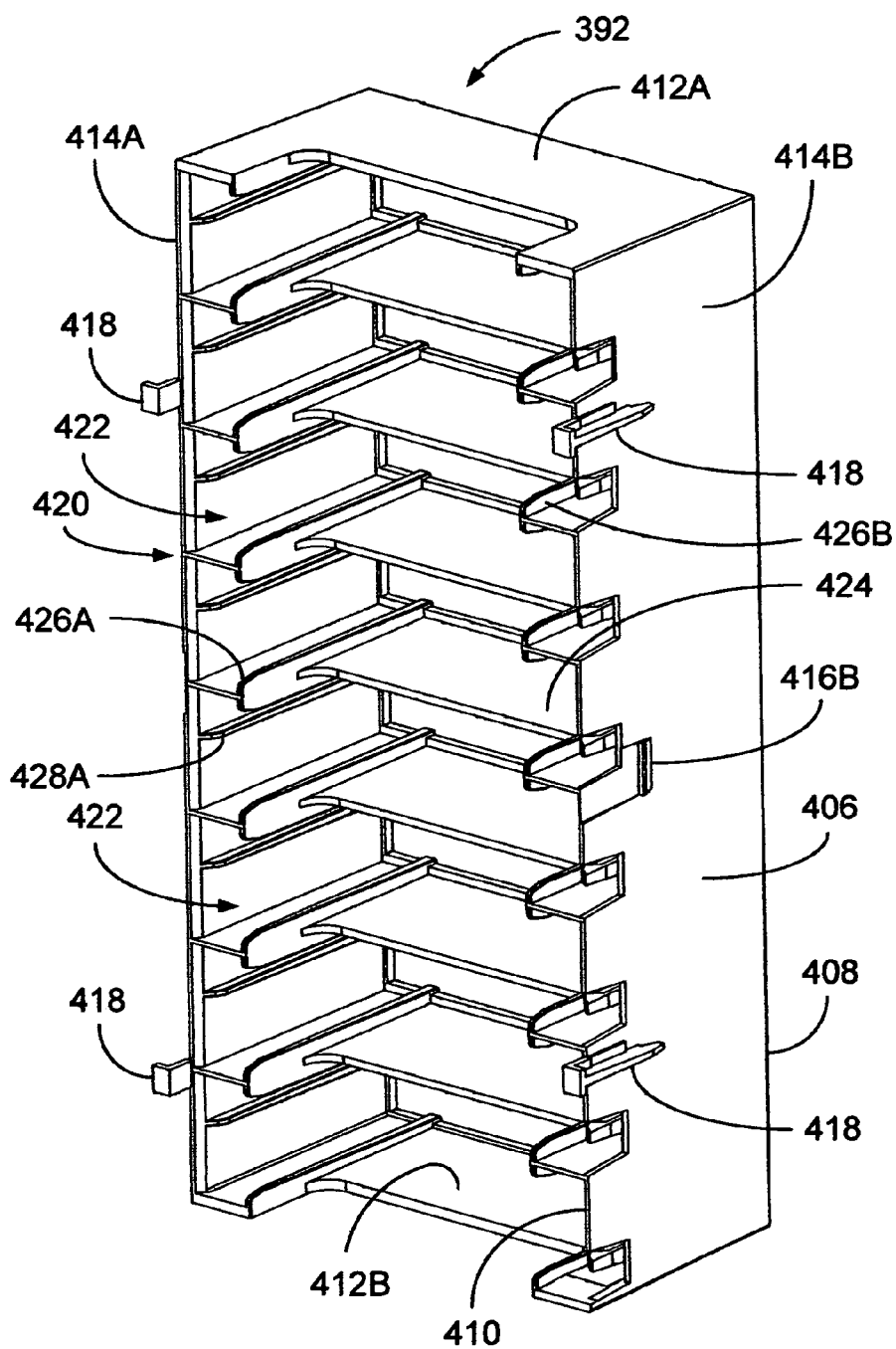
Figure 8D:
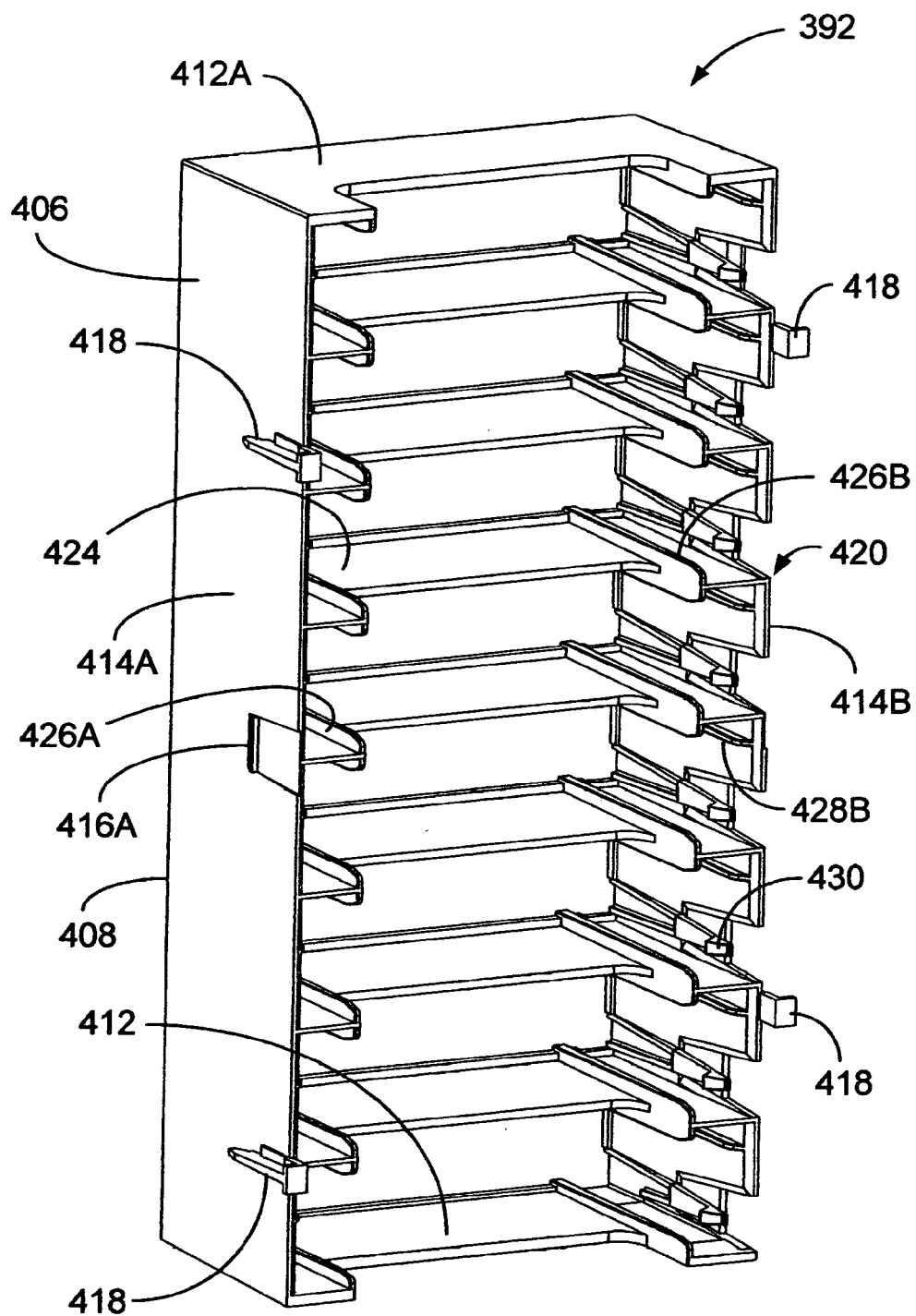
Figure 8E:
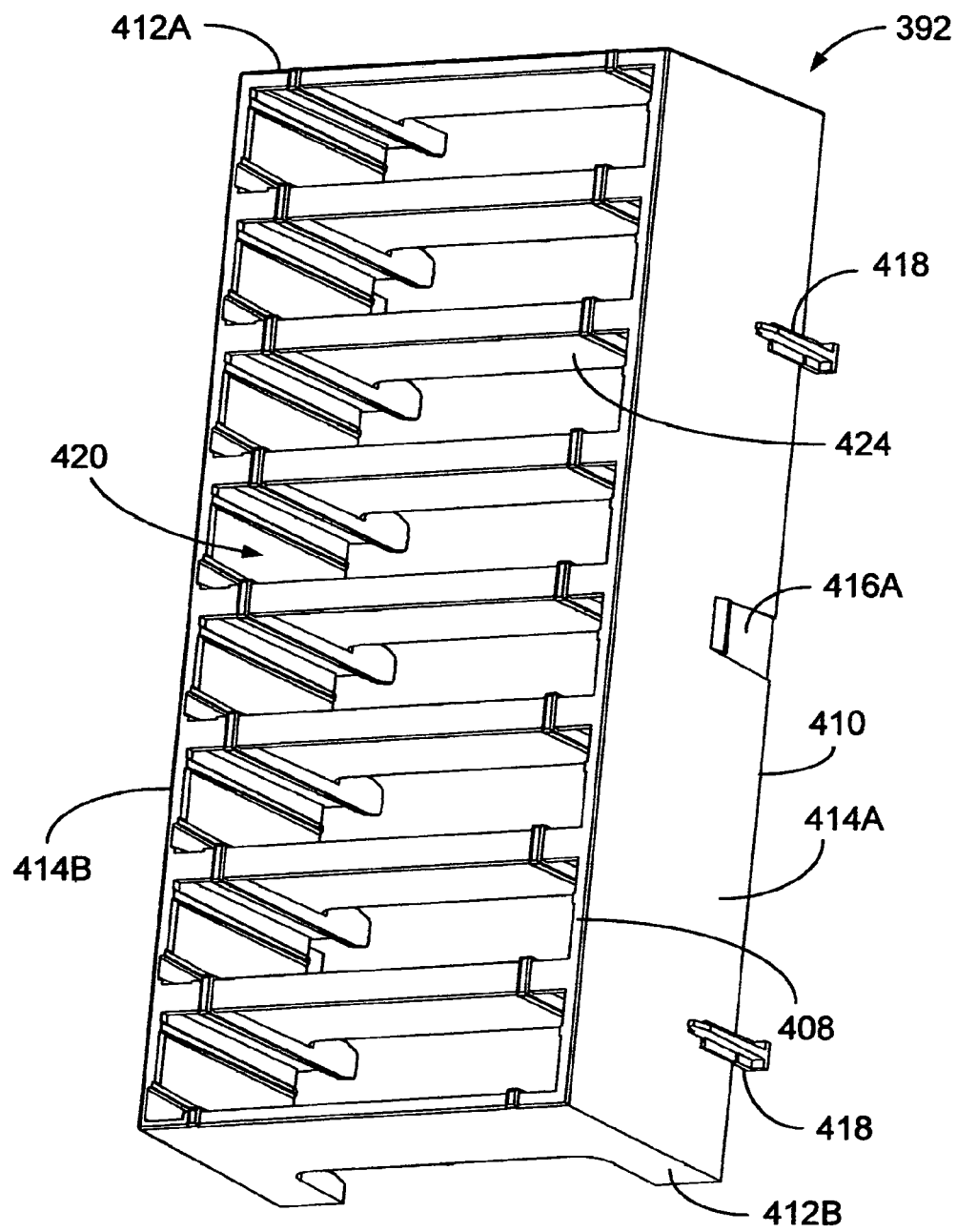

With reference to FIGS. 2 and 8A–8E, the magazine structure 106 comprises first and second banks of magazines 380A, 380B. The first bank of magazines 380A is described with the understanding that the second bank of magazines 380B (other than accommodating the entry/exit port 104) is substantially identical. The first bank of magazines 380A is comprised of four, multi-piece magazines 382A, 382B, 382C and 382D. With reference to FIG. 8A, each of the multi-piece magazines 328A, 382B, 382C and 382D is comprised of a back side 384, a first side 386A, and a second side 386B that cumulatively define an interior space for accommodating a plurality of data cartridges, such as the LTO data cartridges 130 used herein for descriptive purposes, and an opening through which data cartridges 130 can be inserted/extracted into/from the interior space. Each of the multi-piece magazines 382A, 382B, 382C and 382D also comprises a partitioning structure 388 that divides the interior space into a plurality of storage spaces 422 that are each capable of accommodating an LTO tape data cartridge 130.

With reference to FIGS. 8A–8E, each of the multi-piece magazines 382A, 382B, 382C and 382D is comprised of a C-channel 390 and at least one magazine clip 392. The C-channel 390 forms substantially the entire back side 384 of the magazine 392 and portions of the first and second sides 386A, 386B of the magazine 392. The C-channel 390 comprises first and second C-channel sides 394A, 394B and a C-channel mid-section 396 that extends between and connects the first and second C-channel sides 394A, 394B. The C-channel mid-section 396 forms substantially the entire back side 384 of the magazine 392. In addition, the C-channel mid-section 396 comprises a plurality of stand-offs 398, with each stand-off positioned to engage at least one LTO tape cartridge 130 located in one of the storage spaces provided by the magazine 392 such that the cartridge end 136A of the LTO cartridge 130 is substantially the same distance from the back side 384 as the cartridge end 156A of a DLT tape cartridge 150 is from the back side 384 of a magazine 392 designed to accommodate DLT tape cartridges 150. In libraries that are capable of operating on cartridges with different dimensions, such as library 100, the use of stand-offs, such as 398, to ensure this consistency of cartridge location simplifies the picker 580 design. The C-channel mid-section 396 further comprises a plurality of rivet holes 400 that allow the C-channel 390 to be attached to the top tray 182, bottom tray 186, and exterior skins 178A, 178B by rivets. The C-channel 390, in connecting the top tray 182 and the bottom 186 to one another, also provides structural support that is not provided by the exterior skins 178A, 178B. Consequently, each of the C-channels 390 forms a structural portion the frame 102.

Respectively associated with the first and second C-channel sides 394A, 394B are first latch elements 402A, 402B that each form a latch with a second latch element 416A, 416B associated with the magazine clip 392 to join the magazine clip 392 and the C-channel 390. In the illustrated embodiment, the first latch elements 402A–402B are holes. However, other types of latch elements are feasible. A plurality of slits 404 are also associated with each of the first and second C-channel sides 394A, 394B. The slits 404 cooperate with slot defining structures 418 that are associated with the magazine clip 392 to further fix the magazine clip 292 to the C-channel 390 in the manner that slotted cards are interconnected to build a house of cards.

The C-channel 390 is preferably made of a metal (aluminum, sheet steel etc.). Further, the C-channel 390 of each of the magazines 392 in the first bank of magazines 380A forms a portion of the frame 102 of the library 101. This is also the case with respect to the second bank of magazines 380B with the possible exception of the magazine 392 in the structure 380B above the entry/exit port 104.

The magazine clip 392 is comprised of a side wall 406 that extends from a bottom edge 408 to a top edge 410 that defines an opening through which an LTO cartridge 130 is inserted/extracted into/from the magazine 392 when the magazine clip 392 is joined to the C-channel 390. The side wall 406 is comprised of first and second end walls 412A, 412B and first and second side walls 414A, 414B. Associated with the first and second side walls 414A, 414B are second latch elements 416A, 416B that respectively cooperate with first latch elements 402A, 402B of the C-channel 390 to connect the magazine clip 392 and the C-channel 390. In the illustrated embodiment, the second latch elements 416A1, 416B are each substantially rigid flanges. In joining the magazine clip 392 to the C-channel 390, the magazine clip 392 are brought together such that the second latch elements 416A, 416B cause the first and second C-channel sides 394A, 394B to flex or spread apart. Once, however, the second latch elements 416A, 416B reach the first latch elements 402A, 402B, the first and second C-channel side 394A, 394B come together to latch the magazine clip 392 and the C-channel 390.

Also associated with the first and second side walls 414A, 414B are slot defining structures 418 that are each adapted to engage one of the slits 404 associated with the first and second C-channel sides 394A, 394B. The slot defining structures 418 and slits 404 operate to prevent the magazine clip 392 from being displaced towards the top tray 182 or the bottom tray 186.

The magazine clip 392 further comprises a plurality of partitions 420 that define a plurality of LTO tape cartridge storage spaces 422. Each of the partitions 420 is comprised of a panel 424, pair of spacer ribs 426A, 426B that are each substantially identical to the comparable element associated with the entry/exit port magazine 310 and perform substantially the same function as the comparable element of the entry/exit port magazine 310. As such, these elements will not be described further. Associated with each of the storage spaces 422 are centering fins 428A, 428B and a retaining structure 430, which are each substantially identical to the comparable element associated with the entry/exit port magazine 310 and perform substantially the same function as the comparable element in the magazine 310. Consequently, these features will not be described further.

Notably, the magazine clip 392 does not include any kind of orientation feature for ensuring that cartridges 130 held by the magazine 392 have a predetermined orientation. The magazine clip 392 lacks an orientation feature because it is assumed that substantially all of the data cartridges 130 that will be held by any one of the magazines 392 associated with the first and second banks of magazines 380A, 380B will enter the library 100 via the entry/exit port 104 and, as such, will have the desired predetermined orientation due to the operation of the entry/exit port 104 and the entry/exit port magazine 310.

The magazine clip 392 also does not have any kind of back wall or stand-off feature like the entry/exit port magazine 310, nor does it need any of these features because these features are provided by the C-channel 390. Consequently, absent the operation of the retaining structure 430 associated with each data cartridge storage space 422 of the magazine clip 392 and the attachment of the clip 392 to the C-channel 390, a data cartridge 130 can be passed all the way through the magazine clip 392. For example, a data cartridge 130 could be inserted into the magazine clip 392 through the opening defined by the top edge 410 and, absent the operation of the retaining structure, be extracted through an opening defined, at least in part by the bottom edge 408.

The magazine clip 392 is made of one of the same class of materials as is used to make the cartridge housing of a data cartridge 130. Consequently, at present, the magazine clip 392 is made of plastic. The use of plastic to make the magazine clip 392 results in less wear and tear on the cartridge housings over numerous insertions and extractions relative to a clip 392 made of, for example, metal.

For alternate form factor cartridges with dimensions that would place the alternate form factor cartridge end at a different distance from the back side 384 of a magazine 392 designed to accommodate LTO cartridges 130, such as magazine 382A, there are at least two possible ways to design the magazine 392 so that the alternate form factor cartridge will be at the same distance from the back side 384 and thereby facilitate the picker 580 design. First, a shim can be attached to the stand-offs 398. Second, the magazine clip 392 can be designed to hold the alternate form factor cartridge at the desired distance.

It should be appreciated by one skilled in the art that a multi-piece magazine can be realized in which one piece forms at least a portion of the back of the magazine that does not have a C-shape or U-shape. For example, a multi-piece magazine can be realized in which a substantially flat piece of material forms at least a portion of the back of the magazine. Additionally, a multi-piece magazine can be realized in which a piece that forms at least a portion of the back of the magazine and a piece that forms at least portions of the side are attached to one another in a manner that does not involve overlapping side portions provided by each of the pieces. For example, the pieces can be joined to one another with a connector that forms a butt joint between the pieces.

With reference to FIGS. 9A–9F, the drive bay 108 is comprised of a frame 442 that defines a drive bay space which is capable of accommodating a number of LTO drives 472 that are each contained within a drive sled 470 that facilitates hot-swapping of drives 472 to and from the library 100. The frame 442 defines a first opening 444 (see FIG. 2) that exposes any drives 472 appropriately located in the drive bay 108 so to the transport system 112 can load and unload tape cartridges 130 from the drive 472. The frame 442 also defines a second opening 446 that allows a user to insert and remove drives 472 from the drive bay space.

Figure 9A:
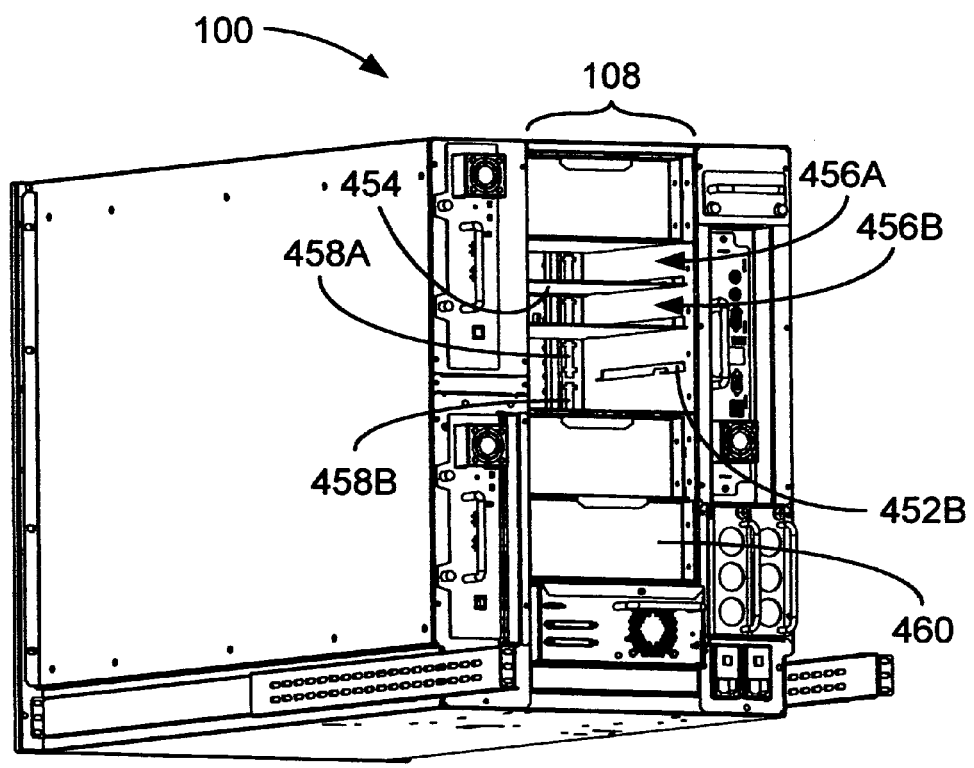
FIGS. 9A–9F illustrate a drive bay that is associated with the library shown in FIGS. 1A–1B and capable of accommodating multiple full-height drives and be adapted to accommodate half-height drives within a space that is capable of accommodating one of the full-height drives.
Figure 9B:
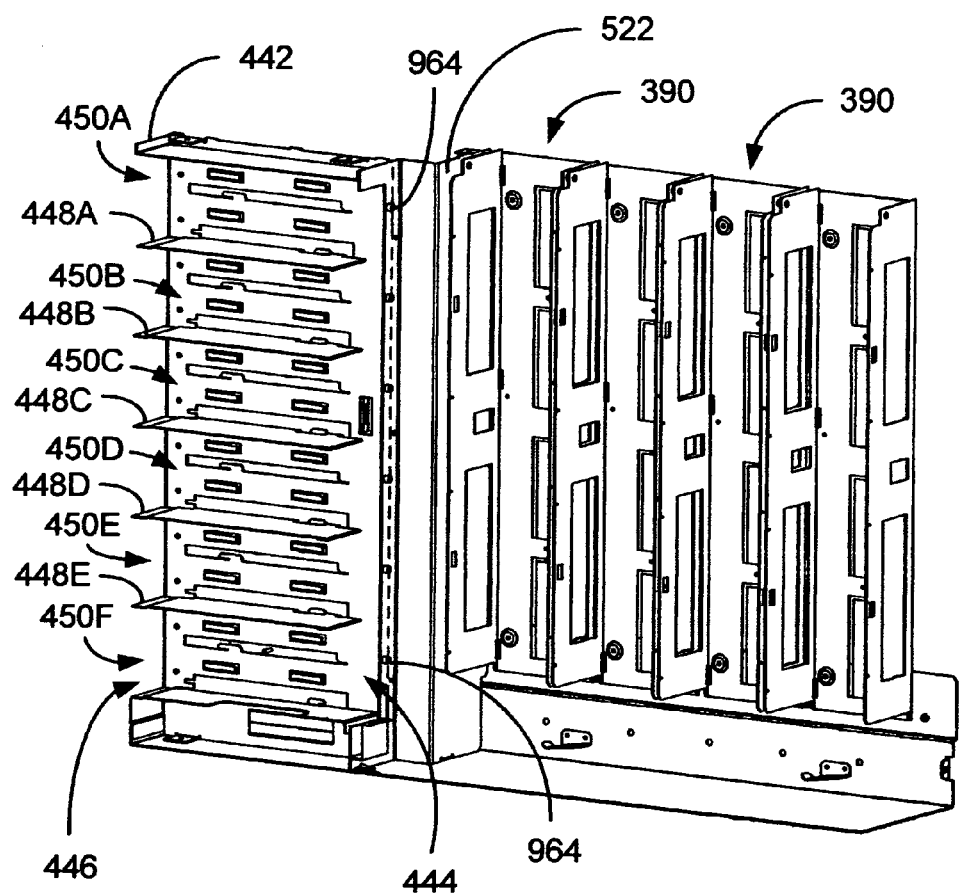

With reference to FIG. 9B, which is a cross-sectional view of the drive bay 108, the drive bay 108 is further comprised of five fixed-partitions 448A, 448B, 448C, 448D and 448E that divide the drive bay space into six, full-height drive spaces 450A, 450B, 450C, 450D, 450E and 450F, each capable of accommodating a full-height LTO drive 472 located in a drive sled 470. The portion of the frame 442 adjacent to each of the full-height drive spaces 450A, 450B, 450C, 450B and 450F defines a pair of slots 452A, 452B that are capable of engaging an insertable/removable partition 454. If the partition 454 engages one of the pair of slots 452A, 452B, the full-height drive space with which the pair of slots 452A, 452B is associated is divided into two, half-height drive spaces 456A, 456B, each capable of accommodating a half-height drive (not shown) located within a half-height drive sled 471. Consequently, the drive bay 108 can be configured to provide twelve half-height drive spaces 456A, 456B. However, because of the operation of the transport assembly 112, the upper-most and lower-most half-height drive spaces 456A, 456B cannot be utilized. As a consequence, only the middle ten of the twelve possible half-height drive spaces 456A, 456B can be utilized. In libraries that employ different transport assemblies and/or have different dimensions, this constraint on the number of half-height drives may not be present and, as such, all of the possible half-height drive spaces 456A, 456B will be capable of being utilized.

Associated with each of the full-height drive spaces 450A, 450B, 450C, 450D, 450E and 450F are first and second plugs 458A, 458B that are used to provide power and intra-library control via a controller area network (CAN) to a full-height drive 472 located in a space, such as space 450A. If a full-height drive space, such as 450A, is divided into two, half-height drive spaces, the first plug 458A is used to provide power to any half-height drive located in the half-height drive space 456A (i.e., the upper, half-height drive space) and the second plug 458B is used to provide power to any half-height drive located in the half-height drive space 456B (i.e., the lower, half-height drive space).

Figure 9C:
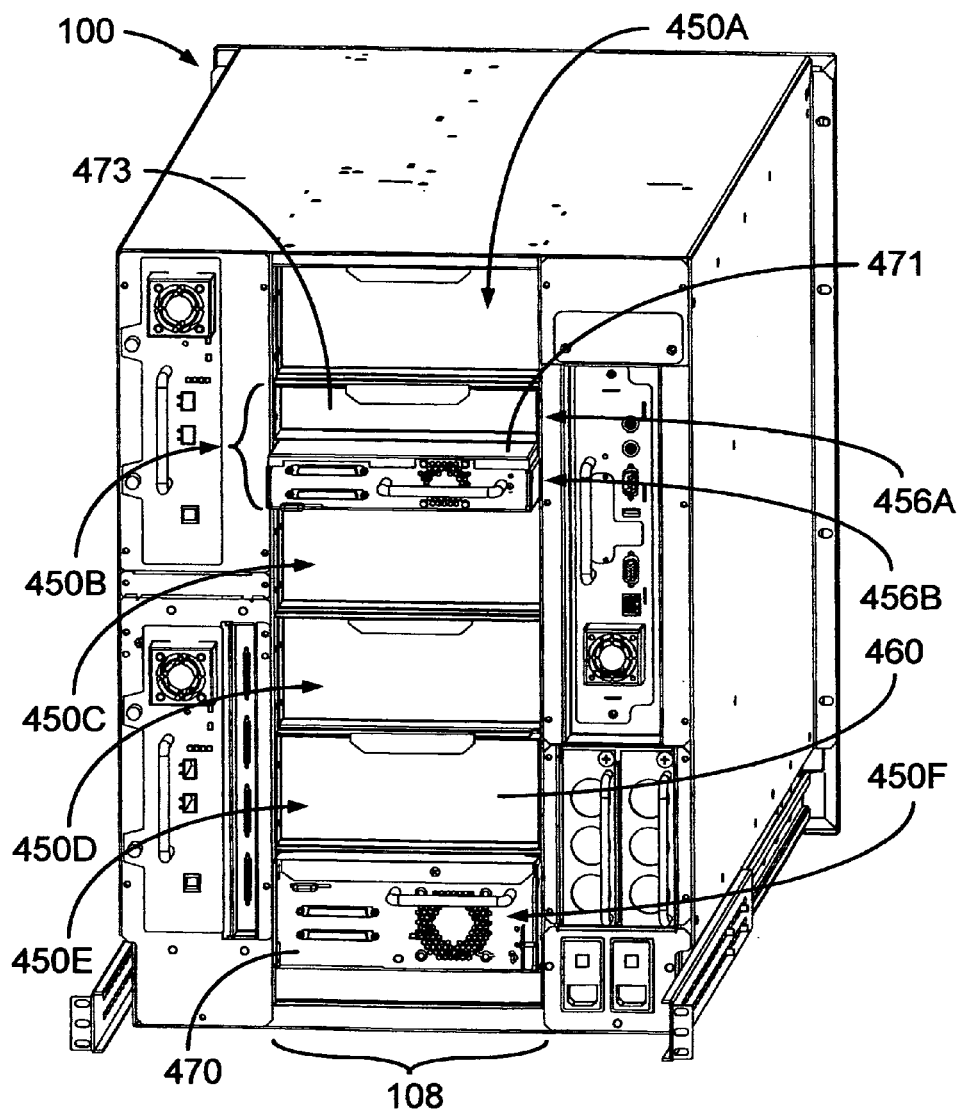

As should be appreciated, the drive bay 108 is capable of accommodating only full-height drives 472, only half-height drives, combinations of full-height 472 and half-height drives, and less than a full complement of drives. For example, FIG. 9C shows the drive bay 108 configured such that the full-height drive space 450B has been partitioned into two, half-height drive spaces 456A, 456B with one space 456A containing a half-height drive sled 471 capable of containing a half height drive and the other space 456B containing a half-height drive block-off plate 473; a full-height drive sled 470 in full-height drive space 450F; and full-height drive block-off plates 460 in each of full-height drives spaces 450A, 450C, 450D and 450E.

Figure 9D:
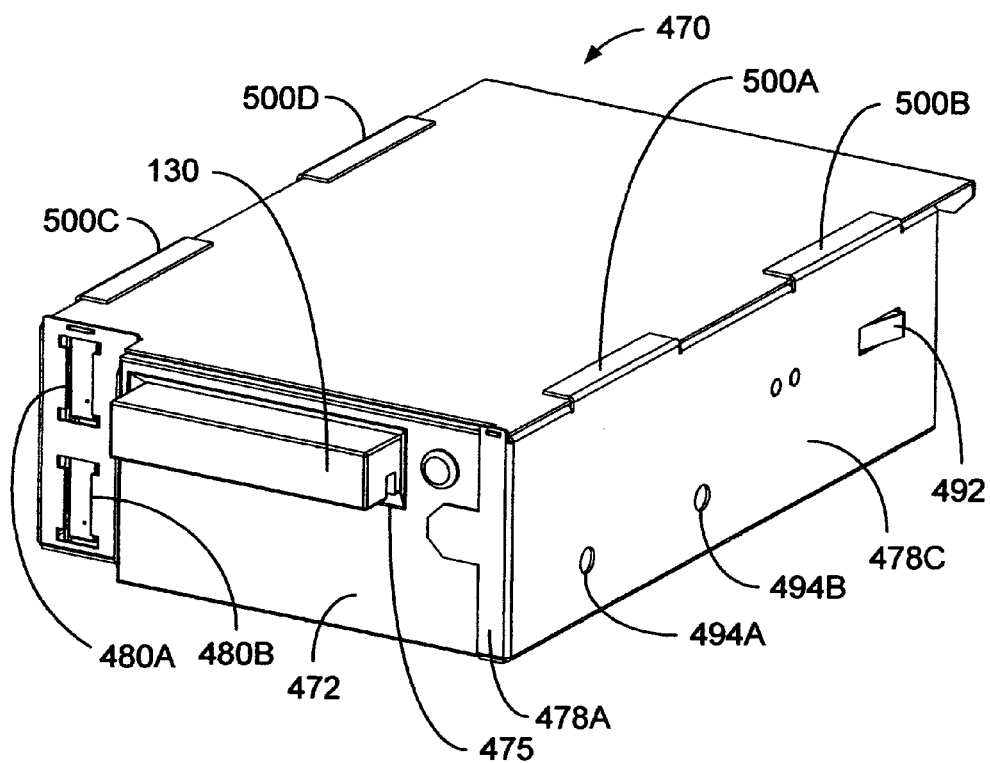
Figure 9E:
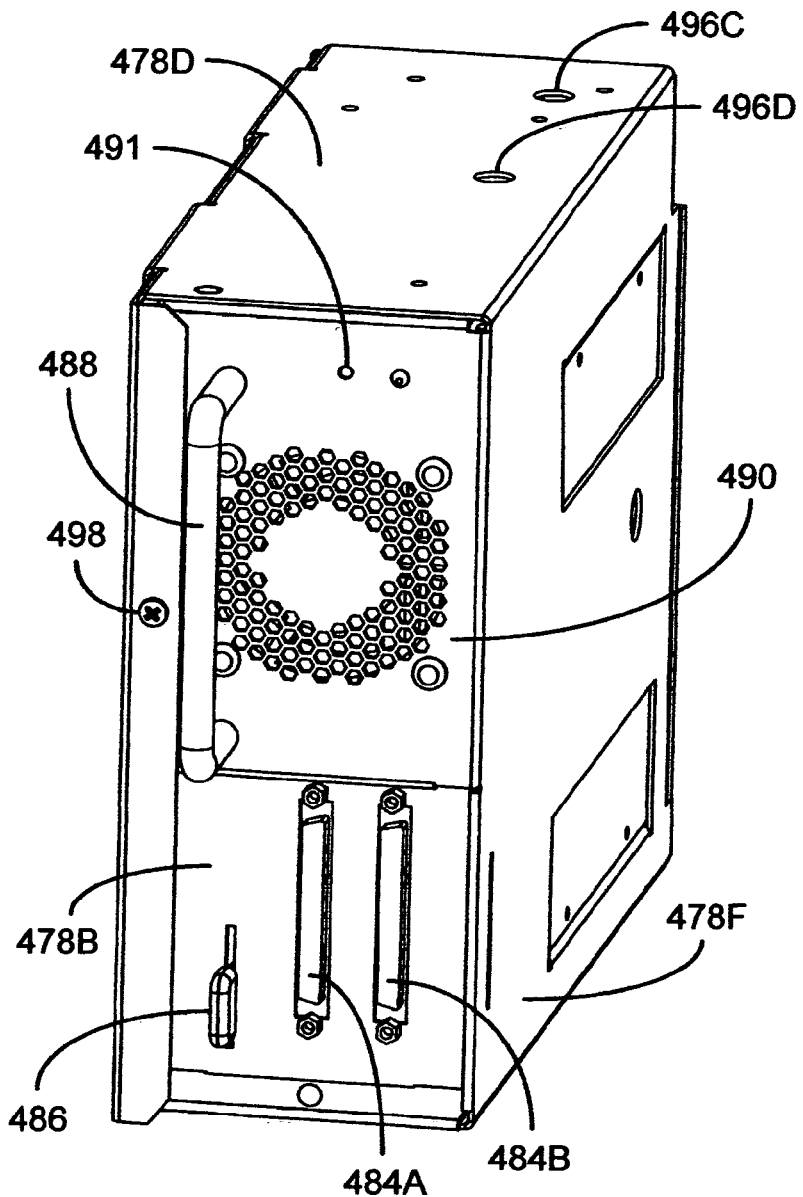
Figure 9F:
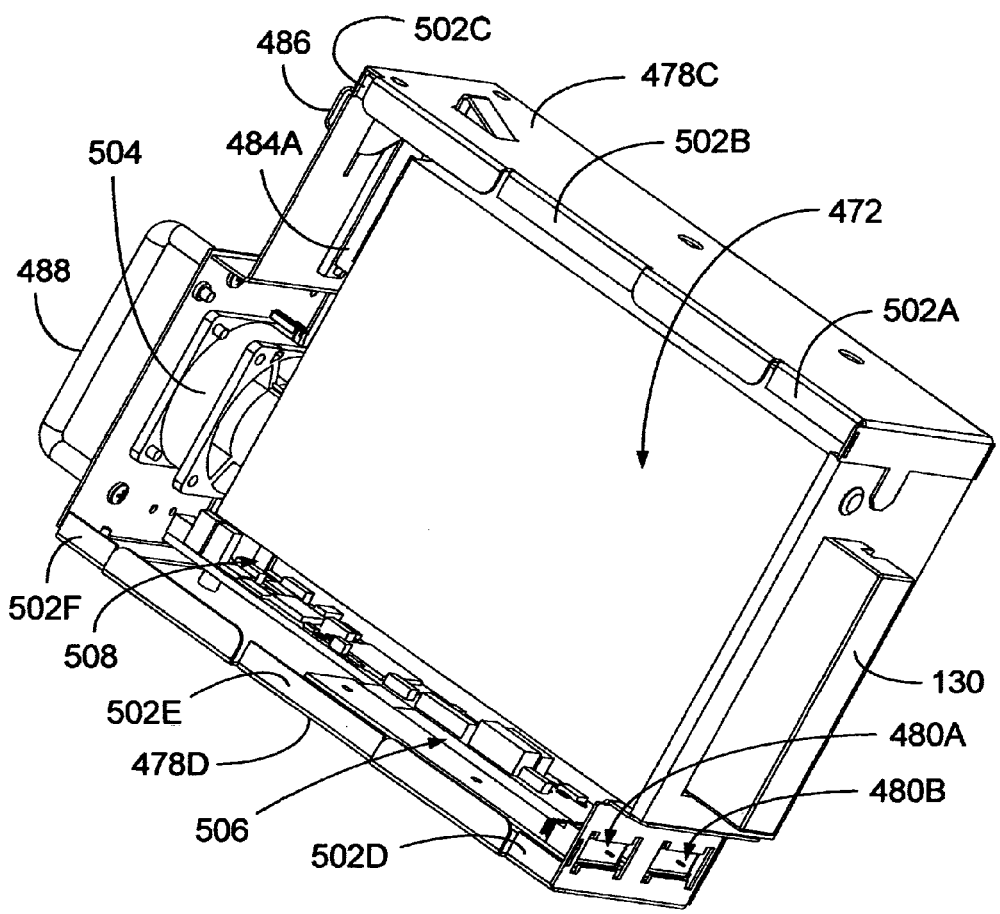

FIGS. 9D–9F illustrate a drive sled 470 for housing a full-height LTO tape drive 472. The LTO tape drive 472 is shown with an LTO tape cartridge 130 inserted in the receptacle 475 of the drive 472. The drive sled 470 generally facilitates the insertion/removal of a drive 472 into/from the drive bay 108 via the second open side 446 of the drive bay 108. More specifically, the drive sled 470 facilitates insertion of a drive 472 by allowing a power connection to be established between the drive 472 and one of the plugs 458A, 458B by inserting the drive 472 and the sled 470 into one of the full-height drive spaces 450A, 450B, 450C. 450D, 450E and 450F. The drive sled 470 facilitates removal of a drive 472 by allowing a power connection between a drive 472 and one of the plugs 458A, 458B to be terminated by extracting the sled 472 from the full-height drive space 450A–450F in which the drive 472 and sled 470 are resident.

The sled 470 comprises a housing 476 with a front side 478A, back side 478B, first lateral side 478C, second lateral side 478D, top side 478E and bottom side 478F. Associated with the front side 478A are first and second plug receptacles 480A, 480B that are adapted to engage the plugs 458A, 458B associated with a full-height drive space, such as 450A, within the drive bay 108.

Associated with the back side 478B of the housing are a pair of SCSI connectors 484A, 484B that are respectively used to establish a "daisy chain" connection to a SCSI cable over which SCSI commands and data are transmitted to/from drives, such as an LTO full-height drive 472, resident in the drive bay 108. Also associated with the back side 478B are: (a) a latch 486 that is used to retain the sled 470 with a drive bay 108; (b) a handle 488 that facilitates the insertion and extraction of the sled 470 from the drive bay 108; (c) a grill 490 for moving air from the interior of the sled 470 to the exterior environment and thereby contribute to the cooling of any drive 472 resident in the sled 470; and (d) an LED 491 that is used to provide a user with an indication of the operational status of any drive 472 resident in the sled 470.

Associated with the first lateral side 478C of the sled 470 is a spring latch 492 that is activated by the latch 486 and cooperates with the frame 442 of the drive bay 108 to retain the sled 470 within one of the drive spaces, such as 450A. The first lateral side 478C also comprises a pair of mounting holes 494A, 494B each capable of receiving a screw that, in turn, engages a threaded hole associated with the housing of a drive 472 to fix the drive 472 within the sled 470. Similarly, the second lateral side 478D comprises mounting holes 496A, 496B each capable of receiving a screw that, in turn, engages a threaded hole associated with the housing of a drive 472 to fix the drive 472 within the sled 470.

The top side 478E can be detached from the remainder of the housing so that a drive 472 can be inserted/extracted into/from the interior of the sled 470. The top side 478E is detached by removing a screw 498 and sliding the top side 478E (which is captured by overlying flanges 500A–500D and underlying flanges 502A–502F extending from the first and second lateral sides 478C and 478D) rearward.

With reference to FIG. 9F, the sled 470 comprises a fan 504 that operates to move air from the interior of the sled 470 to the exterior environment via the grill 490. The sled 470 further comprises a power distribution device 506 that distributes power received via one of the first and second receptacles 480A, 480B to the fan 504 and to any drive 472 resident in the sled 470 via a drive power connector 508. The power connector 508 is used to establish an electrical connection with the drive 472 via a power cable (not shown) that extends between the connector 508 and a power connection interface (not shown) associated with the drive 472. Similarly, the interior sides of the SCSI connectors 484A, 484B are used to establish electrical connection with the SCSI interface of the drive 472 via a SCSI cable (not shown).

A half-height sled 471 has substantially the same structure as the full-height sled 470. However, the half-height sled 471 has only one plug receptacle for receiving power from one of the plugs 458A, 458B associated with a half-height drive space, such as the half-height drive space 456A.

Figure 10A:
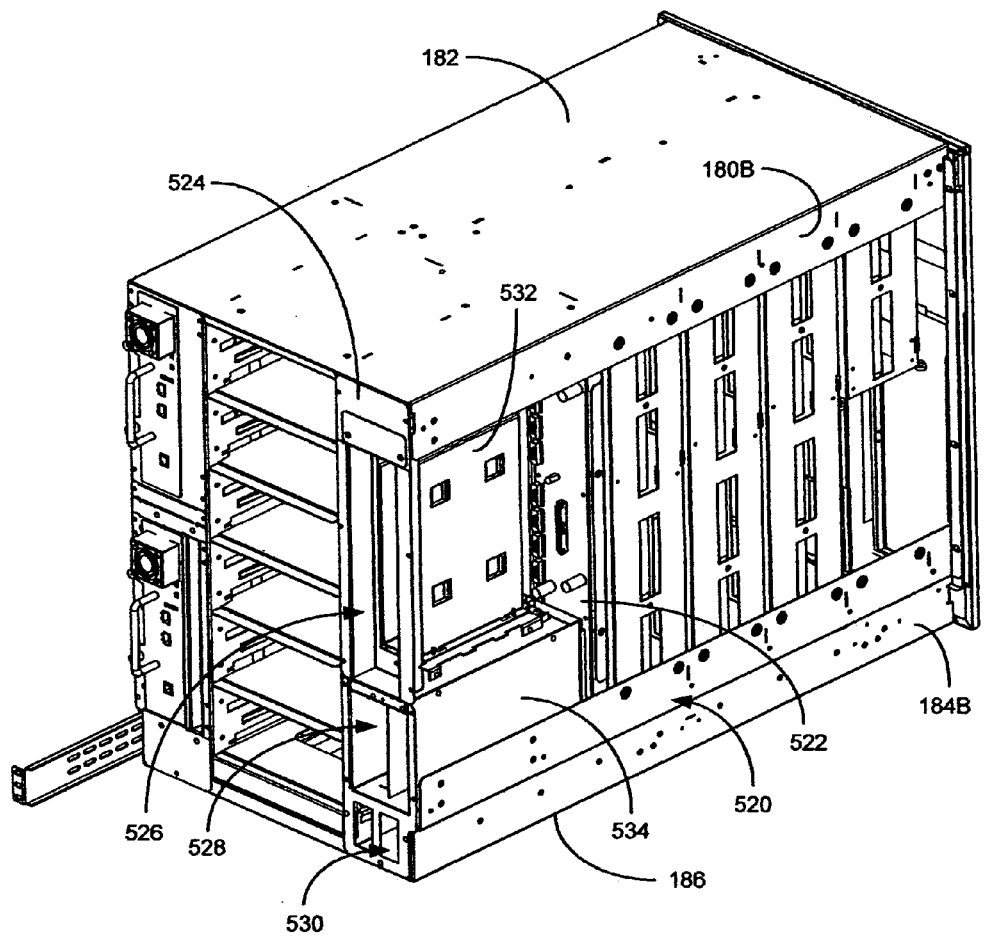
FIGS. 10A–10B illustrate the space within the library shown in FIGS. 1A–1B that is used to house power supplies and circuitry for distributing electrical power to various power consuming components within the library.
Figure 10B:
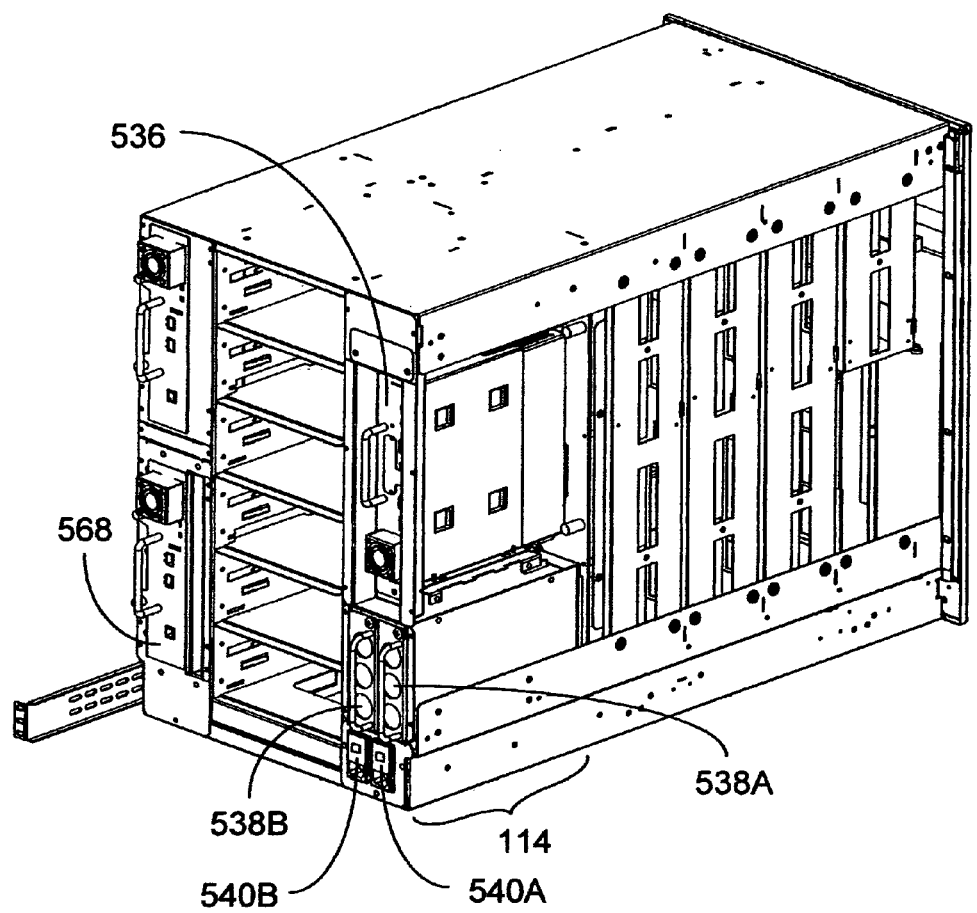

With reference to FIGS. 10A–10B, the power supply/control module bay 114 is comprised of a frame 520 that defines an interior space that accommodates a library control module 536 and a maximum of two power supplies 538A, 538B. Generally, the frame 520 is comprised of a portion of the frame 442 of the drive bay 108, a portion of the top tray 182, a section of the side portion 180B, a section of the side portion 184B, a portion of the bottom tray 186, a divider 522, and exterior wall 524. The exterior wall 524 defines a library control module opening 526 for insertion/extraction of a library control module 536 into/from the interior space; a power supply opening 528 for the insertion/extraction of power supplies 538A, 538B into/from the interior space; and plug receptacle opening 530 for accommodating the plug receptacles 540A, 540B capable of receiveing AC power plugs used to provide power to the library 100.

The bay 114 further comprises a library control module cage 532 for receiving a library control module 536 that is used to distribute power to other elements within the library 100 and control the operation of the library 100. Also comprising the bay 114 is a power supply cage 534 that is capable of accommodating two power supplies 538A, 538B. The library 100 only requires one power supply, such as 538A for example, to operate. Nonetheless, the bay 114 is able to accommodate two power supplies 538A, 538B so that there is a back-up power supply available and on-line should one of the two, power supplies 538A, 538B fail, thereby enhancing the reliability of the library 100.

FIG. 10B illustrate the power supply/library control module bay 114 fully populated, i.e. with a library control module 536 situated in the library control module cage 532 and first and second power supplies 538A, 538B located in the power supply cage 534. In addition, plug receptacles 540A, 540B are located in the plug receptacle opening 530.

Figure 11A:
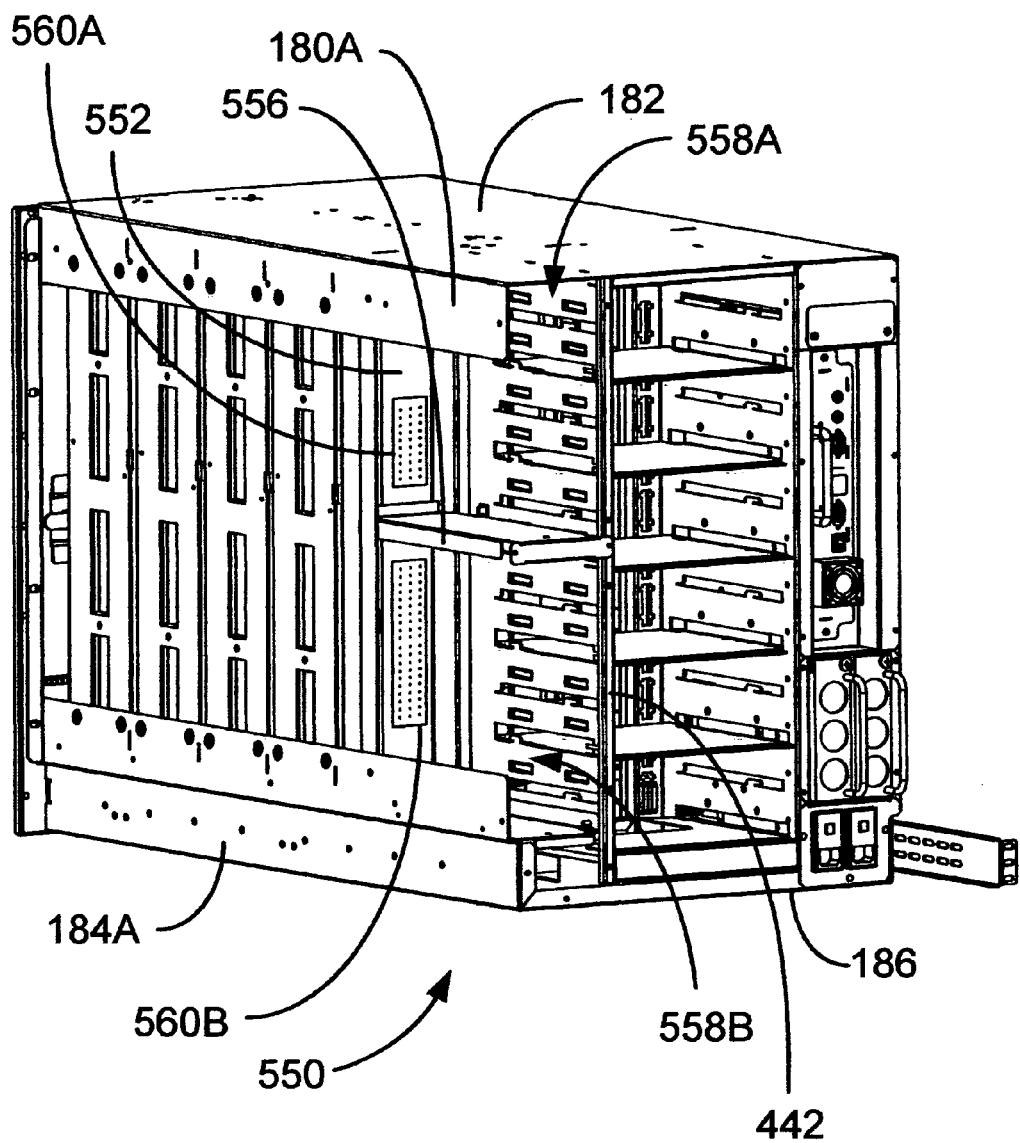
FIGS. 11A–11C a universal bay that is associated with the library shown in FIGS. 1A–1B and capable of accommodating circuitry that enhances of supplements the operation of the library but is not necessary to the operation of the library.
Figure 11B:
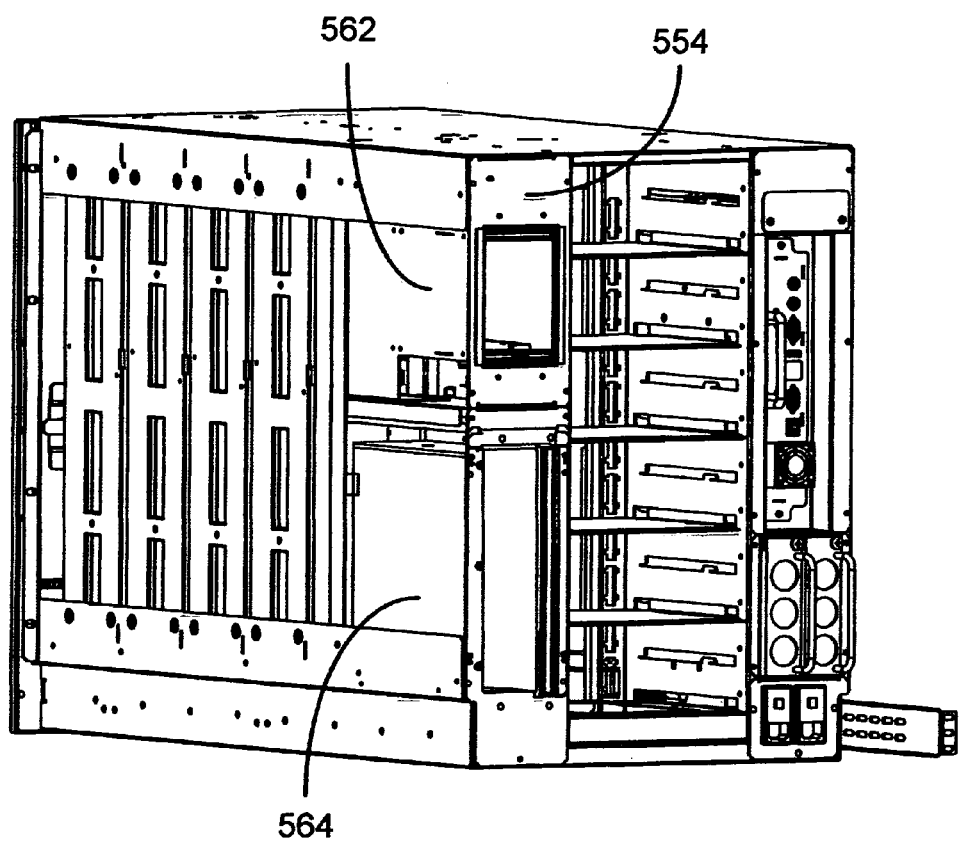
Figure 11C:
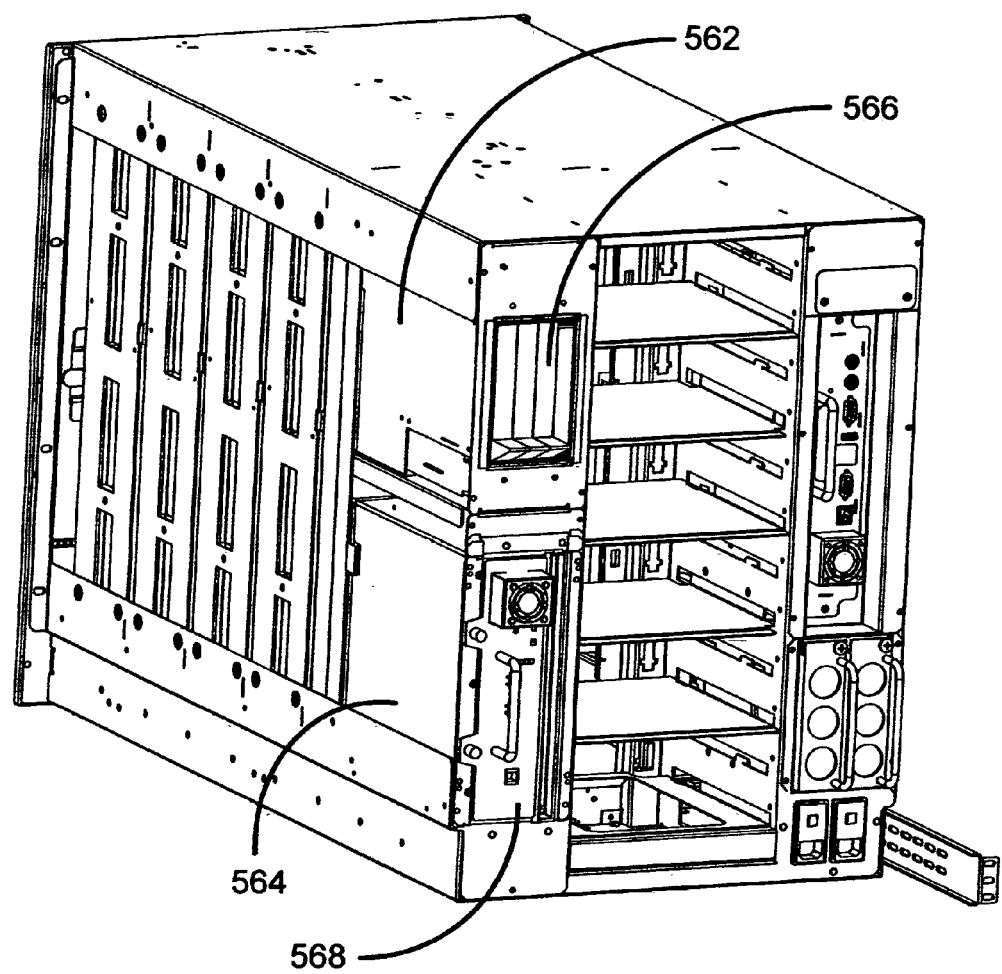

With reference to FIGS. 11A–11C, the universal bay 120 is generally for accommodating electronic or processing circuitry that can enhance or supplement the operation of the library 100 (i.e. is not necessary for the operation of the library 100). Circuitry necessary for library 100 operation is located in the power supply/library control module bay 114 or elsewhere. It should also be noted that the universal bay 120 is located in a space that is separate from the spaces dedicated to the storage of data cartridges, such as LTO cartridges 130 disposed in magazines 392 (including the entry/exit port 104); drives, such as the LTO full-height drive 472; the transport of data cartridges 130 between the space for storing data cartridges 130 the drives 472, power supply, such as the power supplies 538A, 538B, and control systems necessary for library 100 functionality. Moreover, space within the universal bay 120 is not accessible to the transport system 112.

The universal bay 120 is comprised of a frame 550 that defines an interior space that accommodates enhancing or supplementing circuitry. Generally, the frame 550 is comprised of a portion of the frame 442 of the drive bay 108, a portion of the top tray 182, a section of the side portion 180A, a section of the side portion 184A, a portion of the bottom tray 186, and a divider 552. The frame 550 also comprises an exterior wall 554 defines one or more openings that are adapted to receive desired electronics, such as the QIP 568 for example. Since the desired electronics may be in a number of different forms the number of holes, the location of any holes, and the dimensions of any holes associated with the exterior wall 554 vary depending on the desired electronics. In the illustrated embodiment, the exterior wall 554 defines the openings needed for a quad-interface process (QIP) 568 and a card cage 562 that can be used to accommodate the cards, suc as CPCI cards 566, needed to realize a PC or other device within the library 100. A QIP 568 is a device that is capable of processing, relative to the drives 472 within the library 100, SCSI data and command signals associated with four SCSI busses. Normally, the QIP 568 operates with respect to four, full-height drives 472 but is capable of operating with eight, half-height drives.

Further comprising the universal bay 120 is a partition 556 that divides the interior space of the universal bay 120 into first and second spaces 558A, 558B. The partition 556 is removable. Consequently, should a user want to use more space than either the first space 558A or the second space 558B can provide, a greater amount of space is available. It should also be appreciated that partition structures are feasible that divide the interior space into a greater number of subsidiary spaces and into spaces with different dimension than those shown.

Associated with the first space 558A is a first circuit board 560A that is operatively attached to the divider 552 and adapted to engage the interface of whatever type of circuitry is located in the first space 558A. Similarly, a second circuit board 560B is associated with the second space 558B. The second circuit board 560B is operatively attached to the divider 552 and adapted to engage the interface of whatever type of circuitry is located in the second space 558B. If the partition 556 is removed or never installed to realize a space that is bigger than that provided by either of the first and second space 558A, 558B, one or more circuit boards, such as circuit board 560A, are attached to the divider 552 and adapted to engage the interface of whatever circuitry the user chooses to locate in the space.

When the interior space of the universal bay 120 is divided into the first and second spaces 558A, 558B, there are presently the options of: (a) placing a QIP 568 in one or both of the spaces 558A, 558B; (b) placing a 3U high CPCI card cage 562 in one or both of the spaces 558A, 558B; and (c) placing a 6U high card cage (not shown) in the second space 558B, which is taller than the first space 558A. Presently, when the interior space of the universal bay 120 is undivided, the space is capable of supporting a two high, 6U card cage. For example and with reference to FIG. 11B, the universal bay 120 comprises a 3U card cage 562 located in the first space 558A and a QIP cage 564 located in the second space 558B. FIG. 11C illustrates the 3U card cage 562 populated with CPCI cards 566, and the QIP cage 564 housing a QIP 568. As should be appreciated, the use of the interior space within the universal bay 120 is not limited to the options described above.

It should be appreciated that the configuration and any reconfiguration of the drive bay 108 with drives, such as drive 472, and/or configuration or reconfiguration of the universal bay 120 can be accomplished entirely from the rear side 170B of the library 100, thereby avoiding any need to remove the library 100 from an equipment rack.

With reference to FIGS. 12A–12E, the transport system 112 is comprised of: (a) a picker 580 that is capable of grasping a data cartridge 130 that is located in a storage space, such as storage space 354, associated with the entry/exit port 104, magazine structure 106, any one of the drives, such as drive 472 used herein for illustrative purposes, located in the drive bay 108 and displacing a grasped data cartridge 130 towards or away from a data cartridge storage space, such as storage space 354; and (b) an elevator 582 that moves the picker 580 within the library 100 so that the picker 580 can perform the noted grasping and displacing operations. Due to the layout of the entry/exit port 104, the magazine structure 106 and the drive bay 108 and the need for the elevator 582 to move the picker 580 between each space associated with the entry/exit port 104, magazine structure 106 and the drive bay 108, the elevator 582 is capable of vertical and horizontal displacement of the picker 580, as well as rotation of the picker 580 about a vertical axis.

The elevator 582 comprises a picker carriage 584 that supports the picker 580. The carriage 584 is comprised of a vertical member 586, a top bracket 588 that is connected to one end of the vertical member 586, and a bottom bracket 590 that is connected to the other end of the vertical member 586.

Associated with the carriage 584 is a vertical displacement system 592 for vertically displacing to the picker 580 to a desired location between the top bracket 588 and the bottom bracket 590. The vertical displacement system 592 is comprised of: (a) a vertical linear rail 594 that is adapted to engage linear rail mounts (not shown) associated with the picker 580 to guide the picker 580; (b) a vertical drive system 596 for providing the motive force to move the picker 580 to a desired location along the linear rail 594; and (c) a vertical position sensor system 598 for determining the location of the picker 580 along the linear rail 594.

The vertical drive system 596 is comprised of: (a) a lead screw 600 with first and second ends that respectively journaled to the top bracket 588 and the bottom bracket 590; (b) a lead screw pulley 602 that is attached to the lead screw 600; (c) a stepper motor 604; (d) a spindle pulley 606 that is attached to the spindle of the stepper motor 604; and (e) a timing belt 608 that connects the lead screw pulley 602 and the spindle pulley 606.

The vertical position sensor system 598 is comprised of: (a) a home sensor 610 that detects when the picker 580 is at a "home" position, which in this embodiment is adjacent to the bottom bracket 590; and (b) an encoder bar 612 that extends between the top bracket 588 and bottom bracket 590 and is used to determine the location of the picker 580 relative to the "home" position. Also associated with the vertical position sensor system 598, is a sensor that cooperates with the encoder bar 612 to provide information on the vertical position of the picker 580 relative to the "home" position.

Operation of the vertical displacement system 592 comprises using the stepper motor 604 to drive the lead screw 600 in either a clockwise direction to cause the picker 580 to be displaced along the linear rail 594 and towards the top bracket 588 or a counter-clockwise direction to cause the picker 580 to be displaced along the linear rail 594 and towards the bottom bracket 590. The vertical sensor system 592 is used to control the stepper motor 604 so that the stepper motor 604 is operated to position the picker 580 at the desired vertical location.

To rotate the picker 580, the transport system further comprises a rotational displacement system 620 that is used to rotate the picker carriage 584 and, as a consequence, the picker 580. The rotational displacement system 620 comprises: (a) a top plate 622 and bottom plate 624 that are respectively journaled to the top bracket 588 and the bottom bracket 590 of the carriage 584 to guide the rotational movement of the carriage 584; (b) a rotational drive system 626 for providing the motive force to rotate the carriage 586 and the picker 580 to a desired rotational position relative to the top plate 622 and the bottom plate 624; and (c) a rotational position sensor system 628 for determining the rotational position of the carnage 584 and the picker 580. The rotational displacement system 620 further comprises a limiting system 630 for limiting the range of rotation of the carriage 584 and the picker 580.

The rotational drive system 626 comprises: (a) a stepper motor 632 that provides the motive force for rotating the carriage 584 and the picker 580 relative to the top plate 622 and bottom plate 624; (b) a sector gear 634 that is operatively attached to the bottom plate 624; (c) a pinion 636 that is operatively attached to the spindle of the stepper motor 632; and (d) a cluster gear 638 that is operatively attached to the bottom bracket 590 of the carriage 584 and that operates to transfer a rotational force from the pinion 636 to the sector gear 634.

The rotational position sensor system 628 comprises: (a) a flag 640 that is operatively attached to the bottom bracket 590 of the carriage 584; and (b) a detector 642 that operates to detect the flag 640 and thereby provide an indication of when the carriage 584 and picker 580 are at a "home" rotational position. Once the "home" position is detected using the flag 640 and the detector 642, the signals provided to the stepper motor 632 to cause rotation of the carriage 584 and the picker 580 are also used to calculate the rotational position of the carriage 584 and the picker 580 relative to the "home" position.

The limiting system 630 operates to limit the rotation of the carriage 584 and the picker 580 to the approximately 180 degree range that is needed to move data cartridges 130 between any of the data cartridge storage spaces 422, 354 and drive spaces, such as drive space 450A, within the library 100 that are capable of accommodating a data cartridge 130. The limiting system 630 comprises: (a) first and second bard stops 644A, 644B that are operatively connected to the bottom plate 624; and (b) member 646 that is operatively connected to the bottom bracket 590 of the carriage 584 and positioned to engage the first and second hard stops 644A, 644B to prevent rotation of the carriage 584 beyond the desired range.

Operation of the rotational displacement system 620 comprises using the stepper motor 632, pinion 636, cluster gear 638, and sector gear 634 to rotate the carriage 584 in a clockwise or counter-clockwise direction. The rotational position sensor system 628 is used to control the stepper motor 632 so that the stepper motor 632 positions the picker 580 at the desired rotational position. The limiting system 630 operates to limit the range of rotational positions at which the rotational drive system 626 can position the carriage 584 and picker 580.

The transport system 112 further comprises a horizontal displacement system 650 for horizontally translating the nicker 580. The horizontal displacement system 650 comprises: (a) a top guide system 652 for horizontally guiding the top bracket 588 of the carriage 584; (b) a bottom guide system 654 for horizontally guiding the bottom bracket 590 of the carriage 584; (c) a horizontal drive system 656 for providing the motive force to drive the carriage 586 and the picker 580 to a desired horizontal position; and (d) a horizontal position sensor system 658 for determining the horizontal position of the carriage 584 and the picker 580.

The top guide system 652 is comprised of: (a) a pair of rails 660A, 660B that are attached to the top tray 182; and (b) a roller system 662 that is comprised of a plate 664 that is fixed to the top plate 622 of the rotational displacement system 620 and a pair of rollers 666A, 666B that each engage the rails 660A, 660B. Each of the rollers 666A, 666B is pivotally attached to the plate 664.

The bottom guide system 654 is comprised of: (a) a horizontal linear rail 668 that is operatively attached to robotics module tray 670; and (b) a pair of linear rail mounts (not shown) that are operatively attached to the bottom plate 624 of the rotational displacement system 620 which engage the horizontal linear rail 668.

The horizontal drive system 656 is comprised of: (a) a stepper motor 672 that is attached to the robotic module tray 670 and provides the motive force for horizontally displacing the carriage 584 and the picker 580 that is attached to the carriage 584; (b) a bottom drive system 674 for applying a motive force to the bottom plate 624; (c) a top drive system 676 for applying a motive force to the top plate 622; and (d) a shaft 678 for transmitting a motive force from the bottom drive system 674 to the top drive system 676.

The bottom drive system 674 is comprised of: (a) drive pulley 680 that is attached to the spindle of the stepper motor 672; (b) a cluster pulley 682 that is operatively attached to the tray 670; (c) a first shaft pulley 684 that is also operatively attached to the tray 670; (d) a first timing belt 686 that extends between the drive pulley 680 and the cluster pulley 682; (e) a second timing belt 688 that extends between the cluster pulley 682 and the first shaft pulley 684; and (f) a connecting bracket 690 that connects the second timing belt 688 to the bottom plate 624. The connecting bracket 690 also incorporates a device for tensioning the second timing belt 688. Alternatively, tensioning of the second timing belt 688 can be accomplished by providing a structure for adjusting the position of at least one of the cluster pulley 682 and the first shaft pulley 684.

The top drive system 676 is comprised of: (a) pulley 692 that is attached to the top tray 182 via a bracket 694; (b) a second shaft pulley 696 that is attached to the top tray 182 via a bracket 698; (c) a third timing belt 700 that extends between the pulley 692 and the second shaft pulley 696; and (d) a connecting bracket 701 that connects the third timing belt 700 to the top plate 622. The connecting bracket 701 also incorporates a device for tensioning the third timing belt 700. A screw connection 701A allows the plate 664 to be quickly disconnected from the top plate 622.

The shaft 678 comprises: (a) a first shaft piece 702 that is operatively connected to the cluster pulley 682; (b) a second shaft piece 704 that is operatively connected to the second shaft pulley 692; and (c) a connector 706 that is used to connect the first shaft piece 702 and the second shaft piece 704. The connector 706 comprises a first spline (not shown) that is associated with the first shaft piece 702, a second spline (not shown) that is associated with the second shaft piece 704, and a spline sleeve 708 that is attached to the second shaft piece 704. The spline sleeve 708, as a result of its engagement with the second spline, is constrained such that it is not able to rotate about the second shaft piece 704 but is capable of being linearly displaced to engage and disengage the first shaft piece 702 and the second shaft piece 704. To elaborate, by sliding the spine sleeve 708 towards the first shaft 702, the spline sleeve 708 engages the spline of the first shaft piece 702 to connect the first shaft piece 702 and the second shaft piece 704. Conversely, by sliding the spume sleeve 708 away from the first shaft 702, the spine sleeve 708 disengages from the spline of the first shaft piece 702 to disengage the first shaft piece 702 and the second shaft piece 704. A collared spring structure 710 is used to bias the spine sleeve 708 towards engagement with the first shaft piece 702. Other biasing devices are feasible. Other coupling devices are also feasible. For example, the first shaft piece 702 and the second shaft piece 704 can be connected to one another and disconnected from one another using a clamping shaft coupler that utilizes a screw to adjust the diameter of a collar to engage or disengage the shaft pieces 702, 704.

The horizontal position sensor system 658 comprises: (a) a home sensor 712 for sensing when the carriage 584 and the picker 580 are at a horizontal "home" position from which other horizontal positions can be determined; (b) a coarse horizontal position sensor 714 for determining the coarse position of the carriage 584 and the picker 580; and (c) a fine horizontal position sensor 716. The coarse horizontal position sensor 714 comprises a coarse flag 718 that is operatively attached to the tray 670 and a coarse detector 720 that is operatively attached to the bottom plate 624 and that cooperates with the coarse flag 718 to determine the half of the range of possible horizontal positions in which the carriage 584 and the picker 580 are located. The fine horizontal position sensor 716 comprises a fine, crenelated flag 722 and a fine detector 724 that is operatively attached to the bottom plate 624 and that cooperates with the crenelated fine flag 722 to provide a higher resolution determination of the location of the carnage 584 and the picker 580 than provided by the coarse detector 720.

Operation of the horizontal displacement system 650 comprises using the stepper motor 672 to provide a motive force that is used to horizontally displace the carriage 584 and the picker 580 towards or away from the drive bay 108 as constrained by the top guide system 652 and the bottom guide system 654. The motive force produced by the stepper motor 672 is transmitted to the carriage 584 via the bottom drive system 674, top drive system 676, and shaft 678. The horizontal position sensor system 658 is used to determine the current position of the carriage 584 and the picker 580 relative to the "home" position.

With reference to FIGS. 14A–14F, the picker 580 is comprised of: (a) a base plate 800 that supports other elements of the picker 580; (b) a grasper assembly 802 that is capable of being placed in a "closed" state in which a data cartridge, such as the LTO data cartridge 130 used herein for illustrative purposes, can be grasped and an "open" state in which a data cartridge 130 can not be grasped; (c) a pusher plate assembly 804 that supports the grasper assembly 802 and is used in moving the grasper assembly 802 towards and away from a location in which a data cartridge 130 is located or may be located; and (d) a crank assembly 806 that provides the motive forces needed to place the grasper assembly 802 in the "open" or "closed" states and to move the pusher plate assembly 804.

In addition to supporting other elements of the picker 580, the base plate 800 also supports elements of the vertical displacement system 592 that are used to position the picker 580 at a desired vertical location. Specifically, the base plate 800 supports: (a) a pair of mounts 810A, 810B that connect the base plate 800 to the vertical linear rail 594; (b) a lead screw nut 812 that receives the lead screw 600; and (c) a vertical encoder sensor 814 that cooperates with the encoder bar 512 to provide information that is used to determine the vertical position of the picker 580. Rotation of the lead screw 600 provides a motive force that is applied to the base plate 800 via the lead screw nut 812 to move the base plate 800 to a desired vertical location along the vertical linear rail 594.

The grasper assembly 802 is comprised of: (a) a static member 820 that has a first surface 822 for engaging one side of a data cartridge 130; and (b) a moving member system 824 that has a second surface 826 for engaging the opposite side of a data cartridge 130. The moving member system 824 is also capable of being moved between a "closed" position in which the second surface 826 and the first surface 822 are capable of grasping a data cartridge 130 and an "open" position in which the second surface 826 and the first surface 822 are not capable of grasping a data cartridge 130. The grasper assembly 802 is further comprised of a bias system 828 that serves to bias the moving member system 824 such that the second surface 826 is forced towards the "closed" position. Further comprising the grasper assembly 802 is grasper cam follower 830 that interacts with a grasper cam driver associated with the crank assembly 806 to force the moving member 824 towards the "open" position. It should be appreciated that grasping assemblies, such as the grasper assembly 802, in which two moving members 824 are used to grasp and release a data cartridge 130 are also feasible. Further, grasping assemblies, such as the grasper assembly 802, in which there is a bias system, such as the bias system 828, that biases one or more members 824 that are used to grasp a data cartridge 130 towards an "open" position are feasible. Similarly, grasper assemblies that employ a grasper cam follower, such as the grasper cam follower 830, that forces one or more member 824 that are used to grasp a data cartridge 130 towards a "closed" position are feasible.

The moving member system 824 is comprised of: (a) an upper jaw 836; (b) a jaw grip 838 that is attached to the upper jaw 836 and provides the second surface 826; (c) a mount 840; (d) a u-shaped linkage 842 that extends between the mount 840 and the upper jaw 836; and (e) a link 844 that also extends between the mount 840 and the upper jaw 836. The jaw grip 838 is typically made of rubber or some other material that provides a good grip. The u-shaped linkage 842 and the link 844 operate to constrain the movement of the upper jaw 836 so that the second surface 826 associated with the jaw grip 838 does not rotate about an axis.

The bias system 828 is comprised of a spring 850 that is located within a hole 852 of a housing 854. One end of the spring 850 is located adjacent to a cover 856 that is attached to the housing 854. The other end of the spring 850 contacts a surface associated with the upper jaw 836. In operation, the spring 850 applies a force to the upper jaw 836 such that the second surface 826 is forced towards the "closed" position. Other types of bias systems are also feasible.

The grasper cam follower 830 is operatively attached to the upper jaw 836 and is comprised of a horizontal surface 860 and a transitional surface 862. The horizontal surface 860 interacts with the grasper cam driver associated with the crank assembly 806 to force the second surface 826 towards the "open" position, which is in opposition to the operation of the bias system 828. The transitional surface 826 interacts with the grasper cam driver associated with the crank assembly 806 so that there is a gradual transition of the second surface 826 between the "open" and "closed" positions.

Associated with the grasper assembly 802 is a "tape-in-jaw" sensing system 868 that is comprised of a flag assembly 870 and a sensor 872. The flag assembly 870 is comprised of a spring-loaded plunger assembly 872. In operation, the plunger of the spring-loaded plunger 872 is in a first position if the grasping assembly 802 is not grasping a data cartridge 130. If, however, the grasping assembly 802 is grasping a data cartridge 130, the plunger moves to a second position. When the pusher plate assembly 804 is at or near a fully retracted position, the sensor 872 can detect whether the plunger is in the first position or the second position. This information is used to determine which direction a crank 912 associated with the crank assembly 806 should be rotated. More specifically, if the grasper assembly 802 is grasping a data cartridge 130, the crank 912 will be rotated in whichever direction, clock-wise or counter clock-wise, will maintain the grip on the data cartridge 130. If the grasper assembly 802 is not grasping a data cartridge 130, the crank 912 will be rotated in the opposite direction from that used to maintain a grip on a data cartridge 912.

The pusher plate assembly 804 is comprised of: (a) a first member 880 that supports the gripper assembly 802 and comprises pusher plate cam follower; (b) an L-shaped member 882 that is operatively connected to the first member 880; (c) a linear rail 884 that is operatively connected to the base plate 800; (d) a pair of mounts 886A, 886B that connect the L-shaped member 882 to the linear rail 884; and (e) a roller assembly 888 that also connects the first member 880 to the base plate 800 and allows the first member 880 to move relative to the base plate 800. The linear rail 884 and pair of mounts 886A, 886B operate to constrain the movement of the gripper assembly 802 to linear movement towards and away from locations at which a data cartridge 130 is located or can be located. Other types of base plate assemblies that are capable of being used to move a gripper assembly, such as the gripper assembly 802, towards and away from locations at which a data cartridge 130 is or can be located are feasible.

The first member 800 comprises a pusher cam follower surface 894 that interacts with a pusher plate cam driver associated with the crank assembly 806 to move the pusher plate assembly 804 to a desired location along the linear rail 884. Generally, the cam follower surface 894 is comprised of two, parallel surfaces 896A, 896B. The application of a force by the pusher plate cam driver to the surface 896A drives the pusher plate assembly 804 away from the elevator 582. Conversely, the application of a force by the pusher plate cam driver to the surface 896B drives the pusher plate assembly 804 towards the elevator 582. Forming a portion of the surface 896A is a compliance member 898 that flexes to reduce the force being applied by the pusher plate cam driver to a data cartridge 130 that has been contacted by the grasper assembly 802. In the illustrated embodiment, the compliance member 898 is comprised of a flat spring 900 that is located in a recess 902. One end of the spring 900 is fixed to the first member 880 and the other end of the spring 900 floats within the recess 902 to allow the spring 900 to flex. Forming a portion of the surface 896B is a dwell 904 that prevents the pusher plate cam driver from applying a force to the pusher plate assembly 804 over the extent of the dwell 898.

The crank assembly 806 is comprised of: (a) a motor assembly 910 for providing a rotational motive force; (b) a crank 912 for rotating about an axis 913 in response to the rotational motive force provided by the motor assembly 910; and (c) a camming structure 914 that provides a grasper cam driver surface for interacting with a grasper cam follower 830 and a pusher plate cam driver surface for interacting with a pusher plate cam follower 894, and moves through the operation of the motor assembly 910 and the crank 912.

The motor assembly 910 is comprised of: (a) a stepper motor 920 that is attached to the base plate 800; and (b) a pinion 922 that is attached to the spindle of the stepper motor 920. The stepper motor 920 is capable of rotating the pinion 922 in a clock-wise direction and a counter-clockwise direction.

The crank 912 is comprised of: (a) a crank spindle 928 that is attached to the base plate 800; (b) a crank top 930; (c) an inner gear 932 that is attached to the crank top 930 and that engages the pinion 922 that is associated with the stepper motor 920; and (d) a bearing assembly 934 that connects the crank top 930 and the inner gear 932 to the spindle 928.

The camming structure 914 is operatively attached to the crank top 930 and is comprised of a cylindrical surface 940 and a spherical surface 942. All or a substantial portion of the cylindrical surface 940 is the pusher plate cam driver surface that interacts with the pusher plate cam follower surface 894 to move the pusher plate assembly 804. The cylindrical surface 940 has a surface vector that is substantially perpendicular to the axis 913. Pusher plate cam driver surfaces that are other than cylindrical surfaces are feasible provided the surface is capable of interacting with a pusher plate cam follower surface 894 to move the pusher plate 804 to the desired location. At least a portion of the spherical surface 942 is the grasper cam driver surface that interacts with the grasper cam follower 830 to force the second surface 826 associated with the upper jaw 836 to move towards the "open" position.

Associated with the crank assembly 806 is a crank position sensing system 948 that is comprised of: (a) a 50/50 flag 950 that is attached to the underside of the crank top 930 and used to determine whether the crank 912 is within a first 180 degree range of operation or a second 180 degree range of operation that does not substantially overlap with the first 180 degree range of operation; (b) a 50/50 flag sensor 952 for detecting the 50/50 flag; (c) a plurality of pins 954 that are attached to the underside of the crank top 930 and used to determine where the crank 912 is operating to a greater degree of accuracy than is possible with the 50/50 flag 950; and (d) an encoder sensor 956 for detecting pins associated with the plurality of pins 954.

Also associated with the picker 580 is a calibration sensor 962 that is used to orient and/or calibrate the positioning systems within the library 100 by detecting the orientation structures 368A, 368B associated with the entry/exit port magazine 310, the top surfaces of the slit defining structures 418 of the magazines in the magazine structure 106, and drive orientation structures 964 (see FIG. 9B) associated with the frame 442 of the drive bay 108.

Further associated with the picker 580 is a bar code sensor 966 that is used to detect a bar code that is associated with an entry/exit port magazine 310 and bar codes associated with data cartridges 130 located within the library 100.

With reference to FIGS. 15A1–15D2, the operation of the picker 580 in grasping an LTO data cartridge 130 is described. FIGS. 15A1 and 15A2 illustrate the situation in which: (a) the picker 580 has been positioned adjacent to the data cartridge 130 that is to be grasped; and (b) the pusher plate assembly 804 is fully retracted, i.e., the crank assembly 806 has been used to position the pusher plate assembly 804 as close to the elevator 582 as is possible. In this state, a portion of the spherical surface 942 is engaging the horizontal surface 860 of the grasper cam follower 830. As a consequence, the moving member 824 is positioned such that the second surface 826 and the first surface 822 are in the "open" position, i.e., incapable of grasping a data cartridge 130. Further, the flag assembly 870 of the tape-in-jaw sensory system 868 is in a state that indicates that there is no tape (data cartridge 130) located between the first surface 822 and the second surface 826.

FIGS. 15B1 and 15B2 illustrate the state of the picker 580 and the data cartridge 130 after the crank 912 has rotated the camming structure 914 in a counter-clockwise direction 984 though about 180 degrees relative to position of the camming structure 914 shown in FIGS. 15A1 and 15A2. The rotation of the camming structure 914 has caused the pusher plate cam driver portion of the cylindrical surface 940 to apply a force to the pusher cam follower surface 896A that has moved the pusher plate assembly 804 from the position shown in FIG. 15A1 to the position shown in FIG. 15A2. At this point, the spherical surface 942 is still engaging the horizontal surface 860 of the grasper cam follower 830. Consequently, the first surface 822 and the second surface 826 of the grasper assembly 802 are still in the "open" position. Since the data cartridge 130 is now in between the first surface 822 and the second surface 826, the flag assembly 870 is now in a state that indicates this condition. However, the flag assembly 870 is not yet positioned so that the plunger of the spring-loaded plunger assembly 872 can be detected by the sensor 872.

FIGS. 15C1 and 15C2 illustrate the state of the picker 580 and the data cartridge 130 after the crank 912 has slightly further rotated the camming structure 914 in the counter-clockwise direction 984 relative to the rotational position of the camming structure 914 shown in FIGS. 15B1 and 15B2. Due to the operation of the compliance member 898, the further rotation has resulted in little, if any, further linear displacement of the pusher plate assembly 804. The spherical surface 942 is, due to the further rotation, no longer in contact with the grasper cam follower 830. As a consequence, the bias system 828 has caused the second surface 826 to move towards the first surface 822 and the cartridge 130 to be grasped. The flag assembly 870 is still in a state that indicates that a cartridge 130 is located between the first surface 822 and the second surface 826. Further, the flag assembly 870 is still not positioned so that the sensor 872 can detect the plunger associated with the assembly 870.

FIGS. 15D1 and 15D2 illustrate the state of the picker 580 and the data cartridge 130 after the crank 912 has further rotated the camming structure 914 in the counter-clockwise direction 984 through about 180 degrees relative to position of the camming structure 914 shown in FIGS. 15B1 and 15B2, i.e. almost back to the fully retracted position. The further rotation of the camming structure 914 has caused the pusher plate cam driver portion of the cylindrical surface 940 to apply a force to the pusher cam follower surface 896B that has moved the pusher plate assembly 804 from the position shown in FIG. 15B1 to the position shown in FIG. 15D2. The spherical surface 942 is still not in contact with the grasper cam follower 830. As a consequence, the first surface 822 and the second surface 826 are still grasping the cartridge 130. The flag assembly 870 is still in a state that indicates that the cartridge 130 is located between the first surface 822 and the second surface 826. However, the plunger associated with the flag assembly 870 is now positioned so that the sensor 872 can detect the plunger. The facts that the sensor 872 has detected that the data cartridge 130 is located between the first surface 822 and the second surface 826 and that the pusher plate assembly 804 is at or near to the fully retracted position dictate that any subsequent rotation of the crank 912 must be in the clockwise direction. Further rotation of the crank 912 in the counter-clockwise direction would result in the second surface 826 being displaced away from the first surface, which could result in the cartridge 130 being dropped. Insertion of the grasped data cartridge 130 into a location that is capable of holding the cartridge 130 is accomplished by reversing the noted operations, which involves clockwise rotation of the crank 912.

Figure 16A:
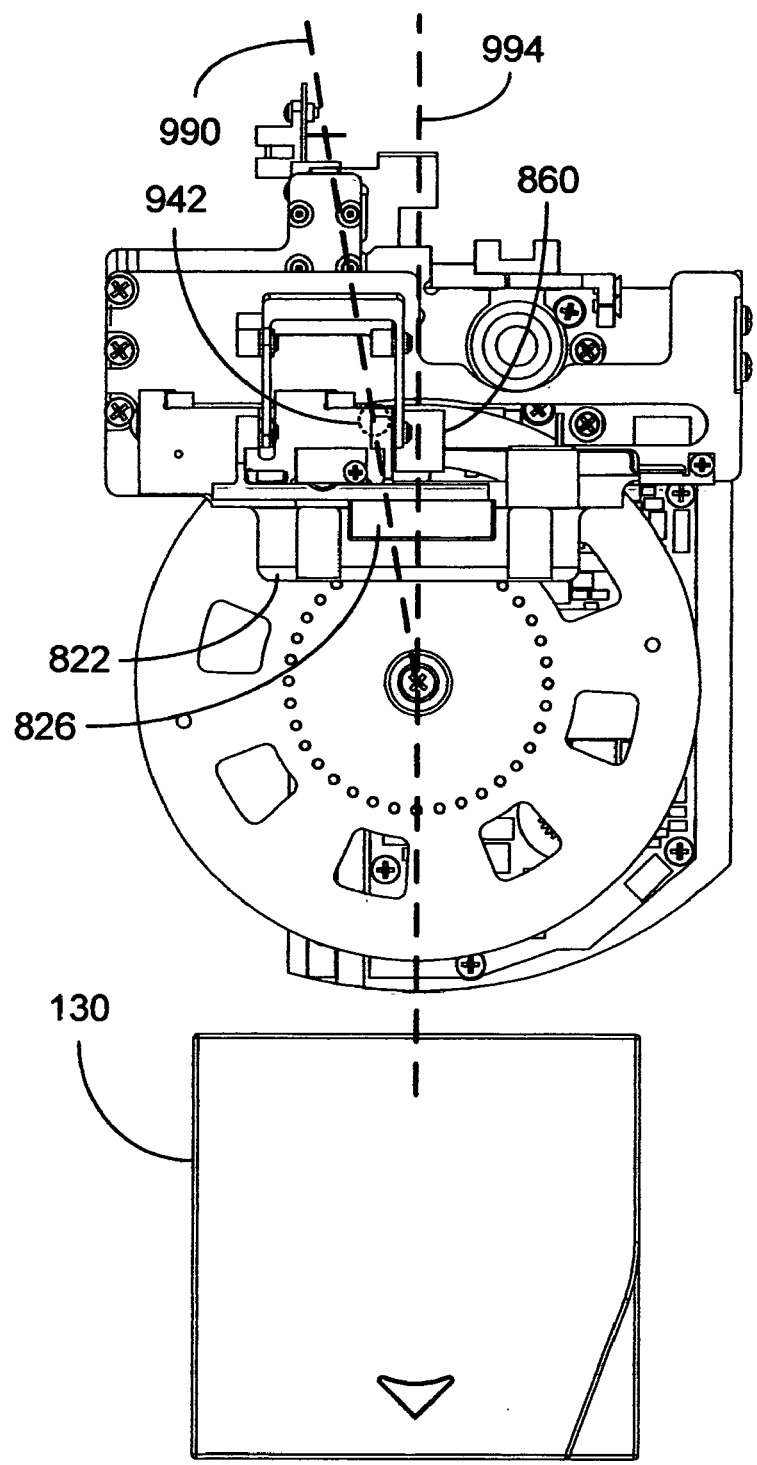
FIGS. 16A–16D illustrate the ranges of rotation of the crank during which the grasper assembly is in the open position and in the closed position.
Figure 16B:
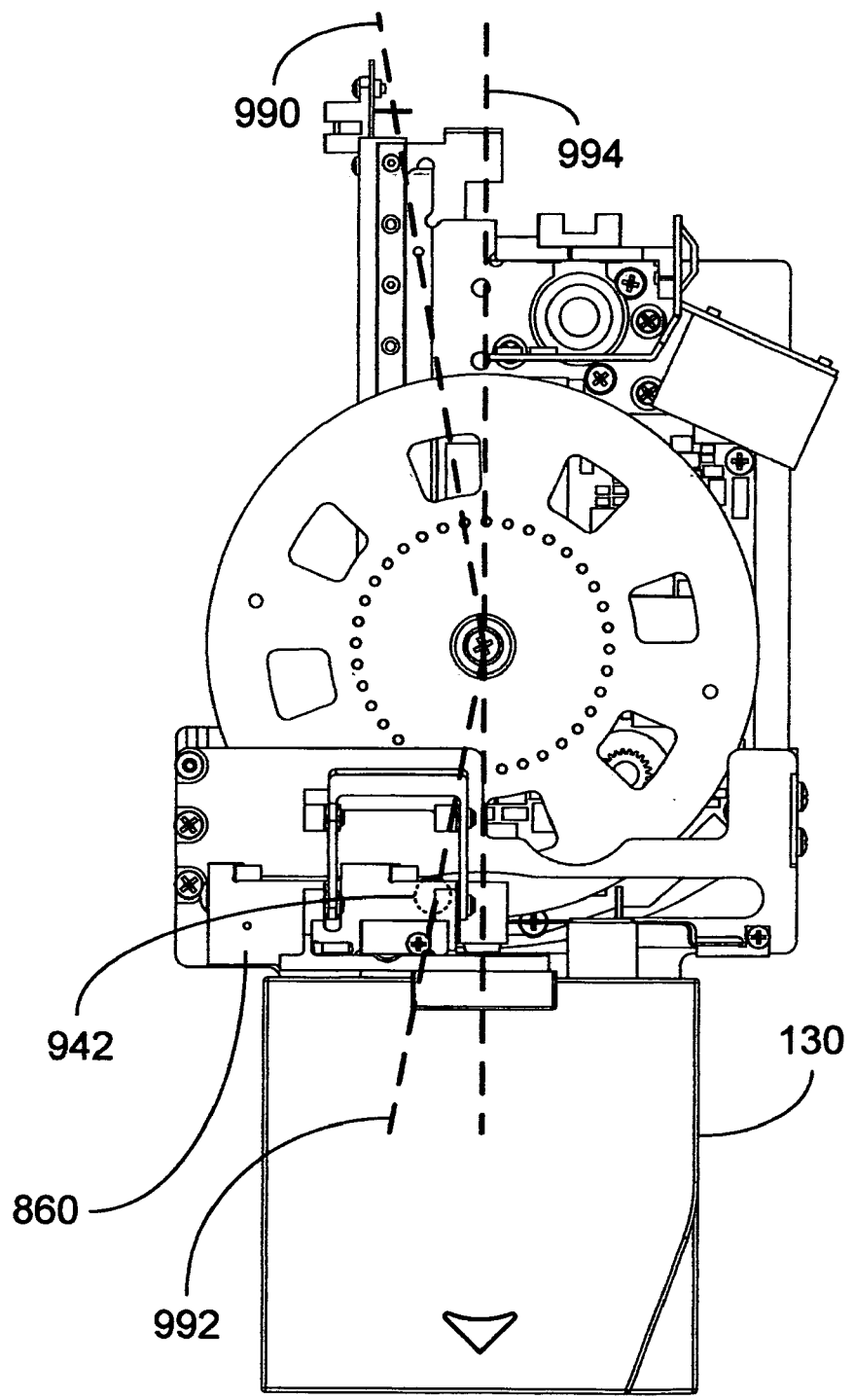

It should be appreciated that the picker 580 operates such that: (a) for a first range of the rotation of the crank 912, the grasper assembly 802 is in the open position and incapable of grasping a cartridge, and (b) for a second range of rotation of the crank 912 that does not substantially overlap with the first range, the grasper assembly 802 is in the closed position that allows a cartridge 130 to be grasped. With reference to FIGS. 16A–16D, the ranges over which the grasper assembly 802 is in the open position, closed position, and transitioning between the open and closed positions are illustrated. FIG. 16A, which corresponds to FIGS. 15A1 and 15A2, illustrates the spherical surface 942 engaging the horizontal surface 860 of the grasper cain follower 830 at a point immediately adjacent to the transitional surface 862 of the grasper cam follower 830. Consequently, FIG. 16A illustrates an approximate first end point 990 of the first range of rotation of the crank 912 during which the grasper assembly 802 is in the open position. FIG. 16B, which corresponds to FIGS. 15B1 and 15B2, shows the spherical surface 942 engaging the horizontal surface 860 of the grasper cam follower 830 at point immediately adjacent to the transitional surface 862 after the crank 912 has rotated the camming structure 914 through approximately 180 degrees relative to the position of the camming structure 914 shown in FIG. 16A. At this point, the grasper assembly 802 is still in the open position. Consequently, FIG. 16B illustrates an approximate second end point 992 of the first range. As illustrated, the range between the first and second end points 990, 992, relative to a center line 994, is somewhat less than 180 degrees.

Figure 16C:
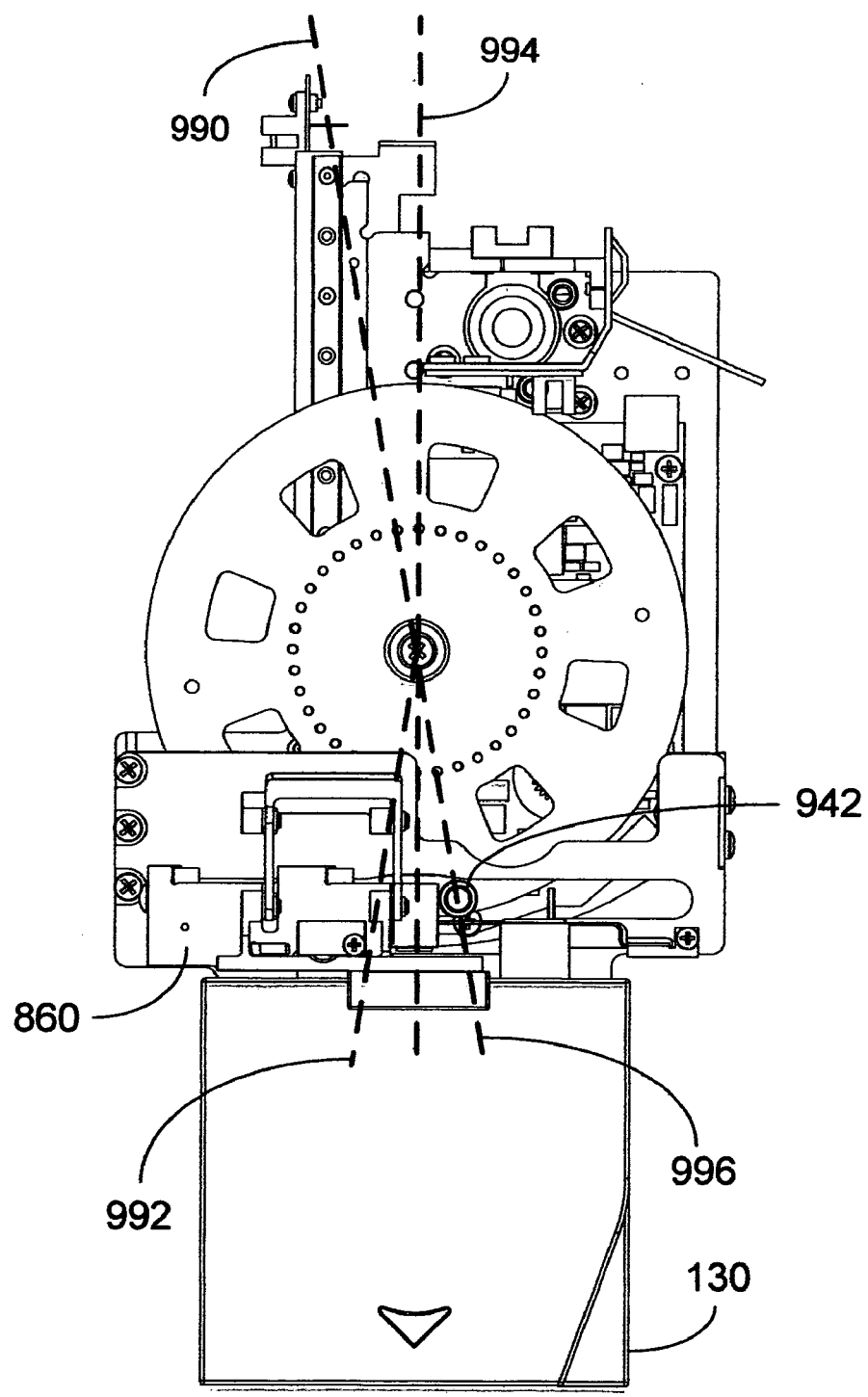
Figure 16D:
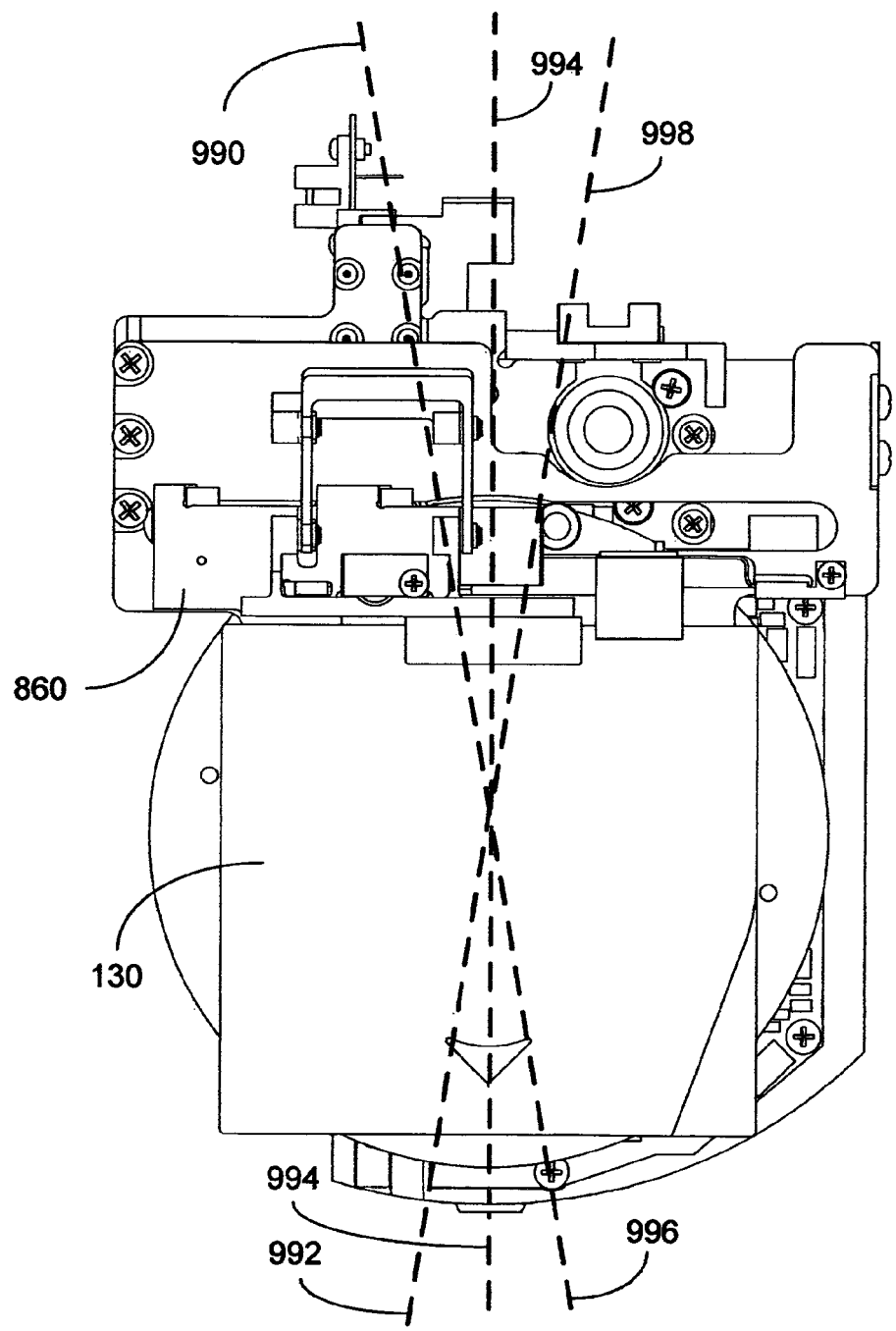

With reference to FIG. 16C, which corresponds to FIGS. 15C1 and 15C2, the spherical surface 942 is not engaging the grasper cain follower 830 and is positioned at a point immediately adjacent to the transitional surface 862. At this point, the grasper assembly 802 is in the closed position. Consequently, FIG. 16C illustrates an approximate first end point 996 of the second range of rotation of the crank 912 during which the grasper assembly 802 is in the closed position. FIG. 16D, which corresponds to FIGS. 15D1 and 15D2, shows the spherical surface 942 immediately adjacent to the transitional surface 862 of the grasper cam follower 830 after the crank 912 has rotated the camming structure 914 through approximately 180 degrees relative to the position of the camming structure 914 shown in FIG. 16C. Consequently, FIG. 16D illustrates an approximate second end point 998 of the second range. As illustrated, the range between the first and second end points 996, 998, relative to a center line 994, is somewhat less than 180 degrees.

Between the second end point 992 of the first range and the first end point 996 of the second range, the spherical surface 942 is engaging the transitional surface 862 of the grasper cam follower 830 and the grasper assembly 802 is between the open and closed positions. Similarly, between the second end point 998 of the second range and the first end point 990 of the first range, the spherical surface 942 is engaging the transitional surface 862 of the grasper cam follower 830 and the grasper assembly 802 is between the open and closed positions. When the grasper assembly 802 is between the open and closed positions, the ability of the grasper assembly 802 to grasp a cartridge 130 is ambiguous. Consequently, the end points of the first and second ranges may lie in the ranges associated with the transition of the grasper assembly 802 between the open and closed positions. As such the first and second ranges may lie closer to 180 degrees or may exceed 180 degrees. In any event, the ranges are each approximately 180 degrees and do not substantially overlap.

It should be appreciated that picker 580 can be designed such the grasper 804 is in an open position for a first range of rotation of a crank 912 and in a closed position for a second range of rotation of the crank 912 that does not substantially overlap with the first range of rotation where the ranges are different than those illustrated in FIGS. 16A–16D.

Figure 12B:
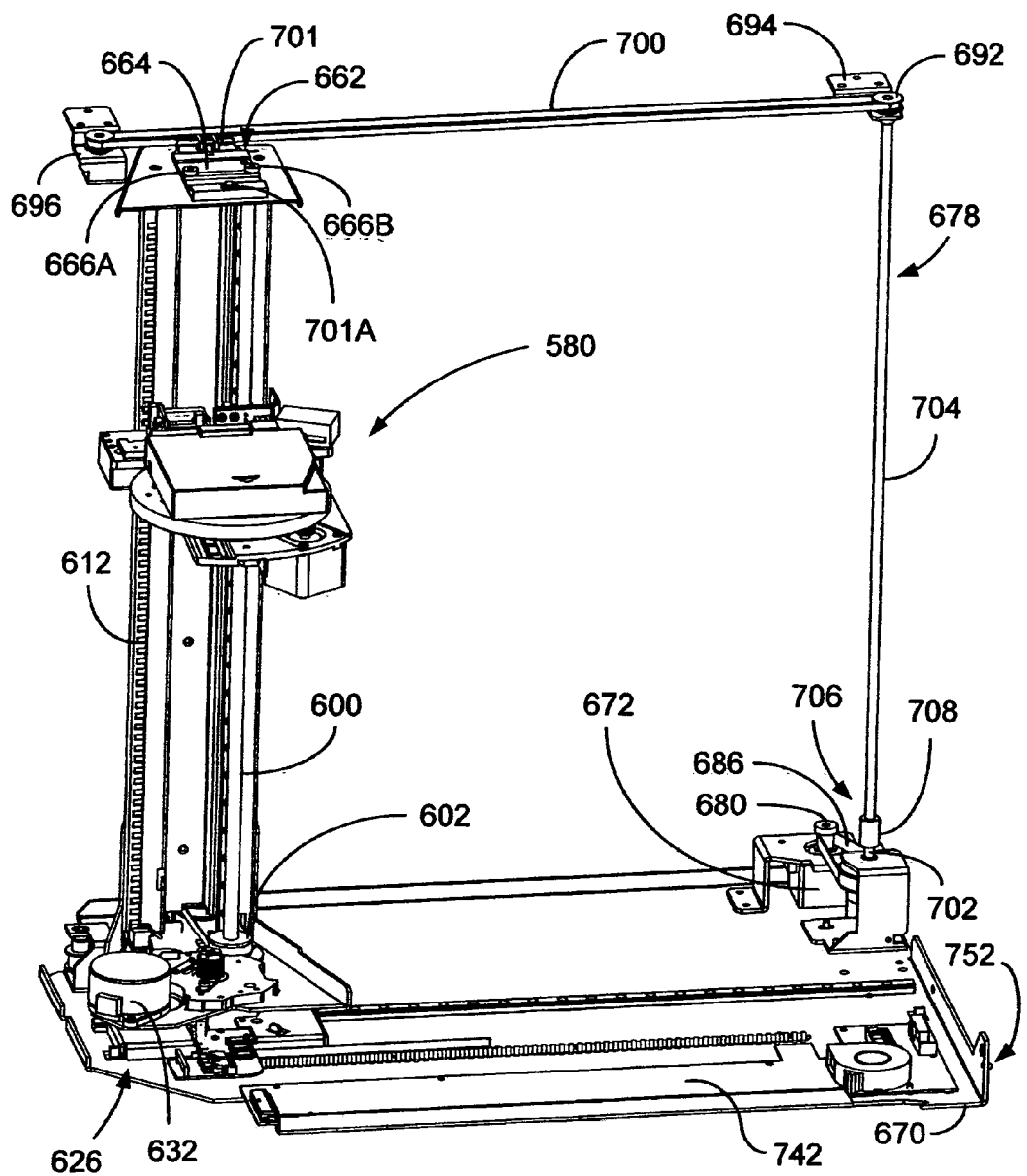
Figure 12C:
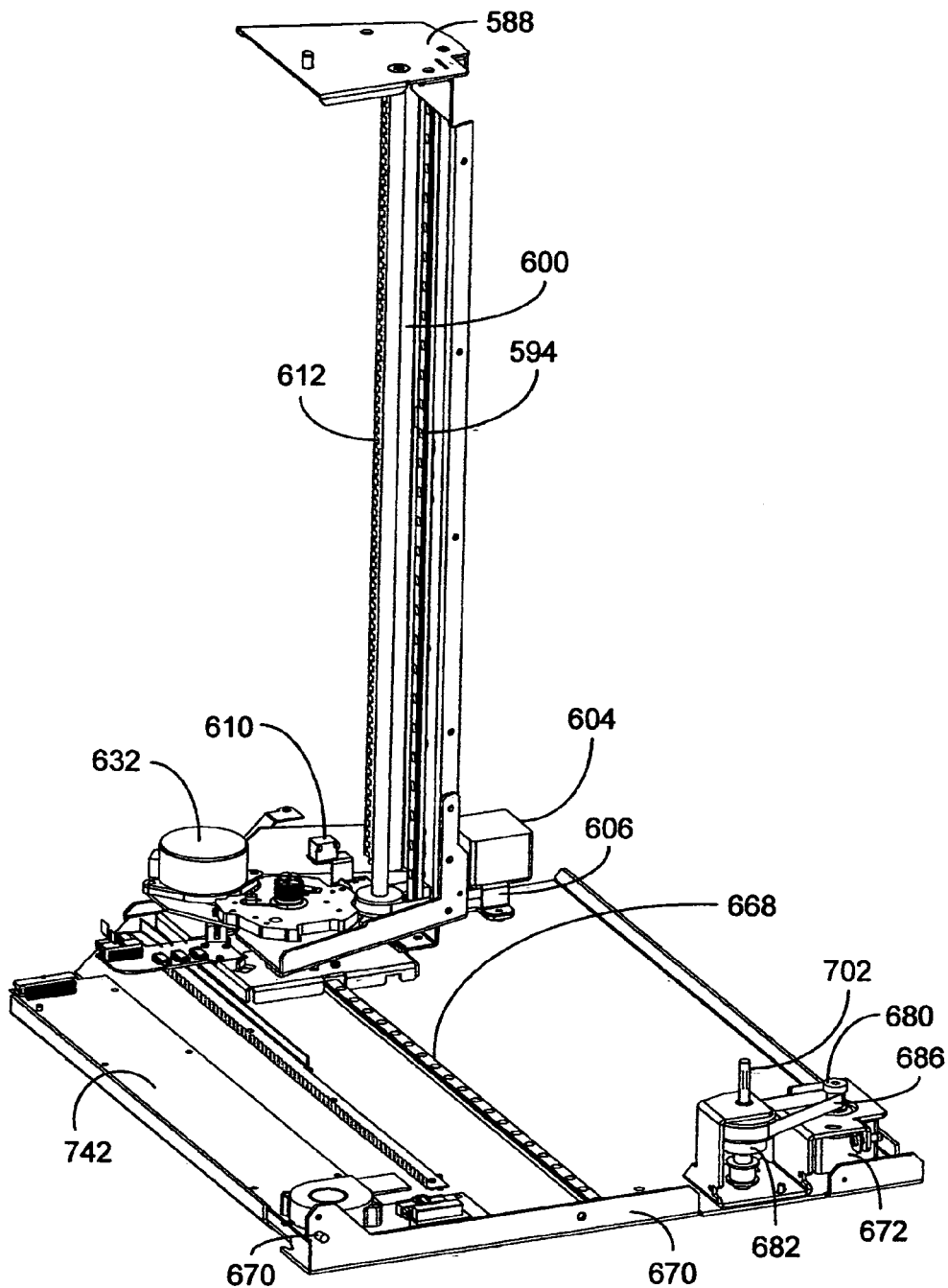
Figure 12D:
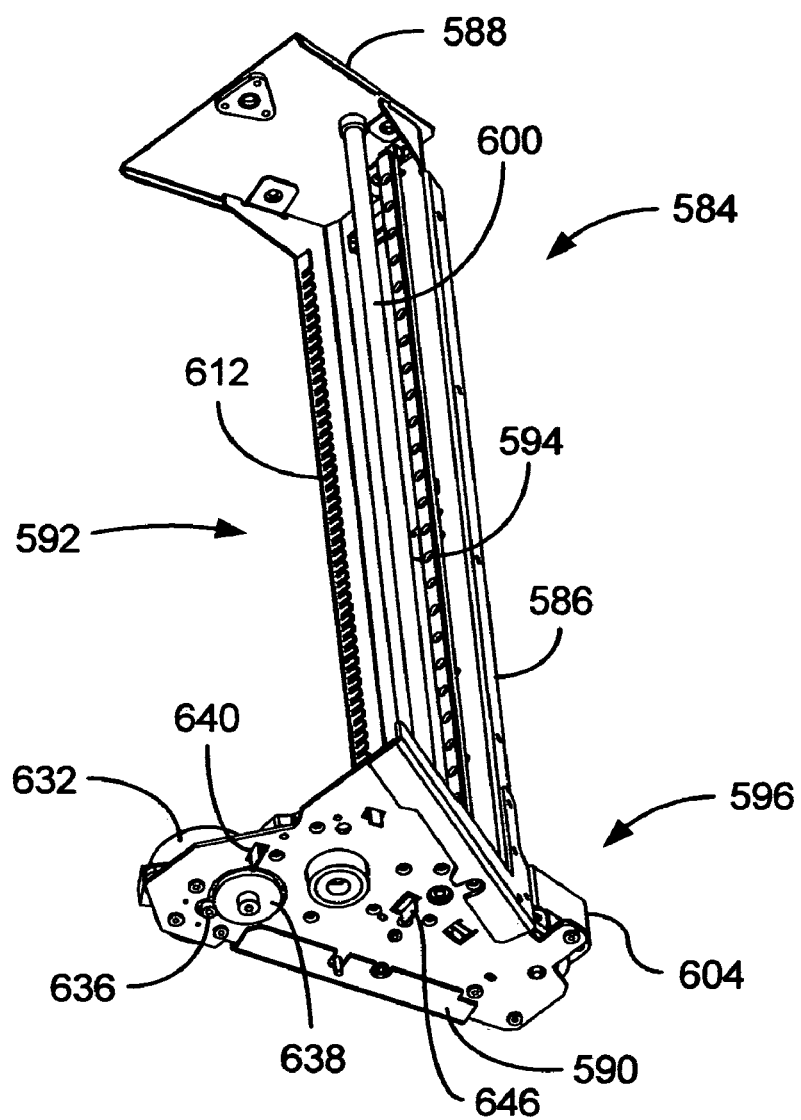
Figure 12E:
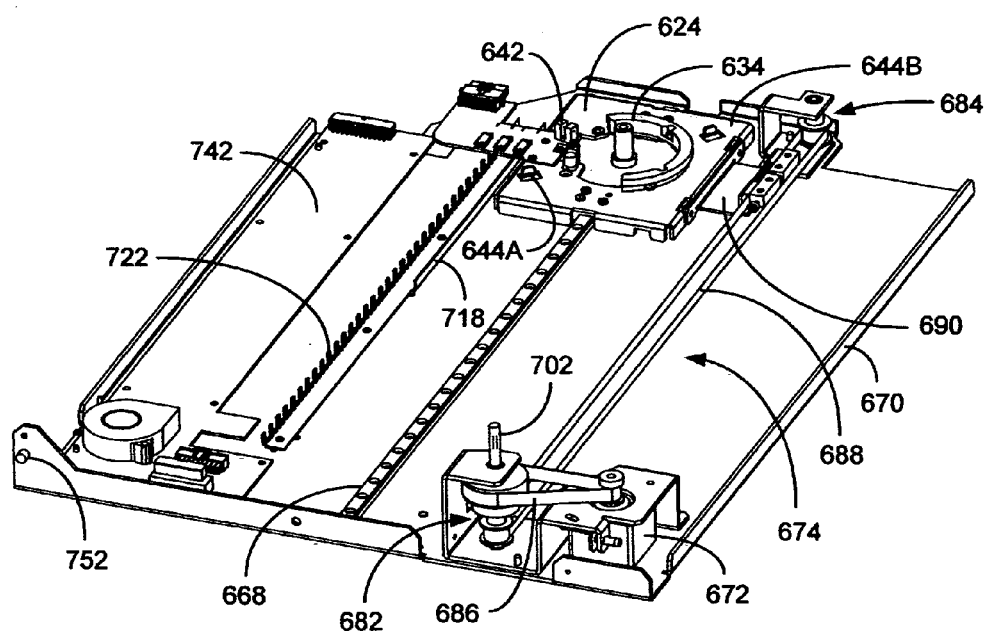
Figure 12F:
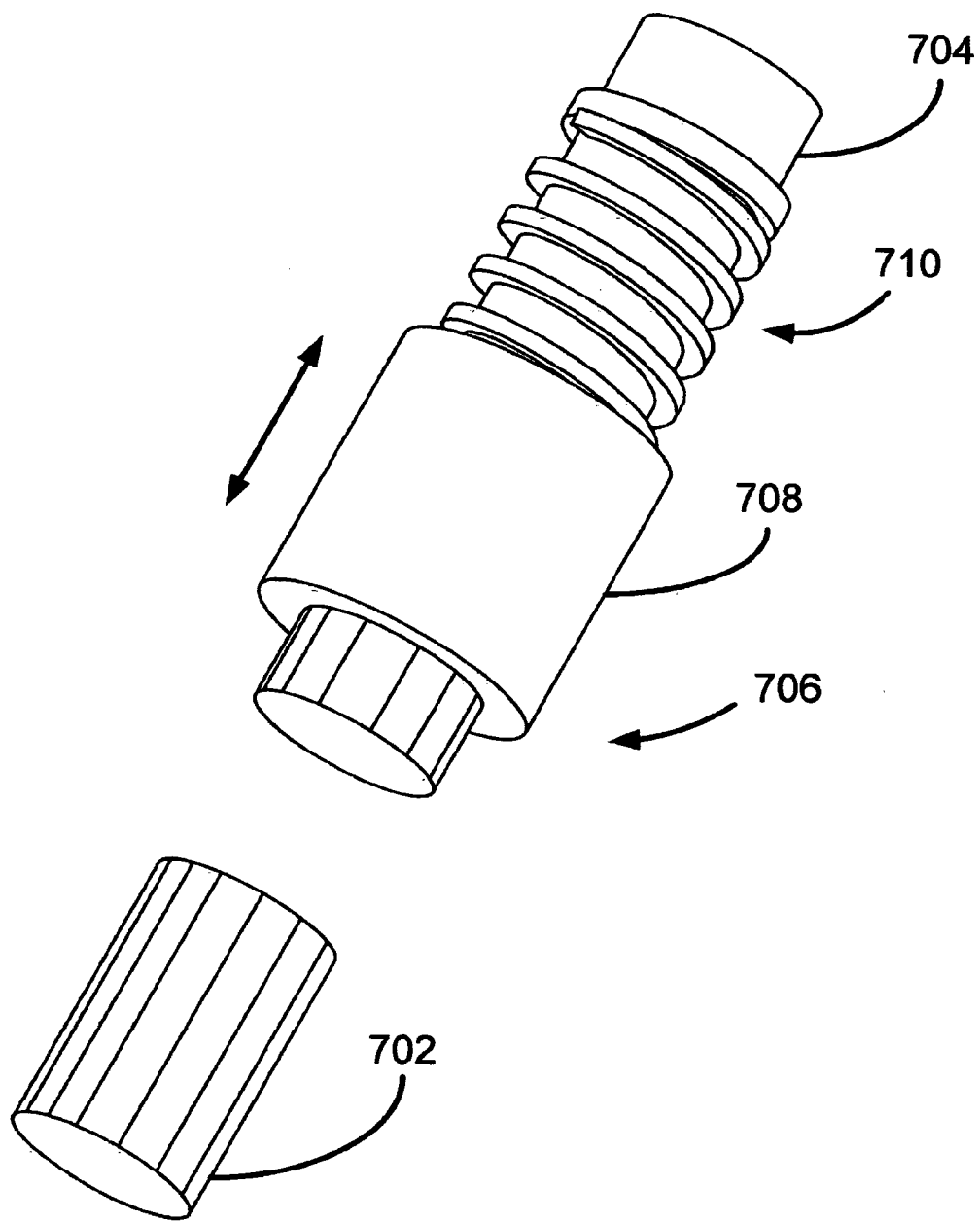
Figure 13A:
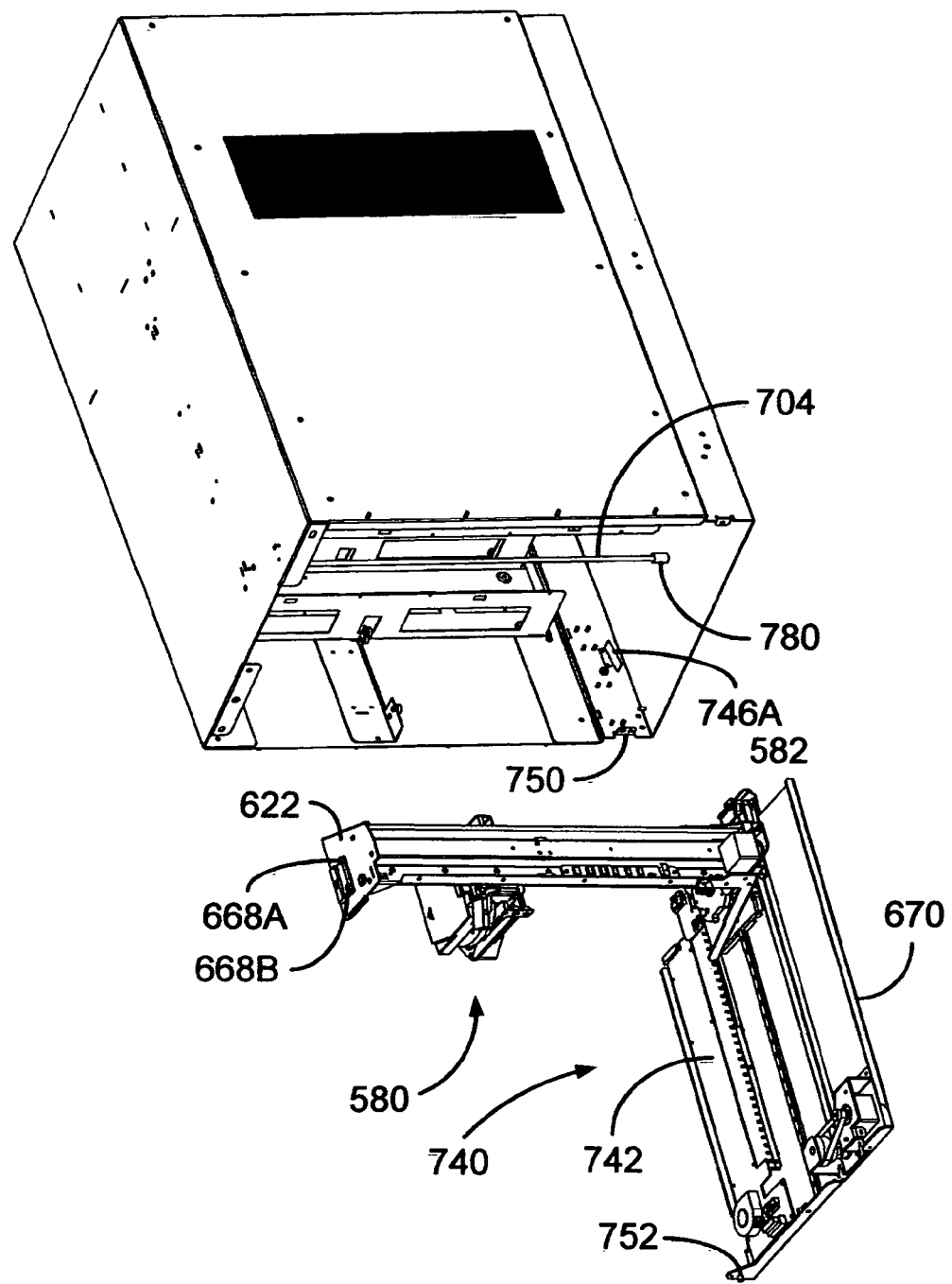
FIG. 13A–13B illustrates aspects of the robotics module that can be readily inserted into and removed from the library illustrated in FIGS. 1A–1B.
Figure 13B:
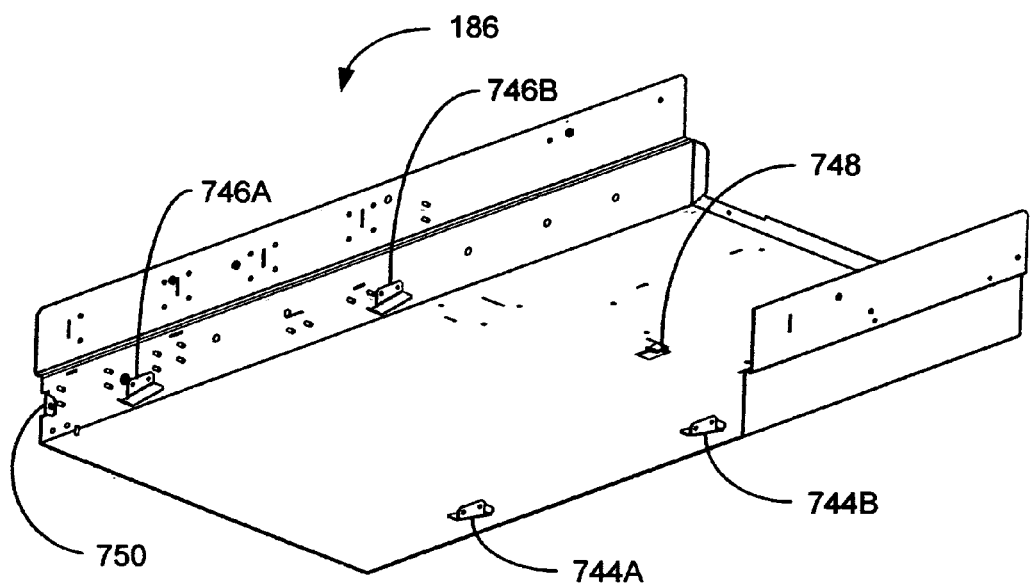
Figure 14A:
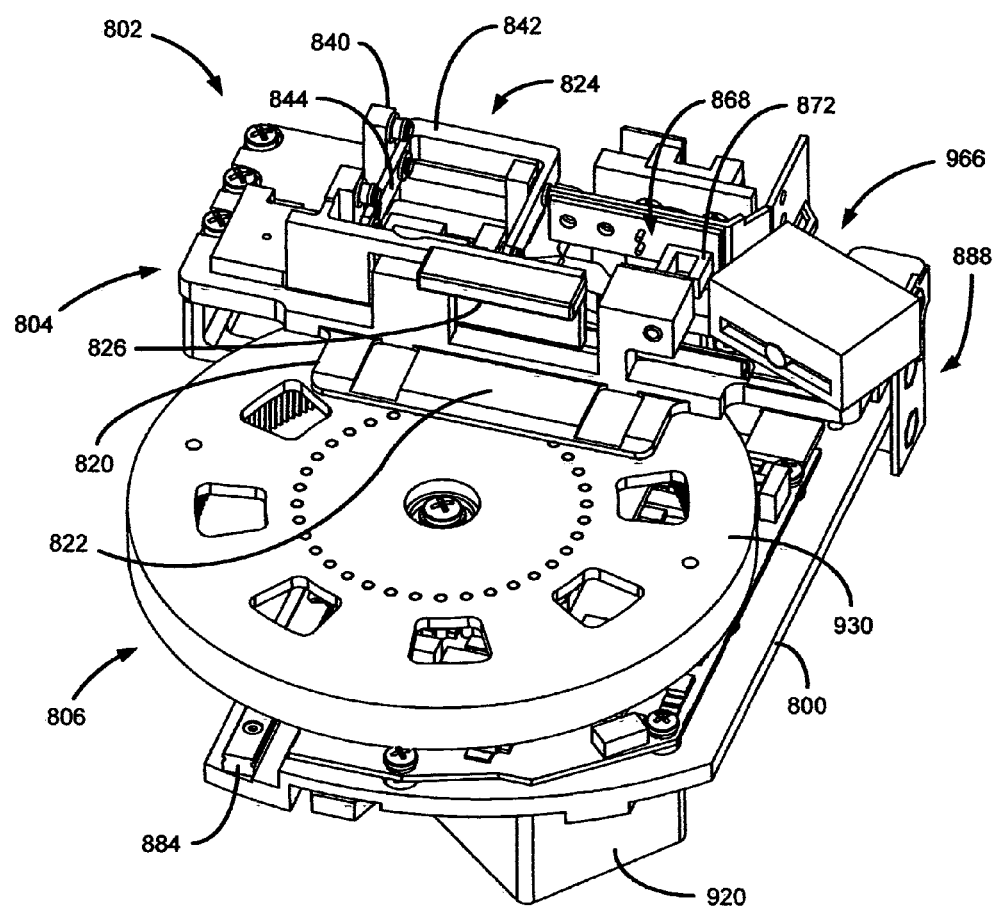
FIGS. 14A–14F illustrate the picker that is associated with the library shown in FIGS. 1A–1B.
Figure 14B:
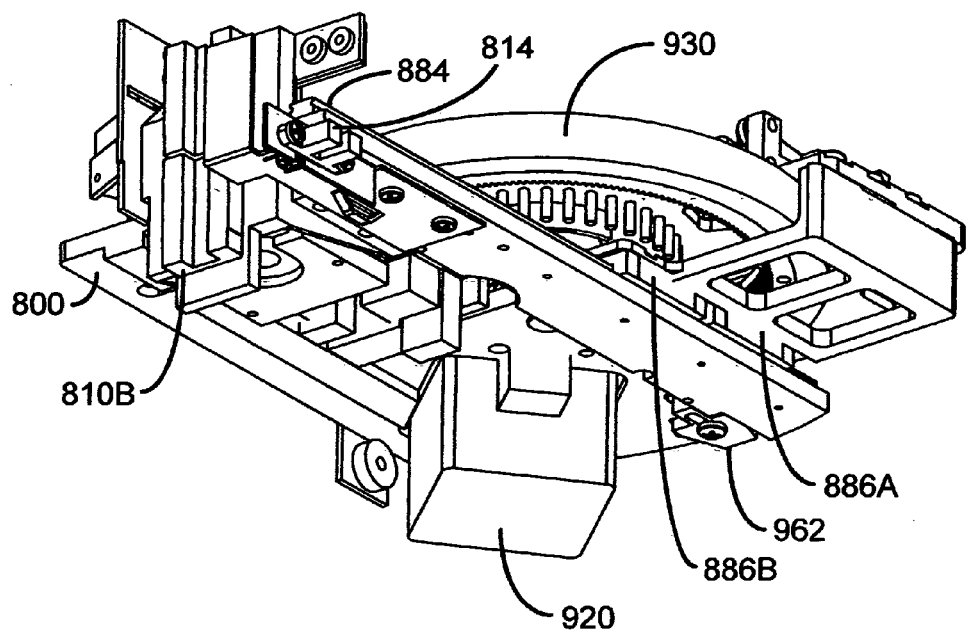
Figure 14C:
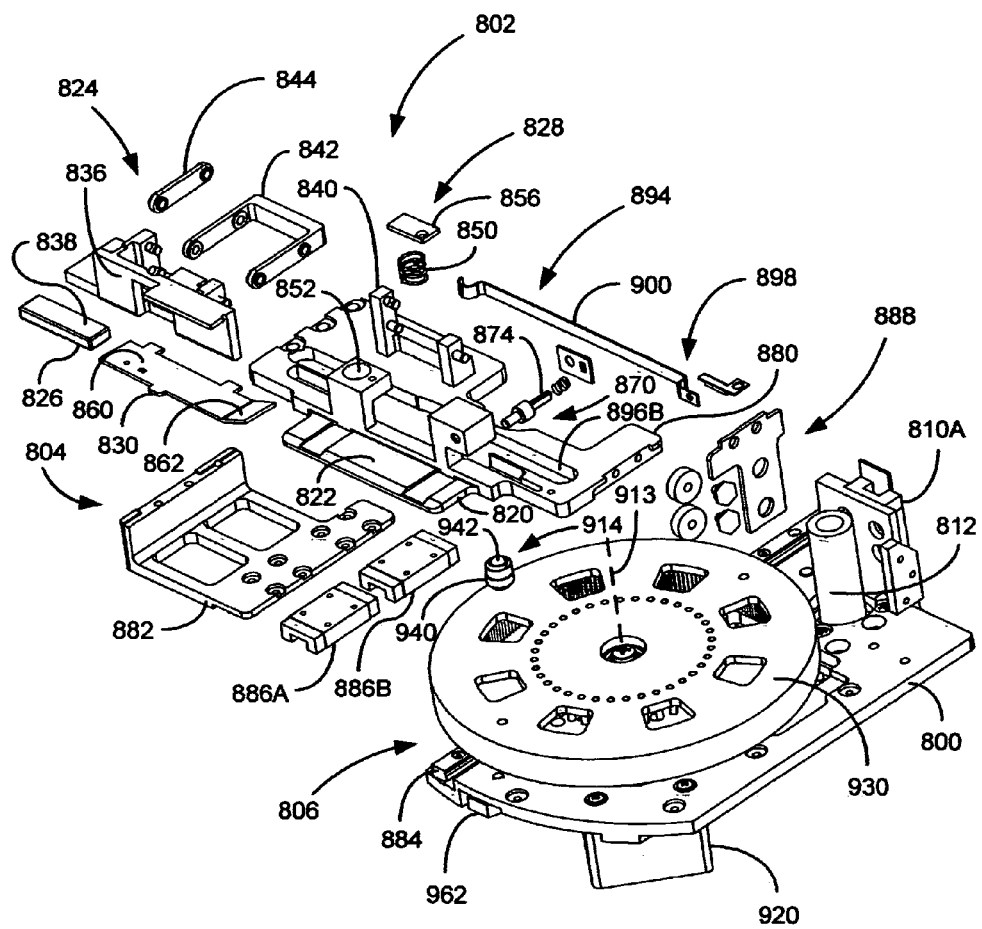
Figure 14D:
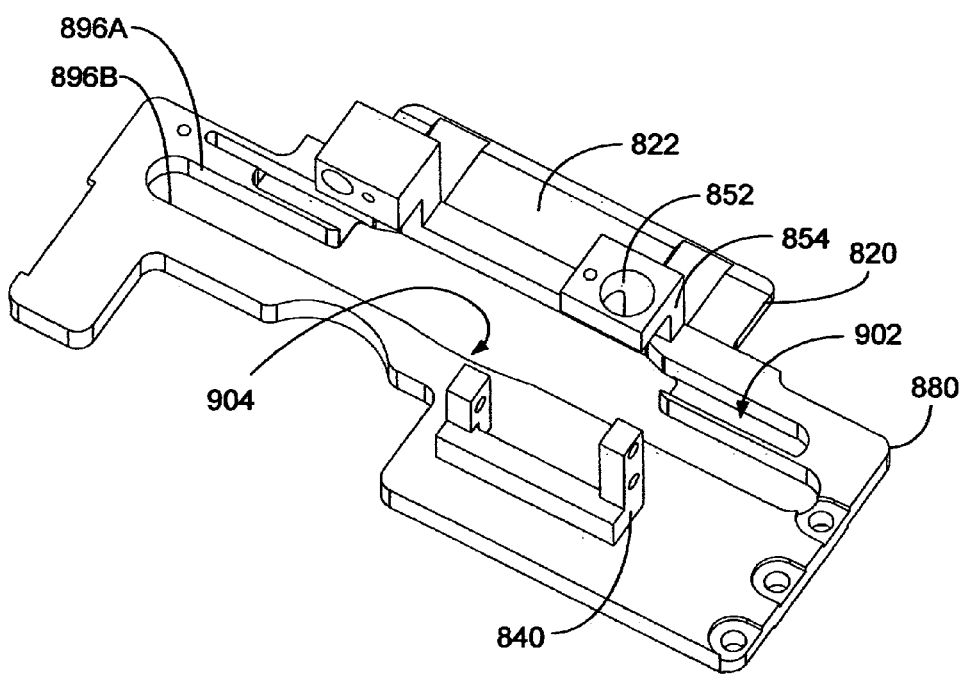
Figure 14E:
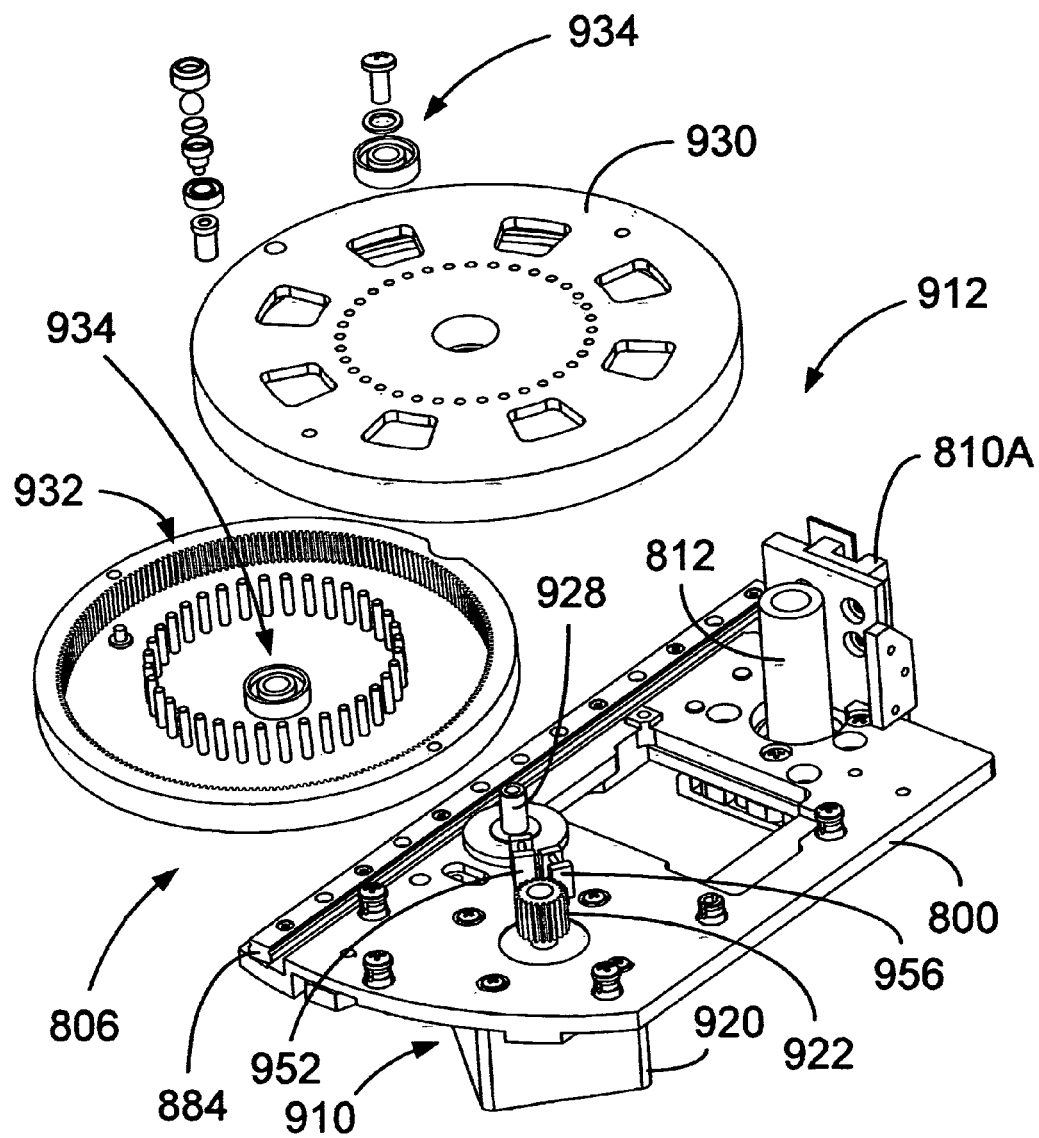
Figure 14F:
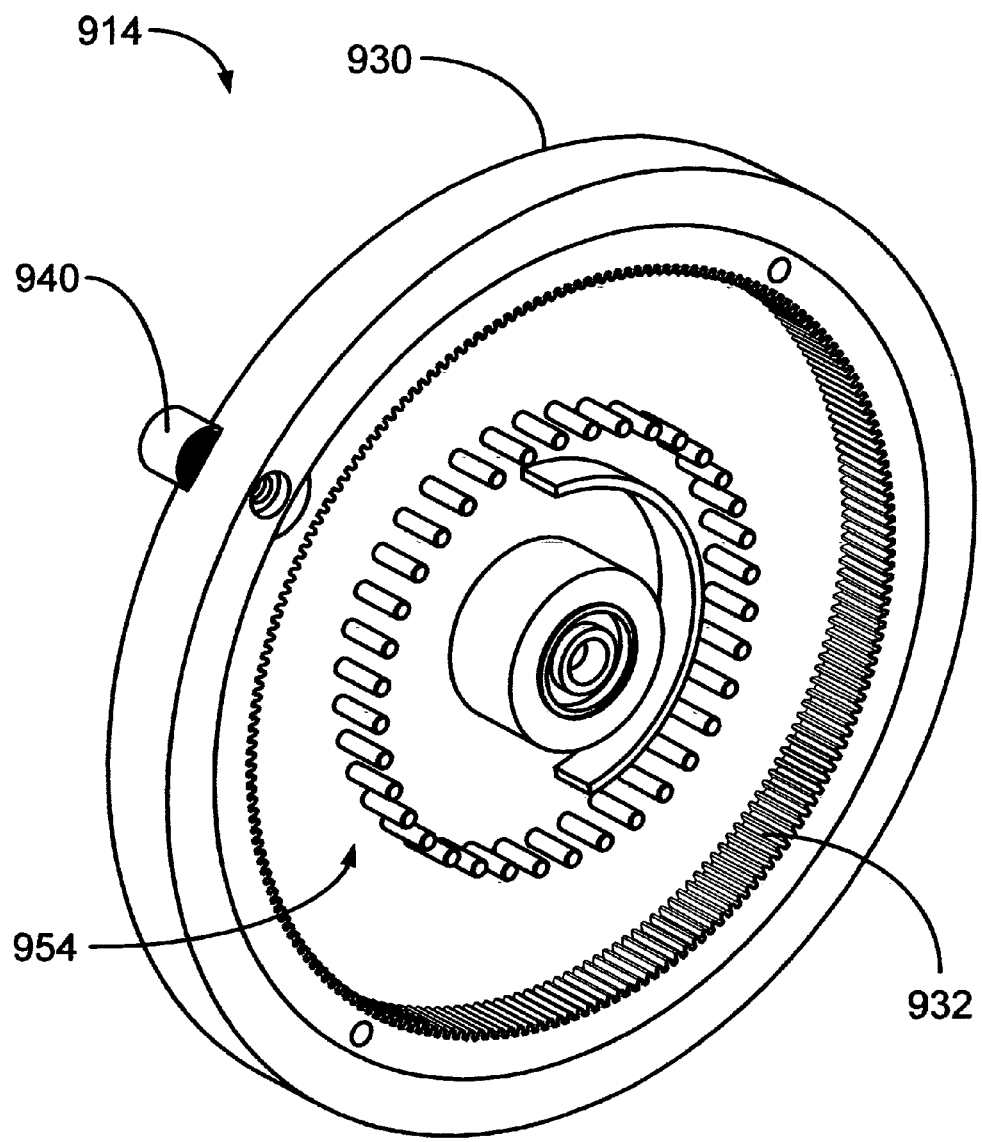

With reference to FIGS. 12B, 13A and 13B, the library 100 further comprises a removable robotics module 740 that allows a user to readily remove substantially all of the electrical and mechanical components of the transport system 112 that could break or malfunction from the library 100 and replace all of those components by inserting another module into the library 100. As a consequence, any downtime for the library 100 that is associated with a broken or malfunctioning component of the transport system 112 can be reduced.

The removable robotic module 740 comprises the robotic module tray 670 and, attached to the tray 670, the picker 580, most of the elevator 582, and a controller board 742 that provides control logic for the picker 580 and the elevator 582. The module 740 does not include the pulley 692, the bracket 694, the second shaft pulley 696, the bracket 698, the third timing belt 700, the portion of the connecting bracket 690 that remains connected to the timing belt 700 after the quick release device is actuated, the second shaft piece 704, or the spline sleeve 708.

The tray 670 of the module 740 is fixed in place in the library 100 by brackets 744A–744B that are attached to the side portion 184A of the bottom tray 186, brackets 746A–746B that are attached to the side portion 184B of the bottom tray 186, a bracket 748 that is attached to the mid-portion 190 of the bottom tray 186, and a threaded hole 750 that receives a captured screw 752 associated with the tray 670. The brackets 744A, 744B, 746A and 746B operate to engage the edge of the tray 670 and thereby vertically constrain the tray 670. The bracket 748 engages the edge of the tray 670 to both vertically and horizontally constrain the tray 670. The threaded hole 750, when engaged by the screw 752, also serves to vertically and horizontally constrain the tray 670.

Assuming the removable robotic module 740 is fixed in place within the library 100, removal of the module 740 involves: removing the front panel 176 to expose the module 740, unscrewing the screw 752 from the threaded hole 750, manipulating the spline sleeve 708 to disconnect the first shaft piece 702 and the second shaft piece 704, and manipulating the connecting bracket 701 to disconnect the top plate 622 from the third timing belt 700. In addition, an electrical connector that connects the controller board 742 and the control module 536 is disconnected. After these operations are completed, the module 740 can be slid out of the library 100 and, if desired, a replacement module inserted and connected to the library 100. After any replacement module has been connected to the library 100, the front panel 176 is replaced.

The invention claimed is:

1. A data cartridge library comprising:
a frame;
a data cartridge magazine, operatively attached to said frame, for providing a plurality of data cartridge storage spaces;
a drive, operatively attached to said frame, for writing data onto a recording medium located within a data cartridge and/or reading data from a recording medium located within a data cartridge;
a picker, operatively attached to said frame, that is capable of grasping a data cartridge, releasing a grasped data cartridge, inserting a grasped data cartridge into a data cartridge storage space in said data cartridge magazine, inserting a grasped data cartridge into said drive, retracting a grasped data cartridge from a data cartridge storage space in said data cartridge magazine, and retracting a grasped data cartridge from said drive; and
an elevator, operatively attached to said frame, for moving said picker such that said picker can perform grasping, retracting and inserting operations in the moving of a data cartridge between any one of said data cartridge storage spaces and said drive;
wherein said picker comprises:
a base plate that is operatively connected to said elevator;
a grasper, operatively connected to said base plate, with a pair of members that are capable of being placed in a closed position that is suitable for grasping a data cartridge and an open position that is suitable for releasing a grasped data cartridge;
wherein said grasper comprises a grasper cam follower;
a crank that is operatively connected to said base plate so as to be capable of rotating about an axis;
a grasper cam driver, operatively connected to said crank, for cooperating with said grasper cam follower to manipulate at least one of said pair of members so as to place said pair of members in at least one of said open and closed positions;
wherein said crank is capable of being used to rotate said grasper cam driver through a range;
wherein for a first portion said range, said grasper cam driver and said grasper cam follower operate to place said members in one of said open state and said closed state; and
wherein for a second portion of said range that does not substantially overlap with said first portion of said range, said grasper cam driver and said grasper cam operate to place said members in the other of said open state and said closed state.

2. A data cartridge library, as claimed in claim 1, wherein:
said first portion of said range is less than 180 degrees; and
said second portion of said range is less than 180 degrees.

3. A data cartridge library, as claimed in claim 1, wherein:
said first portion of said range is more than 180 degrees; and
said second portion of said range is less than 180 degrees.

4. A data cartridge library, as claimed in claim 1, wherein:
said first portion of said range is approximately 180 degrees; and
said second portion of said range is approximately 180 degrees.

5. A data cartridge library, as claimed in claim 1, wherein:
said crank is capable of being used to rotate said grasper cam driver through a range of more than 180 about said axis.

6. A data cartridge library, as claimed in claim 1, wherein:
said grasper cam driver has a surface vector that is not substantially perpendicular to said axis.

7. A data cartridge library comprising:
a frame;
a data cartridge magazine, operatively attached to said frame, for providing a plurality of data cartridge storage spaces;
a drive, operatively attached to said frame, for writing data onto a recording medium located within a data cartridge and/or reading data from a recording medium located within a data cartridge;
a picker, operatively attached to said frame, that is capable of grasping a data cartridge, releasing a grasped data cartridge, inserting a grasped data cartridge into a data cartridge storage space in said data cartridge magazine, inserting a grasped data cartridge into said drive, retracting a grasped data cartridge from a data cartridge storage space in said data cartridge magazine, and retracting a grasped data cartridge from said drive; and
an elevator, operatively attached to said frame, for moving said picker such that said picker can perform grasping, retracting and inserting operations in the moving of a data cartridge between any one of said data cartridge storage spaces and said drive;
wherein said picker comprises:
a base plate that is operatively connected to said elevator;
a grasper, operatively connected to said base plate, with a pair of members that are capable of being placed in a closed position that is suitable for grasping a data cartridge and an open position that is suitable for releasing a grasped data cartridge;
wherein said grasper comprises a grasper cam follower;
a crank that is operatively connected to said base plate so as to be capable of rotating about an axis;
a grasper cam driver, operatively connected to said crank, for cooperating with said grasper cam follower to manipulate at least one of said pair of members so as to place said pair of members in at least one of said open and closed positions;
wherein said crank is capable of being used to rotate said grasper cam driver through a range of more than 180 degrees about said axis.

8. A data cartridge library, as claimed in claim 7, wherein:
when said crank is rotated through said range, said grasper cam driver contacts said grasper cam follower over a first sub-range of said range.

9. A data cartridge library, as claimed in claim 8, wherein:
when said grasper cam driver and said grasper cam follower are in said first sub-range, said pair of members of said grasper are in said closed position.

10. A data cartridge library, as claimed in claim 8, wherein:
when said grasper cam driver and said grasper cam follower are in said first sub-range, said pair of members of said grasper are in said open position.

11. A data cartridge library, as claimed in claim 8, wherein:
said grasper cam driver does not contact said grasper cam follower over a second sub-range of said range that is different than said first sub-range of said range.

12. A data cartridge library, as claimed in claim 11, wherein:
said first sub-range and said second sub-range do not substantially overlap.

13. A data cartridge library, as claimed in claim 11, further comprising:
- a sensor for use in determining whether said grasper cam driver and grasper cam follower are in said first or second sub-range.

14. A data cartridge library, as claimed in claim 7, wherein:
- said range is 360 degrees about said axis.

15. A data cartridge library, as claimed in claim 14, wherein:
- when said crank is rotated through said range, said grasper cam driver contacts said grasper cam follower over a sub-range of only about 180 degrees of rotation of said crank.

16. A data cartridge library, as claimed in claim 14, wherein:
- when said crank is rotated through said range, said grasper cam driver does not contact said grasper cam follower over a range of only about 180 degrees of rotation of said crank.

17. A data cartridge library, as claimed in claim 7, wherein:
- said crank is capable of being used to rotate said grasper cam driver in a clockwise and a counter-clockwise direction about said axis.

18. A data cartridge library, as claimed in claim 7, wherein:
- said picker further comprising:
- a pusher plate that is operatively connected to said base plate such that said pusher plate is capable of moving between first and second positions relative to said base plate;
- wherein said grasper is operatively connected to said pusher plate;
- wherein said pusher plate comprises a pusher plate cam follower;
- a pusher plate cam driver that is capable of engaging said pusher plate cam follower so as to move said pusher plate between said first and second positions.

19. A data cartridge library, as claimed in claim 18, wherein:
- said pusher plate cam driver is operatively connected to said crank.

20. A data cartridge library, as claimed in claim 18, wherein:
- said pusher plate cam driver has a surface vector that is substantially perpendicular to said axis; and
- said grasper cam driver has a surface vector that is not substantially perpendicular to said axis.

21. A data cartridge library, as claimed in claim 7, wherein:
- at least one of said pair of members is constrained to move in a direction with a component vector that is substantially parallel to said axis.

22. A data cartridge library, as claimed in claim 7, wherein:
- at least one of said pair of members is constrained to rotate about a member axis that is substantially perpendicular to said axis.

23. A data cartridge library, as claimed in claim 7, wherein:
- said grasper cam driver has a surface vector that is not substantially perpendicular to said axis.

24. A data cartridge library comprising:
- a frame;
- a data cartridge magazine, operatively attached to said frame, for providing a plurality of data cartridge storage spaces;
- a drive, operatively attached to said frame, for writing data onto a recording medium located within a data cartridge and/or reading data from a recording medium located within a data cartridge;
- a picker, operatively attached to said frame, that is capable of grasping a data cartridge, releasing a grasped data cartridge, inserting a grasped data cartridge into a data cartridge storage space in said data cartridge magazine, inserting a grasped data cartridge into said drive, retracting a grasped data cartridge from a data cartridge storage space in said data cartridge magazine, and retracting a grasped data cartridge from said drive; and
- an elevator, operatively attached to said frame, for moving said picker such that said picker can perform grasping, retracting and inserting operations in the moving of a data cartridge between any one of said data cartridge storage spaces and said drive;
- wherein said picker comprises:
- a base plate that is operatively connected to said elevator;
- a grasper, operatively connected to said base plate, with a pair of members that are capable of being placed in a closed position that is suitable for grasping a data cartridge and an open position that is suitable for releasing a grasped data cartridge;
- wherein said grasper comprises a grasper cam follower;
- a crank that is operatively connected to said base plate so as to be capable of rotating about an axis;
- a grasper cam driver, operatively connected to said crank, for cooperating with said grasper cam follower to manipulate at least one of said pair of members so as to place said pair of members in at least one of said open and closed positions;
- wherein said grasper cam driver has a surface vector that is not substantially perpendicular to said axis.

25. A data cartridge library, as claimed in claim 24, wherein:
- said grasper cam follower has a grasper cam follower surface vector that is not substantially perpendicular to said axis.

26. A data cartridge library, as claimed in claim 24, wherein:
- said grasper cam driver has a grasper cam driver surface vector that is substantially parallel to said axis.

27. A data cartridge library, as claimed in claim 26, wherein:
- said grasper cam follower has a grasper cam follower surface vector that is substantially parallel to said axis and oppositely directed to said grasper cam driver surface vector.

28. A data cartridge library, as claimed in claim 24, wherein:
- said grasper cam driver comprises a bump.

29. A data cartridge library, as claimed in claim 24, wherein:
- said grasper cam follower comprises:
- a transitional surface that extends from a transitional surface first location to a transitional surface second location and has a transitional surface vector with a component vector that is parallel to said axis; and
- a steady-state surface that extends from steady-state surface first location to a steady-state surface second location and has a surface vector that is substantially parallel to said axis.

30. A data cartridge library, as claimed in claim 29, wherein:
said transitional surface comprises a surface that is one of the following: flat and curved.

31. A data cartridge library, as claimed in claim 29, wherein:
said steady-state surface comprises a surface that is flat.

32. A data cartridge library, as claimed in claim 29, wherein:
said grasper cam driver surface comprises a bump.

33. A data cartridge library, as claimed in claim 24, wherein:
said grasper cam driver comprises:
a transitional surface that extends from a transitional surface first location to a transitional surface second location and has a transitional surface vector with a component vector that is parallel to said axis; and
a steady-state surface that extends from steady-state surface first location to a steady-state surface second location and has a surface vector that is substantially parallel to said axis.

34. A data cartridge library, as claimed in claim 24, wherein:
said picker further comprising:
a pusher plate that is operatively connected to said base plate such that said pusher plate is capable of moving between first and second positions relative to said base plate;
wherein said grasper is operatively connected to said pusher plate;
wherein said pusher plate comprises a pusher plate cam follower;
a pusher plate cam driver that is capable of engaging said pusher plate cam follower so as to move said pusher plate between said first and second positions.

35. A data cartridge library, as claimed in claim 34, wherein:
said pusher plate cam driver is operatively connected to said crank.

36. A data cartridge library, as claimed in claim 34, wherein:
said pusher plate cam driver has a surface vector that is substantially perpendicular to said axis; and
said grasper cam driver has a surface vector that is not substantially perpendicular to said axis.

37. A data cartridge library, as claimed in claim 34, wherein:
said pusher plate cam driver comprises a cylinder with a curved side surface and an end surface; and
said grasper cam driver comprises a bump that extends away from said end of said cylinder.

38. A data cartridge library, as claimed in claim 34, wherein:
said pusher plate cam follower comprises:
a first side surface;
a second side surface that is separated from and substantially parallel to said first side surface;
a first end surface that extends between said first and second side surfaces;
a second end surface that extends between said first and second side surfaces and is separated from said first end surface.

39. A data cartridge library, as claimed in claim 38, wherein:
said first side surface of said pusher plate cam follower comprises a dwell discontinuity that serves to prevent displacement of said pusher plate by said pusher plate cam driver over a range of rotation of said crank.

40. A data cartridge library, as claimed in claim 39, wherein:
said dwell discontinuity is located substantially midway between said first and second end surfaces.

41. A data cartridge library, as claimed in claim 24, wherein:
said crank is capable of being used to rotate said grasper cam driver through a range of more than 180 degrees about said axis.

42. A data cartridge library, as claimed in claim 24, wherein:
at least one of said pair of members is constrained to move in a direction with a component vector that is substantially parallel to said axis.

43. A data cartridge library, as claimed in claim 24, wherein:
at least one of said pair of members is constrained to rotate about member axis that is substantially perpendicular to said axis.

44. A data cartridge library, as claimed in claim 24, wherein:
said crank is capable of being used to rotate said grasper cam driver through a range;
wherein for a first portion said range, said grasper cam driver and said grasper cam follower operate to place said members in one of said open state and said closed state; and
wherein for a second portion of said range that does not substantially overlap with said first portion of said range, said grasper cam driver and said grasper cam operate to place said members in the other of said open state and said closed state.

* * * * *